US012728869B2

(12) United States Patent
Kobayashi et al.

(10) Patent No.: US 12,728,869 B2
(45) Date of Patent: Sep. 8, 2026

(54) INFORMATION PROCESSING THAT EXCLUDES PERSONAL INFORMATION FROM METADATA

(71) Applicant: Sony Semiconductor Solutions Corporation, Kanagawa (JP)

(72) Inventors: Atsuro Kobayashi, Kanagawa (JP); Eiji Oba, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 343 days.

(21) Appl. No.: 18/016,008

(22) PCT Filed: Aug. 23, 2021

(86) PCT No.: PCT/JP2021/030810
§ 371 (c)(1),
(2) Date: Jan. 13, 2023

(87) PCT Pub. No.: WO2022/050108
PCT Pub. Date: Mar. 10, 2022

(65) Prior Publication Data

US 2023/0182747 A1 Jun. 15, 2023

(30) Foreign Application Priority Data

Sep. 7, 2020 (JP) ................................ 2020-149908

(51) Int. Cl.
*B60W 40/08* (2012.01)
*B60W 60/00* (2020.01)

(52) U.S. Cl.
CPC ........ *B60W 40/08* (2013.01); *B60W 60/0015* (2020.02); *B60W 60/0059* (2020.02); *B60W 2540/043* (2020.02)

(58) Field of Classification Search
CPC ............ B60W 40/08; B60W 60/0015; B60W 60/0059; B60W 2540/043; G06Q 50/40;
(Continued)

(56) References Cited

U.S. PATENT DOCUMENTS 9,242,619 B2 * 1/2016 Choi ...................... B60R 25/25
10,607,027 B1 * 3/2020 Ben Naim ............. G06F 21/64
(Continued)

FOREIGN PATENT DOCUMENTS

CN 111145389 A * 5/2020 .............. G07C 5/08
JP 2017174111 A 9/2017
JP 2019197342 A 11/2019

OTHER PUBLICATIONS

Zajic; Goran et al., Video-based Assistance for Autonomous Driving, 2020, 2020 Zooming Innovation in Consumer Technologies, IEEE, pp. 151-154 (Year: 2020).*
(Continued)

*Primary Examiner* — Aniss Chad
*Assistant Examiner* — Nikki Marie M Molina
(74) *Attorney, Agent, or Firm* — Michael Best & Friedrich LLP

(57) ABSTRACT

Information processing that protects personal information is disclosed. In one example, an information processing apparatus includes a metadata generation unit that generates metadata from information indicating a state of an occupant riding in a mobile body, the information being obtained from a sensor provided in the mobile body. A first encryption unit encrypts the generated metadata, and a first recording unit stores the encrypted metadata.

20 Claims, 19 Drawing Sheets

(58) Field of Classification Search
CPC ........ H04L 63/0428; G07C 5/00; G08G 1/00; G08G 1/16; G16Y 20/10; G16Y 20/40; G16Y 40/10; G16Y 40/20
See application file for complete search history.

(56) References Cited

U.S. PATENT DOCUMENTS

| | | | | |
|---|---|---|---|---|
| 10,630,648 | B1 * | 4/2020 | Borunda | H04L 9/3213 |
| 11,854,274 | B2 * | 12/2023 | Fukuhara | G08B 13/19647 |
| 2012/0047365 | A1 * | 2/2012 | Mercer | H04L 63/062 713/168 |
| 2014/0032089 | A1 * | 1/2014 | Aoude | G08G 1/162 701/117 |
| 2015/0172056 | A1 * | 6/2015 | Meunier | G08G 1/04 380/28 |
| 2018/0218452 | A1 * | 8/2018 | Guensler | G06Q 40/08 |
| 2019/0012755 | A1 * | 1/2019 | Williams | H04W 4/40 |
| 2019/0086916 | A1 * | 3/2019 | Choi | G05D 1/0276 |
| 2019/0165949 | A1 * | 5/2019 | Ramos | G06F 21/6254 |
| 2020/0043326 | A1 * | 2/2020 | Tao | B60R 11/04 |
| 2021/0370879 | A1 * | 12/2021 | Julian | G06V 40/166 |
| 2022/0027501 | A1 * | 1/2022 | Kusko | G06F 21/6245 |

OTHER PUBLICATIONS

International Search Report (PCT/ISA/210), International Application No. PCT/JP2021/030810, dated Nov. 22, 2021.
Zajic Goran et al: "Video-based Assistance for Autonomous Driving", 2020 Zooming Innovation in Consumer Technologies Conference (ZINC), IEEE, May 26, 2020 (May 26, 2020), pp. 151-154, XP033802387.

* cited by examiner

FIG.1

| AUTOMATIC DRIVING LEVEL | NAME | | EXECUTION SUBJECT OF DRIVING TASK | MONITORING SUBJECT RELATED TO SAFE DRIVING |
| --- | --- | --- | --- | --- |
| 0 | MANUAL DRIVING (DIRECT DRIVING STEERING) | NO DRIVING ASSISTANCE | DRIVER | DRIVER |
| 1 | MANUAL DRIVING (DIRECT DRIVING STEERING) | WITH DRIVING ASSISTANCE (AUTOMATIC BRAKE, ACC, LKAS, AND THE LIKE) | DRIVER | DRIVER |
| 2 | UNDER SPECIFIC CONDITION AUTOMATIC DRIVING FUNCTION (PARTIAL DRIVING AUTOMATION) | | DRIVER (PARTIALLY SYSTEM) | DRIVER |
| 3 | CONDITIONAL AUTOMATIC DRIVING | | SYSTEM | SYSTEM (PARTIALLY DRIVER) |
| 4 | UNDER SPECIFIC CONDITION FULLY AUTOMATED DRIVING (ADVANCED DRIVING AUTOMATION) | | SYSTEM | SYSTEM |

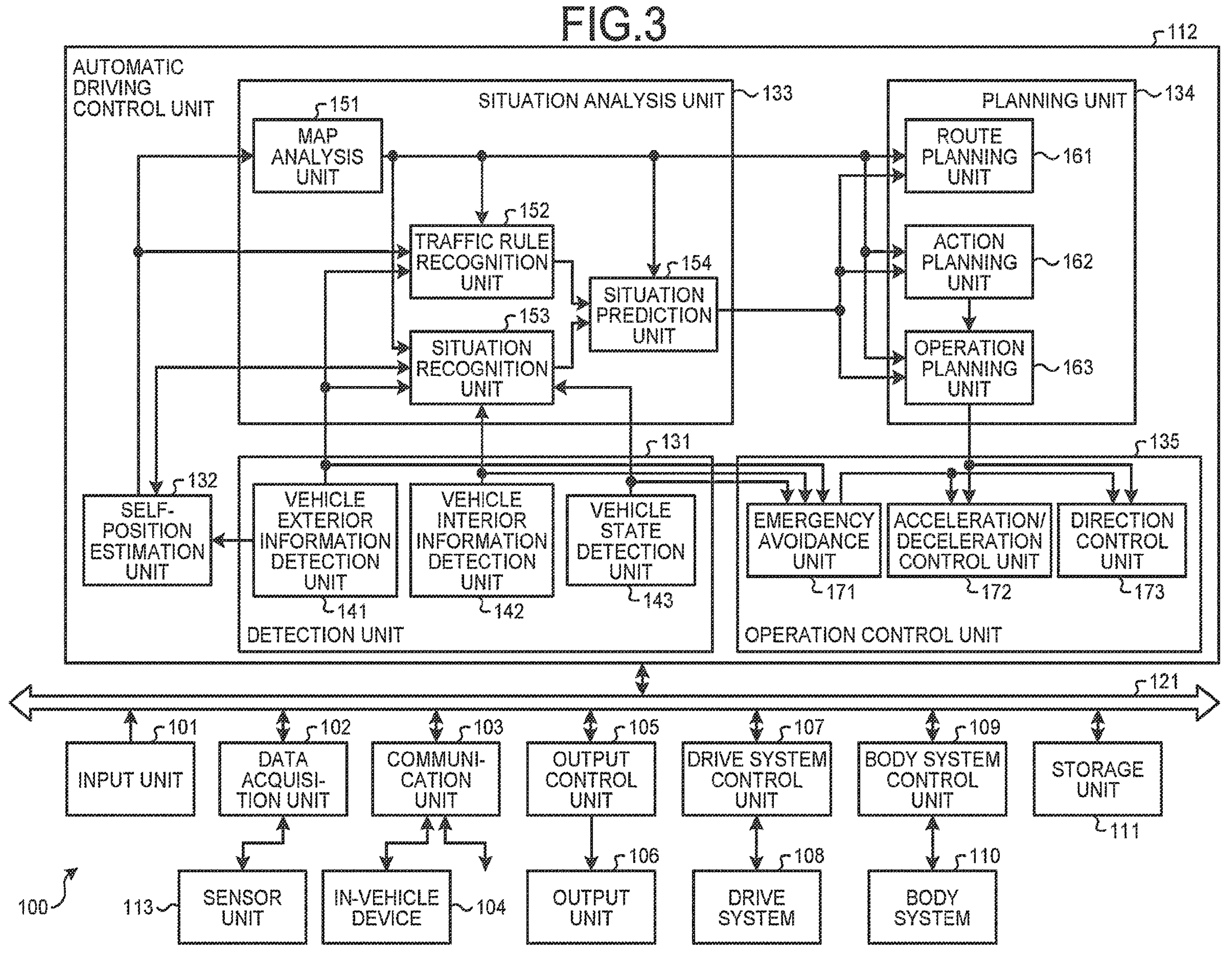
FIG.3
112
AUTOMATIC DRIVING CONTROL UNIT
SITUATION ANALYSIS UNIT
133
151
MAP ANALYSIS UNIT
152
TRAFFIC RULE RECOGNITION UNIT
153
SITUATION RECOGNITION UNIT
154
SITUATION PREDICTION UNIT
PLANNING UNIT
134
ROUTE PLANNING UNIT
161
ACTION PLANNING UNIT
162
OPERATION PLANNING UNIT
163
131
135
132
SELF-POSITION ESTIMATION UNIT
VEHICLE EXTERIOR INFORMATION DETECTION UNIT
141
VEHICLE INTERIOR INFORMATION DETECTION UNIT
142
VEHICLE STATE DETECTION UNIT
143
DETECTION UNIT
EMERGENCY AVOIDANCE UNIT
171
ACCELERATION/DECELERATION CONTROL UNIT
172
DIRECTION CONTROL UNIT
173
OPERATION CONTROL UNIT
121
101
INPUT UNIT
102
DATA ACQUISI-TION UNIT
103
COMMUNI-CATION UNIT
105
OUTPUT CONTROL UNIT
107
DRIVE SYSTEM CONTROL UNIT
109
BODY SYSTEM CONTROL UNIT
STORAGE UNIT
111
100
113
SENSOR UNIT
IN-VEHICLE DEVICE
104
106
OUTPUT UNIT
108
DRIVE SYSTEM
110
BODY SYSTEM

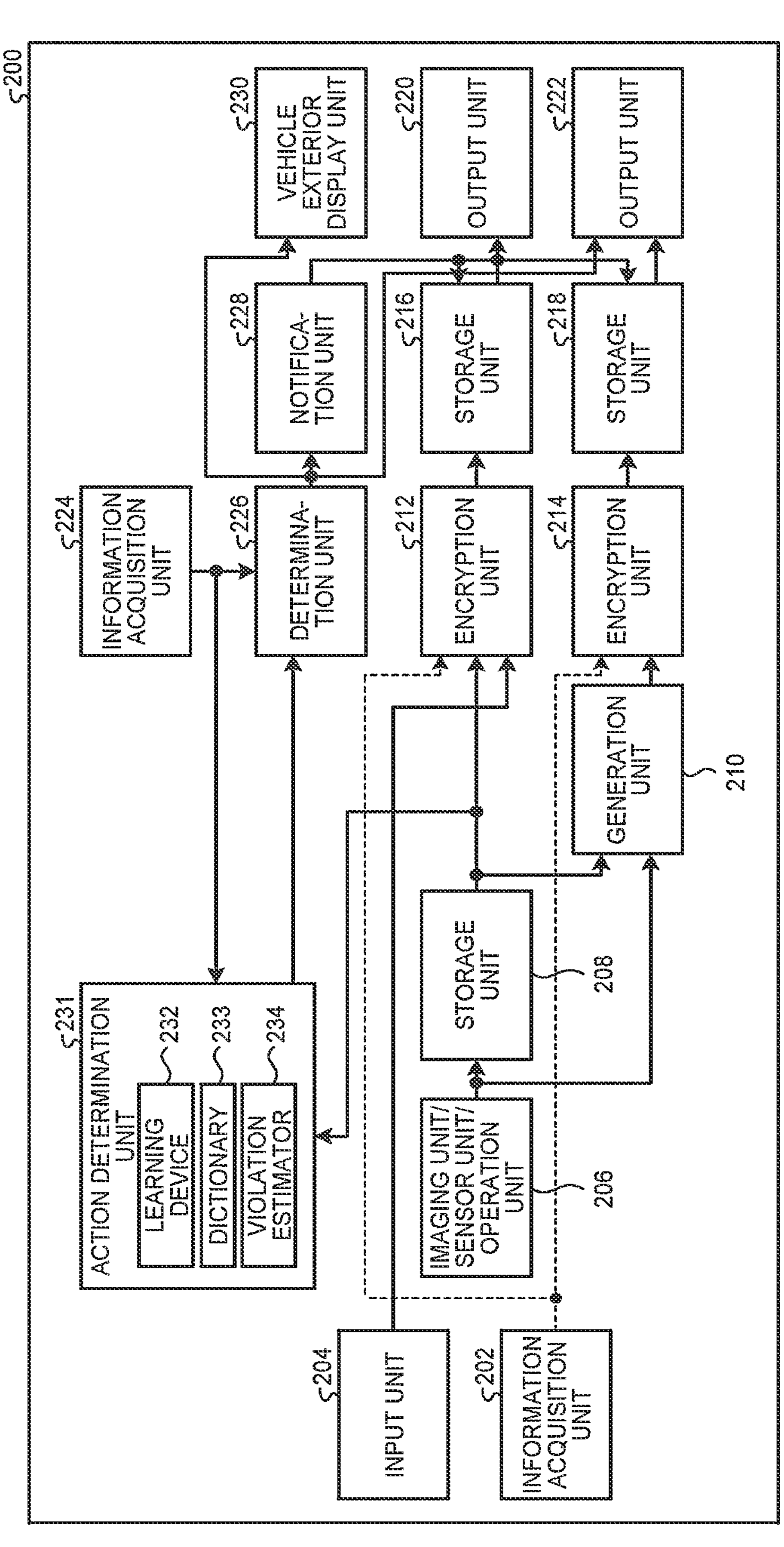
FIG.7
200
230
VEHICLE EXTERIOR DISPLAY UNIT
220
OUTPUT UNIT
222
OUTPUT UNIT
228
NOTIFICA-TION UNIT
216
STORAGE UNIT
218
STORAGE UNIT
224
INFORMATION ACQUISITION UNIT
226
DETERMINA-TION UNIT
212
ENCRYPTION UNIT
214
ENCRYPTION UNIT
GENERATION UNIT
210
231
ACTION DETERMINATION UNIT
232
LEARNING DEVICE
233
DICTIONARY
234
VIOLATION ESTIMATOR
STORAGE UNIT
208
IMAGING UNIT/SENSOR UNIT/OPERATION UNIT
206
204
INPUT UNIT
202
INFORMATION ACQUISITION UNIT

CONDITIONS THAT ALLOW AUTOMATIC DRIVING

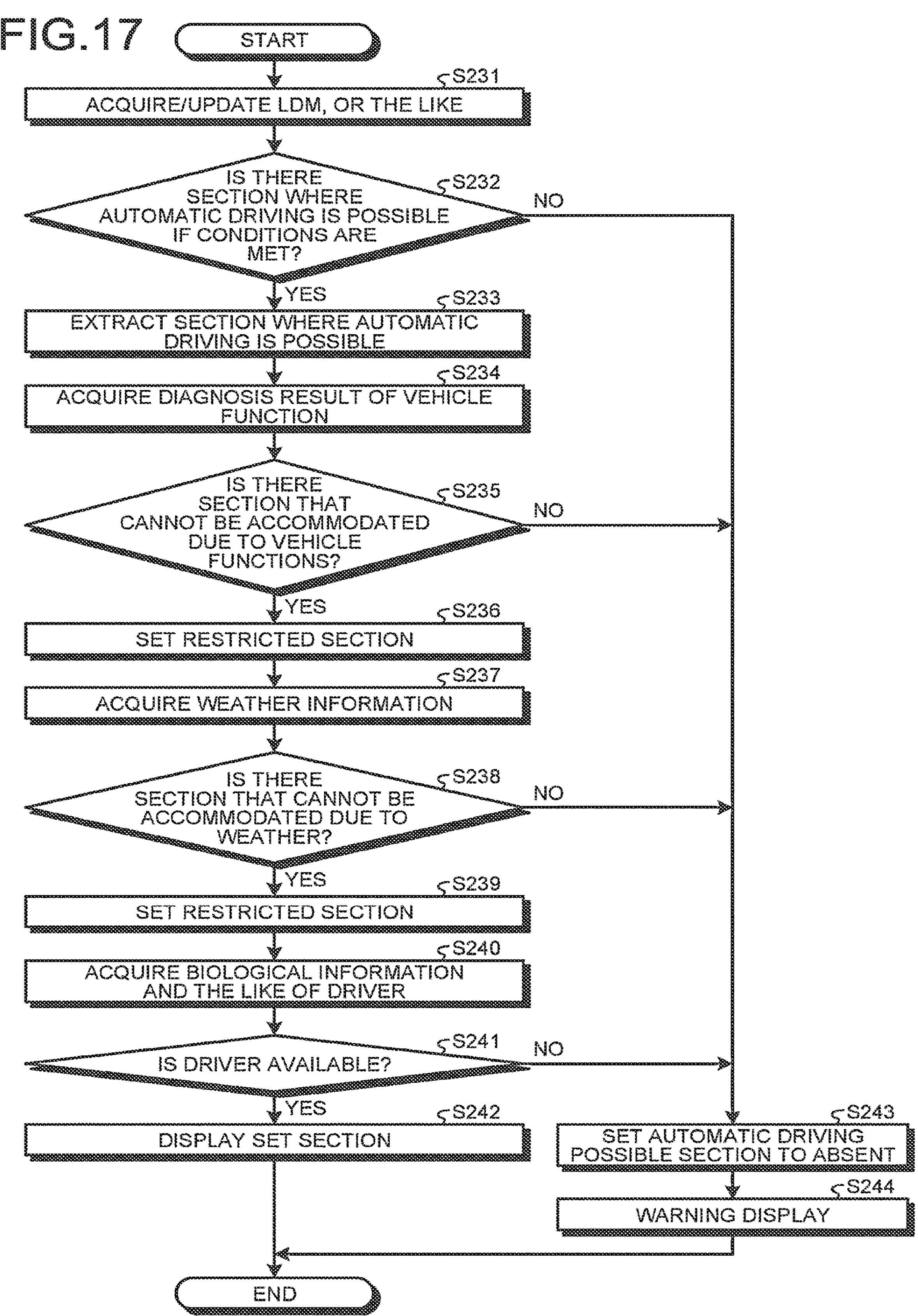
FIG.17
START
S231
ACQUIRE/UPDATE LDM, OR THE LIKE
S232
IS THERE SECTION WHERE AUTOMATIC DRIVING IS POSSIBLE IF CONDITIONS ARE MET?
NO
YES
S233
EXTRACT SECTION WHERE AUTOMATIC DRIVING IS POSSIBLE
S234
ACQUIRE DIAGNOSIS RESULT OF VEHICLE FUNCTION
S235
IS THERE SECTION THAT CANNOT BE ACCOMMODATED DUE TO VEHICLE FUNCTIONS?
NO
YES
S236
SET RESTRICTED SECTION
S237
ACQUIRE WEATHER INFORMATION
S238
IS THERE SECTION THAT CANNOT BE ACCOMMODATED DUE TO WEATHER?
NO
YES
S239
SET RESTRICTED SECTION
S240
ACQUIRE BIOLOGICAL INFORMATION AND THE LIKE OF DRIVER
S241
IS DRIVER AVAILABLE?
NO
YES
S242
DISPLAY SET SECTION
S243
SET AUTOMATIC DRIVING POSSIBLE SECTION TO ABSENT
S244
WARNING DISPLAY
END

INFORMATION PROCESSING THAT EXCLUDES PERSONAL INFORMATION FROM METADATA

FIELD

The present disclosure relates to an information processing apparatus, an information processing method, a program, and an information processing terminal.

BACKGROUND

Recently, development of an automatic driving technique in which a vehicle control system (information processing system) controls a vehicle has been actively performed. However, even in a case where such an automatic driving technique becomes widespread, there is a possibility that a traffic accident occurs similarly to the current manually driven vehicle. Therefore, even when the automatic driving technique becomes widespread, it is required to take measures to suppress the occurrence of traffic accidents. For example, as in the technique disclosed in Patent Literature 1 below, by automatically notifying a driver of a traffic violation, it is possible to suppress the violation and eventually suppress the occurrence of a traffic accident.

CITATION LIST

Patent Literature

Patent Literature 1: JP 2019-197342 A

SUMMARY

Technical Problem

In a case where the automatic driving technique becomes widespread in the near future, for example, it is assumed that information related to automatic driving before a traffic accident is recorded by a drive recorder mounted on a vehicle, and accident verification and the like are performed on the basis of the recorded information. For example, an example of such a drive recorder can include a function of recording data of an operation state of an automatic driving device defined by data storage systems for automated driving (DSSAD) discussed in the World Forum for Harmonization of Vehicle Regulations of the United Nations, a road traffic law (national law), and the like. Specifically, by mounting the drive recorder on a vehicle having an automatic driving function and checking information recorded in the drive recorder, it is possible to analyze and verify an accident such as what has caused the accident during the use of the automatic driving and how a driver and the vehicle control system are related at that time. Drive recorders that record and store moving images taken inside a vehicle have already been introduced in some regions and transportation facilities from the viewpoint of safety. However, since such moving images include a large amount of personal information, it may be difficult to easily permit recording and storage of a moving image by a drive recorder as described above due to the personal protection law, the general data protection regulation (GDPR: EU general data protection regulation), or the like. Moreover, even if the drive recorder can be mounted, a person who can read and confirm the recorded information should be limited to a police officer or the like. Therefore, it is considered that the usability of the limited information in consideration of the privacy of the driver is extremely limited since only a limited person such as a police officer should be able to access the information. That is, effective use of the information recorded in the drive recorder can be said to be limited due to social-systematic restrictions.

For example, in a case where the automatic driving is widely used, it is considered that the driver uses the automatic driving in violation of a design limit of a vehicle control system (automatic operation device) related to the automatic driving technique and a use limit according to the operational design domain (ODD) defined by a road environment. Since such a violation induces an accident, it can be said that the violation is a target to be controlled. Note that, in the present specification, an actual use range for every automated driving level allowed according to infrastructure, a travel environment, and the like is referred to as the “operational design domain” (ODD).

In such a situation, if the law enforcement officer cannot confirm the actions of the driver up to the violation and at the time of the violation, a control officer cannot execute a fair crackdown. Therefore, in Japan, it is considered that a vehicle capable of using an automatic operation technique includes a device (operation state recording device) for recording information necessary for confirming an operation state when using automatic driving. Therefore, it is considered that the control officer (police officer) can confirm the information recorded by the device. However, since the detailed information on the driver recorded in the device includes a lot of personal information, it is required to be strictly managed by the Act on the Protection of Personal Information. Therefore, it is not easy for the control officer to efficiently confirm the information at the site. That is, it is difficult to say that an environment in which appropriate operation can be performed for recording and storage of the information is currently prepared.

Therefore, the present disclosure proposes an information processing apparatus, an information processing method, a program, and an information processing terminal capable of appropriately protecting personal information.

Solution to Problem

According to the present disclosure, there is provided an information processing apparatus including: a metadata generation unit that generates metadata from information indicating a state of an occupant riding on a mobile body, the information being obtained from a sensor provided in the mobile body; a first encryption unit that encrypts the generated metadata; and a first recording unit that stores the encrypted metadata.

Furthermore, according to the present disclosure, there is provided an information processing method, by an information processing apparatus, including: generating metadata from information indicating a state of an occupant riding on a mobile body, the information being obtained from a sensor provided in the mobile body; encrypting the generated metadata; and storing the encrypted metadata.

Furthermore, according to the present disclosure, there is provided a program that causes a computer to implement: a function of generating metadata from information indicating a state of an occupant riding on a mobile body, the information being obtained from a sensor provided in the mobile body; a function of encrypting the generated metadata; and a function of storing the encrypted metadata.

Furthermore, according to the present disclosure, there is provided an information processing terminal including: an authentication unit that performs authentication processing;

an information acquisition unit that acquires encrypted metadata generated from information indicating a state of an occupant riding on a mobile body according to a result of the authentication processing; a decryption unit that performs decryption of the encrypted metadata; and a display unit that outputs the decrypted metadata.

BRIEF DESCRIPTION OF DRAWINGS

FIG. 1 is an explanatory diagram for explaining an example of an automatic driving level.

FIG. 3 is an explanatory diagram for explaining an example of a detailed configuration of a vehicle control system 100 according to the embodiment of the present disclosure.

FIG. 7 is a block diagram illustrating an example of a configuration of a data recording device 200 according to the embodiment of the present disclosure.

FIG. 17 is a sub-flowchart of Step S23 in FIG. 16.

DESCRIPTION OF EMBODIMENTS

Figure 2:
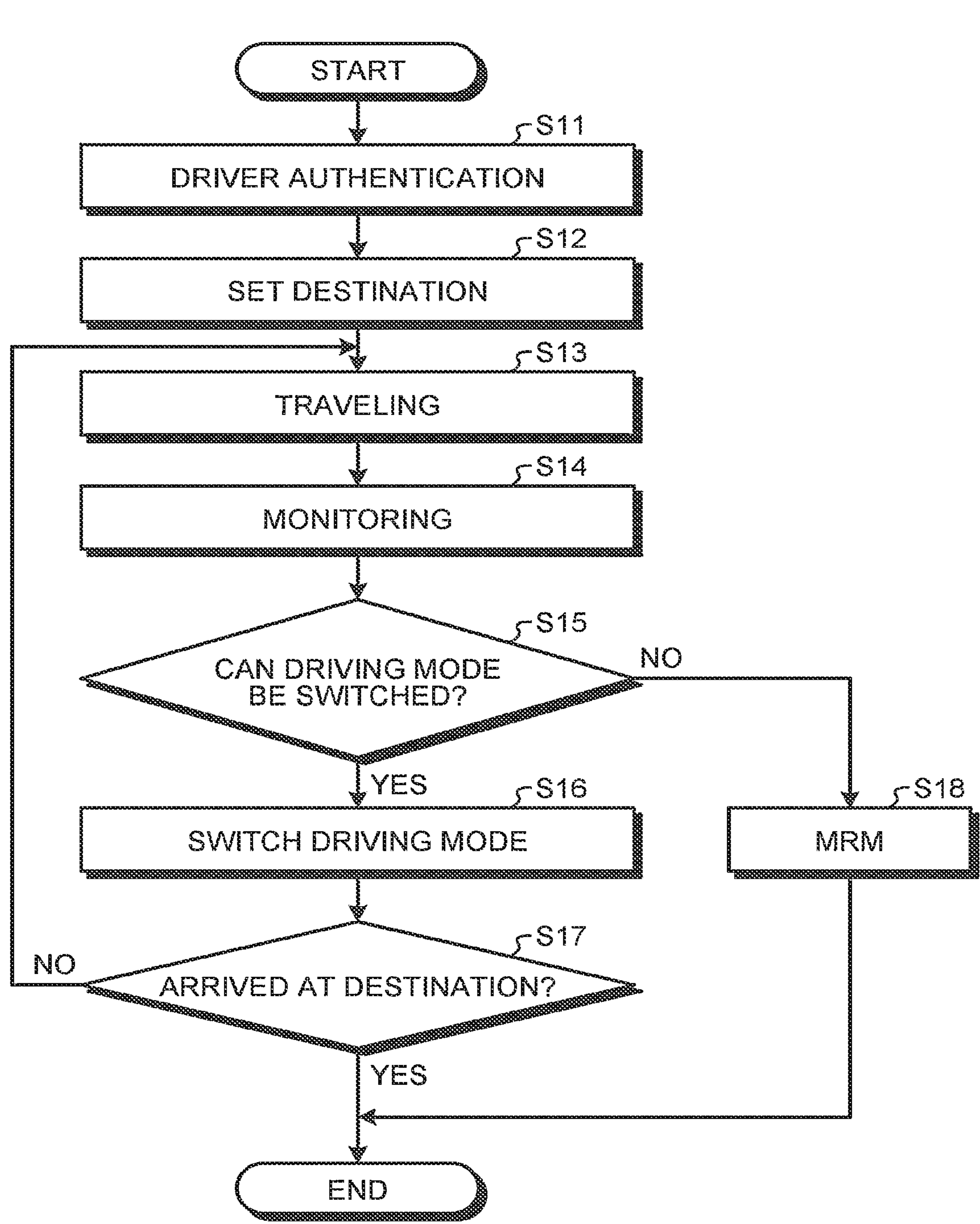
FIG. 2 is a flowchart for explaining an example of traveling according to an embodiment of the present disclosure.

Hereinafter, preferred embodiments of the present disclosure will be described in detail with reference to the accompanying drawings. Note that, in the present specification and the drawings, components having substantially the same functional configuration are denoted by the same signs, and redundant description is omitted.

Note that, in the embodiment of the present disclosure, a case where the present disclosure is applied to automatic driving of an automobile will be described as an example, but the embodiment of the present disclosure is not limited to being applied to an automobile, and can be applied to a mobile body such as an automobile, an electric vehicle, a hybrid electric vehicle, a motorcycle, a an airplane, a ship, a construction machine, or an agricultural machine (tractor). Moreover, in the embodiment of the present disclosure, it is assumed that a steering mode of the mobile body is switchable between automatic driving modes in which one or more driving tasks are automatically executed.

Note that the description will be given in the following order.

1. Background to creating embodiments of present disclosure
2. About example of automatic driving level
3. About example of traveling
4. Detailed configuration of vehicle control system 100
5. Embodiments
 5.1 Data recording system
 5.2 Basic crackdown procedure of control officer
 5.3 Data recording device
 5.4 Terminal
 5.5 About Step S47
 5.6 About Step S52
 5.7 About display of metadata
 5.8 Explanation of ODD determination
 5.9 About violation estimation
 5.10 Summary
6. Hardware configuration
7. Supplement

1. Background to Creating Embodiments of Present Disclosure

First, before describing the details of the embodiments of the present disclosure, the background leading to the creation of the embodiments of the present disclosure by the present inventors will be described. As described above, recently, the automatic driving technique in which a vehicle control system controls a vehicle has been actively developed. The definition of vehicle safety to be satisfied by such automatic driving in a case where such automatic driving technique has developed is defined as "there is no unacceptable risk", that is, it is defined that a reasonably foreseeable and preventable accident that is a personal accident caused by a vehicle control system during automatic driving does not occur. Furthermore, it is assumed that the driver is required to take over the manual driving in a case where the automatic driving is out of the range of the operational design domain (ODD) in which the automatic driving is allowed, in a case where a situation that is not reasonably foreseeable occurs, or the like. Then, in such a state, since the vehicle is used in the automatic driving mode of the automatic driving level 3 or less, the driver performs control in a range that cannot be handled by the vehicle control system.

For example, the road environment is improved, and map data such as a local dynamic map (LDM) is always provided with high freshness, so that it is possible to travel in automatic driving that is called automatic driving level 4 (Details of the automatic driving level will be described) and does not require handling of manual driving by the driver. However, even if the itinerary in which the automatic driving is made available is started, there may occur some circumstances such as an unexpected heavy rain occurring on the way, an indistinguishable falling object being scattered along the travel route, or information of the LDM to be provided in advance in a section with a sharp curve being interrupted. In such a case, the driver is required to cope with the manual driving. Then, even if the vehicle control system requests the driver to return to the manual driving, if the driver excessively depends on the automatic driving, the driver may not be able to return quickly. When the vehicle control system determines that the driver cannot return (determines that the driver cannot take over the driving), it is assumed that the vehicle control system has a function called "minimal risk maneuver" (MRM) to safely stop the vehicle, such as an emergency stop.

However, in a case where the vehicle control system simply executes the MRM when it is determined that it is not in time for the return of the driver in this way, for example, in a case where the vehicle stops at a curve with poor visibility, a rear-end accident by the following vehicle is induced. Furthermore, for example, in a case where the number of lanes is limited and the vehicle stops on a narrow highway with a large amount of traffic, traffic congestion may occur, or traffic obstruction may occur on a highway important as a social infrastructure.

That is, in order to widely introduce the automatic driving into society by ensuring that the driver (user) appropriately uses the vehicle having the automatic driving function without impairing the stable operation of the social activity, it is necessary for the vehicle control system to urge the driver to perform an appropriate return action before the end of the section where the automatic driving function is available as the range of ODD, and further, it is necessary to prevent the driver from using the automatic driving beyond the tolerance of ODD. For this purpose, it is considered that it is essential to impose an obligation on the driver to appropriately grasp the automatic driving usable range defined as the ODD and to appropriately and promptly recognize the return request by the vehicle control system and the content indicated by the road traffic sign. Therefore, establishment of a penalty or the like in a legal system is being considered in view of the need to oblige a driver to grasp and recognize behavior as described above.

By the way, the human's normal action determination is often made by unconsciously balancing a benefit obtained by an action with a disadvantage by the action. Therefore, if the driver does not recognize an intuitive negative profit for the driver himself/herself failing to take measures for return when the vehicle control system requests the driver to take over the manual driving, the driver may fail to take measures for return, or the return measures may be delayed, and an emergency stop due to MRM may frequently occur even before an accident or when an accident does not occur. Therefore, it is required to make the driver aware of the disadvantage by giving a penalty and to enhance the recognition of the importance of the return handling in the action determination. From an ergonomic point of view, it is required to create a mechanism that naturally encourages the driver to make such an action determination.

Specifically, in order to make the legal system regarding the penalty effective, the driver is caused to recognize in advance that delaying the return request is a violation, and the recognition is reflected in the action determination of the driver. The driver does not always comply with the traffic rules while being strongly conscious of the penalty itself at the time of driving, but rather, the driver is conscious of an intuitive risk that he or she will encounter an effective crackdown when he or she has violated the traffic rules, so that he or she makes an action determination to avoid the violation. That is, even in a case where a violation is assumed, as long as the driver does not perceive any risk of being penalized by traffic enforcement, the driver may unconsciously make a selection depending on automatic driving in an action determination that tends to balance the profit obtained by the action and the disadvantage caused by the action, and downgrade the return request from the vehicle control system. Moreover, even if the driver neglects the return request and the vehicle control system makes an emergency stop, an unreasonable road shoulder stop, or the like by the MRM in order to minimize an adverse effect on the vehicle controlled by the vehicle control system, it does not become a direct negative factor for the driver unless a rear-end accident occurs in the vehicle. In addition, from the viewpoint of the operation of the social traffic network and accident safety, if following vehicle stops one after the other, there is a risk of inducing a certain rear-end accident by that amount, and further, there is a case where there is a significant influence such as a traffic jam. However, the action determination of the driver who first reaches the MRM is not recognized as a disadvantage unless a rear-end accident or the like occurs.

In order not to fall into such a situation, it is necessary to provide a mechanism in which the crackdown of the violation that is subject to the penalty set in the system practically acts on the driver's sense so that the system introduced in the form of penalty directly affects the driver's action determination. According to such a mechanism, the violation state is clearly associated with the effective crackdown, and as a result, concreteness is achieved in the application of penalties when the penalties are structured and operationalized within a defined system. Moreover, when the system is effectively operated, the application of the penalty is quickly linked to the disregard of the return request of the driver. Therefore, in the recognition of the driver, the negative aspect that the driver is subject to the application of the penalty is naturally and intuitively recognized with respect to the action determination that excessively depends on the automatic driving.

Therefore, there is a need for a technique that enables an effective crackdown to be effectively executed and operated. Examples of such a technique include a device that records and saves an action or the like of the driver in order to confirm the action or the like of the driver up to the violation and at the time of the violation. However, in a currently known drive recorder that records an in-vehicle video, personal information may be excessively included in information to be recorded. Therefore, it is considered that there are many problems to easily and widely use such a drive recorder, and it is also difficult to accept the drive recorder in society. Furthermore, in a case where management and operation of such information are entrusted to an individual driver in order to protect personal information, the driver can refuse disclosure of inconvenient information to a control officer, and thus there remains a large problem that fair operation is difficult. Moreover, if the control officer takes time to acquire the moving image, analyze the moving image at the control site, such as when and under what kind of situation the violation was made, and determine whether or not there is the violation, the penalty, and the like, the efficiency in operation deteriorates, and thus the effectiveness of the crackdown deteriorates. Then, when the effectiveness of the crackdown decreases, in view of human psychology of behavior, a violation such as performing a secondary task (Details will be described later) during use of automatic driving is promoted, which causes a major social problem.

That is, with the wide introduction of automatic driving into society, it is required to suppress occurrence of a rear-end traffic accident caused by a following traveling vehicle and a traffic jam that hinders social activity, which can be induced by the vehicle control system unavoidably taking an emergency measure such as MRM due to the driver's excessive dependence on the automatic driving and disregard for the return request and the driving attention request. Therefore, in view of the characteristics of the automatic driving technique, it is strongly required to solve the problem in the recording device in order to provide an operational mechanism in which legal penalties (for example, criminal penalties) and legal responsibility extend to the psychological aspect of the driver's action and can directly act on the driver's action determination when using the automatic driving.

Specifically, for example, similarly to the current manual driving, it is assumed that a police officer (control officer) performs a crackdown on the automatic driving vehicle. Then, in the above-described crackdown, it is considered that the control officer distinguishes whether the vehicle is used in a section in which the vehicle is permitted to use the function of automatic driving or in a section in which the driver is requested to perform manual driving, and performs a crackdown according to the distinction under the situation of starting the crackdown. Moreover, it is conceivable that it is difficult for the control officer to visually distinguish between the vehicle requested to be manually driven and the vehicle allowed to be automatically driven from the outside of the corresponding vehicle.

Furthermore, for example, in the automatic driving in a case where the condition that allows the automatic driving level 3 is satisfied, the driver is required to always pay attention to the front of the vehicle in preparation for a sudden change in the surrounding situation even when the action other than steering is permitted (so-called hands-free driving attention duty). Then, in this example, when the driver neglects the duty of care for driving required at the automatic driving level 3, this is a violation to be cracked down on. However, in such a situation, even in a case where the control officer finds, tracks, and can stop the vehicle driven by the driver who seems not to have performed the duty of care for driving, it is difficult for the control officer to confirm details of the action of the driver before the stop and determine whether the driver has not actually performed the duty of care for driving.

Therefore, it is conceivable to mount a drive recorder (for example, the DSSAD or the operation state recording device) capable of recording the operation and state (for example, a moving image or the like) of the driver together with the state (speed, automatic driving level, etc.) of the vehicle on a vehicle capable of automatic driving. Then, for example, the control officer refers to various data recorded by such a drive recorder to determine whether or not the driver has performed the duty of care for driving.

Moreover, since the data recorded in the drive recorder includes a large amount of personal information, it is considered that it is essential to strictly manage the browsing and acquisition of the data by a third party. Then, since appropriate protection of personal information is strongly required worldwide, it is difficult to popularize records and browsing means for a traffic crackdown as described above unless a means capable of appropriately protecting personal information is constructed. In other words, even in a case of a law enforcement action, if personal information cannot be appropriately protected, there is a possibility that the crackdown action itself will not be accepted socially.

Furthermore, since various data recorded in the drive recorder can include personal information other than the information necessary for the crackdown, even in the case of the control officer, a state in which unnecessary personal information can be easily viewed and obtained is not preferable. In addition, allowing the control officer to browse information unnecessary for cracking down is likely to cause excessive information, and thus, on the contrary, it is conceivable that the information hinders efficient confirmation and determination of the violation act.

Therefore, in view of such a situation, the present inventors have created an embodiment of the present disclosure in which data required at the time of crackdown is extracted and abstracted from sensing data obtained from a sensor mounted on a vehicle to generate metadata, and the generated metadata is encrypted and stored. According to such an embodiment of the present disclosure, it is possible to provide only information necessary for the crackdown to the control officer while appropriately protecting personal information, and thus, it is possible to enable an efficient crackdown. As a result, according to the present embodiment, since there is no risk of human rights infringement due to the crackdown, the distribution of personal information, and the like, the crackdown action is socially accepted, and furthermore, occurrence of traffic accidents can be effectively suppressed, and excessive dependence on automatic driving can be prevented. Hereinafter, details of embodiments of the present disclosure created by the present inventors will be sequentially described.

2. Example of Automatic Driving Level

First, before describing details of an embodiment of the present disclosure, an automatic driving level of an automatic driving technique will be described with reference to FIG. 1. FIG. 1 is an explanatory diagram for explaining an example of an automatic driving level. FIG. 1 illustrates an automatic driving level defined by society of automotive engineers (SAE). Note that, in the following description, the automatic driving level defined by the SAE will be basically referred to. However, in the examination of the automatic driving level illustrated in FIG. 1, problems and validity in a case where the automatic driving technology has widely spread are not thoroughly examined, and thus, in the following description, there are portions that are not necessarily described by interpretation as defined in the SAE based on these problems and the like.

In the present specification, vehicle traveling is not roughly divided into two types of manual driving and automatic driving as described above, but classified in stages according to the content of tasks automatically performed by a system side. For example, as illustrated in FIG. 1, it is assumed that the automatic driving level is classified into, for example, five levels from level 0 to level 4 (Note that there are six levels including a level at which unmanned automatic driving is possible). First, the automatic driving level 0 is manual driving without driving assistance by the vehicle control system (direct driving steering of the driver), and the driver executes all driving tasks and also executes monitoring related to safe driving (for example, an action of avoiding danger).

Next, the automatic driving level 1 is manual driving (direct driving steering) in which driving assistance (automatic brake, adaptive cruise control (ACC), lane keeping assistant system (LKAS), and the like) by the vehicle control system can be executed, and the driver executes all driving tasks other than the assisted single function and also executes monitoring related to safe driving.

Next, automatic driving level 2, which is also referred to as "partial driving automation", is a level at which the vehicle control system executes a sub-task of a driving task related to vehicle control in both a front-rear direction and a left-right direction of the vehicle under a specific condition. For example, at the automatic driving level 2, the vehicle control system controls both the steering operation and acceleration/deceleration in cooperation (for example, cooperation between ACC and LKAS). However, even at the automatic driving level 2, the execution subject of the driving task is basically the driver, and the monitoring subject related to safe driving is also the driver.

Furthermore, the automatic driving level 3 is also referred to as "conditional automatic driving", and can execute all the driving tasks in a limited area in which conditions that enable the vehicle control system to cope with the functions mounted on the vehicle are satisfied. In the automatic driving level 3, the execution subject of the driving task is the vehicle control system, and the monitoring subject related to safe driving is also basically the vehicle control system. However, at this level, the vehicle control system is not required to take measures under all situations. The user (driver) at the time of the preliminary response is expected to appropriately respond to the intervention request of the vehicle control system or the like, and in some cases, it is required to respond to a system failure called a so called silent failure. Therefore, if the driver fails to perform the monitoring duty, the driver may violate the duty of care.

By the way, in the automatic driving level 3 defined by SAE, what kind of secondary task (Here, the "secondary task" means an operation other than the operation related to driving performed by the driver during traveling) the driver can actually execute is not clearly defined. Specifically, it is considered that the driver can perform work and actions other than steering during traveling at the automatic driving level 3, for example, secondary tasks such as operation of a mobile terminal, a telephone conference, video viewing, reading, a game, thinking, and conversation with other passengers. On the other hand, in the range of the definition of the automatic driving level 3 of the SAE, it is expected that a driver appropriately performs a response such as a driving operation in response to a request or the like from the vehicle control system side due to a system failure, deterioration of a traveling environment, or the like. Therefore, at the automatic driving level 3, even in a situation where the secondary task as described above is executed, in order to ensure safe traveling, the driver is expected to always maintain a preparation state in which the driver can immediately return to manual driving.

Moreover, the automated driving level 4 is also referred to as "advanced driving automation", where the vehicle control system performs all driving tasks within a limited area. In the automatic driving level 4, the execution subject of the driving task is the vehicle control system, and the monitoring subject related to safe driving is also the vehicle control system. However, unlike the automatic driving level 3 described above, at the automatic driving level 4, it is not expected that the driver takes a measure such as performing a driving operation (manual driving) in response to a request or the like from a side of the vehicle control system due to a system failure or the like. Therefore, at the automatic driving level 4, the driver can perform the secondary task as described above, and depending on the situation, for example, if conditions are met, the driver can take a temporary sleep during the time.

As described above, in the automatic driving level 0 to the automatic driving level 2, the driver travels in the manual driving mode in which all or some of the driving tasks are mainly executed. Therefore, at these three automatic driving levels, it is not allowed for the driver to engage in a secondary task that is an action other than manual driving and an action related thereto, such as actions that cause attention reduction during traveling.

On the other hand, at the automatic driving level 3, the vehicle control system travels in the automatic driving mode in which the vehicle control system independently executes all the driving tasks. However, as described above, there may be a situation in which the driver performs the driving operation at the automatic driving level 3. Therefore, at the automatic driving level 3, when the secondary task is permitted to the driver, the driver is required to be in a preparation state in which the driver can return from the secondary task to the manual driving.

Moreover, when it is determined that the situation in which the vehicle traveling at the automatic driving level 4 is permitted is satisfied, the vehicle control system travels in the automatic driving mode in which all the driving tasks are executed. However, since the situation dynamically changes depending on the maintenance situation or the like at each time in the actual road infrastructure, a section in which the automatic driving level 4 cannot be applied to a part of a travel route may be found in the middle of the travel plan. In such a case, before approaching and entering the corresponding section, for example, it is required to set and transition the automatic driving level 2 or less recognized depending on conditions. Then, in the section set to be equal to or lower than the automatic driving level 2 in this way, the driver is required to execute the driving task proactively. That is, even in the case of the automatic driving level 4, since the situation changes from moment to moment in the middle of the itinerary as described above, even in the middle of the itinerary planned in advance as the automatic driving level 4, the transition to the automatic driving level 2 or less may actually occur. After the transition of the automatic driving level is notified to the driver, the driver may be required to return to the preparation state in which the secondary task can return to the manual driving at an appropriate advance notice timing. Since it is not possible to overlook whether or not to respond to these situation changes in terms of social operation, it is strongly required to realize a means for confirming the driver's obligation to take appropriate measures and a technology that enables effective operation thereof.

3. About Example of Traveling

Next, an example of traveling according to the embodiment of the present disclosure will be described with reference to FIG. 2 on the basis of the automatic driving levels described above. FIG. 2 is a flowchart for explaining an example of traveling according to the embodiment of the present disclosure. As illustrated in FIG. 2, in traveling according to the embodiment of the present disclosure, the vehicle control system executes, for example, steps from Step S11 to Step S18. Details of each of these steps will be described below.

First, the vehicle control system executes driver authentication (Step S11). The driver authentication can be performed by belongings authentication using a driver's license, a vehicle key (including a portable wireless device), or the like, knowledge authentication using a password, a personal identification number, or the like, or biometric authentication using a face, a fingerprint, an iris of a pupil, a voiceprint, or the like. Moreover, in the present embodiment, the driver authentication may be performed by using all or two of the belongings authentication, the knowledge authentication, and the biometric authentication. In the embodiment of the present disclosure, by executing such driver authentication before starting traveling, even in a case where a plurality of drivers drive the same vehicle, it is possible to acquire information that can identify each driver, such as the iris and the eyeball behavior of each driver, in association with each driver. Note that, in the present embodiment, in a case where a plurality of passengers (occupants) board the vehicle and the plurality of passengers can be drivers, it is preferable to perform authentication for all the drivers. Furthermore, in the present embodiment, a rule as to which passenger is preferentially recognized as the driver may be set in advance (recognition of a passenger seated in a driver's seat as a driver, sequential setting of a driver according to a schedule set in advance at the time of boarding, and the like). That is, in the present embodiment, even in the case of traveling by automatic driving, it is preferable to clarify the passenger responsible for the vehicle traveling.

Next, for example, an input unit 101 (see FIG. 3) to be described later is operated by a driver or the like to set a destination (Step S12). Note that, here, an example of boarding a vehicle and setting a destination has been described. However, the embodiment of the present disclosure is not limited to this, and the vehicle control system may preset a destination on the basis of destination information or calendar information (manually) input to a smartphone or the like (assumed to be communicable with the vehicle control system) before boarding the vehicle. Alternatively, the vehicle control system may automatically preset the destination by acquiring schedule information or the like stored in advance in a smartphone or the like, and a cloud server or the like (assumed to be communicable with the vehicle control system) via a concierge service. Then, the vehicle control system performs preplanning setting such as a traveling route based on the set destination. Moreover, the vehicle control system updates and acquires information of the road environment of the set travel route, that is, local dynamic map (LDM) information in which the travel map information of the road on which the vehicle travels is constantly updated at high density for each predetermined prefetch section along the travel during the itinerary. In addition, the vehicle control system appropriately updates and resets an appropriate automatic driving level for each section on the travel route based on the acquired latest LDM information and the like. Therefore, even if the section entry is started as the automatic driving level 4, in a case where a new handover point to the manual driving, which has not been found at the start of the itinerary, appears from the information that is updated every moment in this way, the driver is naturally required to recognize the notification and to perform the handover corresponding to a change point. That is, it is also important to grasp the series of check action responses of the driver.

Next, the vehicle control system starts displaying the travel section on the travel route. Then, the vehicle control system starts traveling according to the set automatic driving level (Step S13). Note that, when the traveling is started, the display of the travel section is updated based on the position information of the vehicle (host vehicle) and the acquired LDM update information. Furthermore, the safety measure performed automatically when the driver cannot recover from the automatic driving to the manual driving is also included, and the term "traveling" is used in the above description, but the term "traveling" does not exclude the stop associated with the MRM or the like determined by the vehicle control system.

Next, the vehicle control system appropriately executes monitoring (observation) of a state of the driver (Step S14). In the embodiment of the present disclosure, for example, the monitoring is executed in order to acquire teacher data for determining the return handling level of the driver, or is appropriately executed according to a situation in which confirmation is necessary due to a change with time of the traveling environment, such as whether the state confirmation of the driver in advance necessary for switching the driving mode according to the automatic driving level set in each section on the traveling route and the timing of the return notification are appropriately performed, and whether the driver appropriately performs the return action in response to the notification or the alarm, including the return request from the unexpected automatic driving occurring after the start of the itinerary.

Next, when the vehicle reaches a switching point from the automatic driving mode to the manual driving mode based on the automatic driving level set for each section on the travel route, the vehicle control system determines whether the driving mode can be switched (Step S15). Then, the vehicle control system proceeds to the processing of Step S16 when determining that the driving mode can be switched (Step S15: Yes), and proceeds to the processing of Step S18, for example, when determining that the driving mode cannot be switched (Step S15: No).

Next, the vehicle control system switches the driving mode (Step S16). Moreover, the vehicle control system determines whether the vehicle (host vehicle) has arrived at the destination (Step S17). The vehicle control system ends the processing when the vehicle has arrived at the destination (Step S17: Yes), and returns to the processing of Step S13 when the host vehicle has not arrived at the destination (Step S17: No). Thereafter, the vehicle control system appropriately repeats the processing from Step S13 to Step S17 until the vehicle arrives at the destination. Furthermore, when the driving mode cannot be switched from the automatic driving to the manual driving, the vehicle control system may execute the emergency stop using the MRM or the like (Step S18). Note that the flowchart of FIG. 2 is a diagram for schematic description, and illustrates a flow as a simple model while omitting description of a detailed procedure at the time of handover, confirmation of a state at the time of handover, a detailed procedure of coping processing and determination in automatic control, and detailed steps. That is, the processing of the framework of Step S13 includes a series of handling processing that is automatically performed when the recovery cannot be performed, and the description thereof is omitted. Note that a more detailed procedure and recording therebetween will be described later with reference to FIG. 6 and the like.

Note that, in the embodiment of the present disclosure, even in the same road section, an allowable automatic driving level can change from moment to moment according to vehicle performance, road conditions, weather, and the like. Furthermore, even in the same vehicle, allowable ODD may also change depending on a case where detection performance is deteriorated due to primary contamination of a device mounted on the own vehicle, contamination of a sensor, or the like. Therefore, an allowable automatic driving level may also change during traveling from a departure place to a destination. Moreover, in the case of a transition of the automatic driving level that requires a response to switching from the automatic driving to the manual driving, a handover section for the response may also be set. Therefore, in the embodiment of the present disclosure, the ODD is set and updated on the basis of various information that changes from moment to moment.

Moreover, when the ODD set for the traveling vehicle changes, the content of the secondary task allowed for the driver also changes. That is, since the content of the unacceptable secondary task changes according to the ODD, the range of the content of the driver's action considered to violate the traffic rules also changes. For example, in the case of the automatic driving level 4, even if it is permitted to perform a secondary task such as reading, in the case of transitioning to the automatic driving level 2, the secondary task such as reading is a violation. In addition, since there is also a sudden transition of the automatic driving level in the automatic driving, the driver is required to be in a preparation state in which the driver can immediately return to the manual driving from the secondary task. Therefore, in the present embodiment, the fact that the driver is not in the preparation state as described above can also be regarded as a violation.

Therefore, in the present embodiment, the control officer confirms the ODD permitted to the driver by the vehicle control system, the permitted work range, and the driver's movement, posture, line of sight, arousal level, situation confirmation, and the like in the time zone (alternatively, the traveling position) corresponding to the ODD, thereby determining whether or not the driver is in the use state deviating from the permitted range and is performing the violation. In the use of the automatic driving, the driver is required to take a series of handover actions to complete grasping of the situation necessary at the time of handover, instead of the continuous attention obligation, although the constant attention obligation imposed on the driver to keep the conventional traveling safe is alleviated as soon as conditions are satisfied. For example, the driver is required to take measures in a predetermined procedure, such as confirmation of the situation of the notification contents notified by the vehicle control system by the driver, prompt action start according to the instruction, and action execution according to the instruction. When the control officer cracks down on a vehicle considered to be a violation, the control officer checks a period during which this series of procedures should be performed and whether the driver has appropriately completed the procedures without delay as the period elapses. Therefore, in the embodiment of the present disclosure described below, the control officer can quickly confirm the situation of the action, the motion, and the like of the driver at the crackdown site.

4. Detailed Configuration of Vehicle Control System 100

Next, a detailed configuration of a vehicle control system (information processing system) 100 according to the embodiment of the present disclosure will be described with reference to FIG. 3. FIG. 3 is an explanatory diagram for explaining an example of a detailed configuration of the vehicle control system 100 according to the present embodiment. Note that hereinafter, when a vehicle provided with the vehicle control system 100 is distinguished from other vehicles, the vehicle is referred to as a host vehicle or an own vehicle.

As illustrated in FIG. 3, the vehicle control system 100 mainly includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, an automatic driving control unit 112, and a sensor unit 113. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an in-vehicle communication network, a bus, or the like conforming to an arbitrary standard such as a controller area network (CAN), a local interconnect network (LIN), a local area network (LAN), or FlexRay (registered trademark). Note that each unit of the vehicle control system 100 may be directly connected without the communication network 121.

Note that, in the following description, the description of the communication network 121 will be omitted when each unit of the vehicle control system 100 performs communication via the communication network 121. For example, when the input unit 101 and the automatic driving control unit 112 communicate with each other via the communication network 121, it is simply described that the input unit 101 and the automatic driving control unit 112 communicate with each other.

Hereinafter, details of each functional unit included in the vehicle control system 100 according to the present embodiment will be sequentially described.

The input unit 101 includes a device used when a passenger such as a driver inputs various data, instructions, and the like. For example, the input unit 101 includes an operation device such as a touch panel, a button, a microphone, a switch, and a lever, an operation device that can be input by a method other than manual operation by voice, gesture, or the like, and the like. Furthermore, for example, the input unit 101 may be a remote control device using infrared rays or other radio waves, or an external connection device such as a mobile device or a wearable device compatible with the operation of the vehicle control system 100. Then, the input unit 101 can generate an input signal on the basis of data, an instruction, or the like input by the passenger, and supply the input signal to each functional unit of the vehicle control system 100.

The data acquisition unit 102 can acquire data used for processing of the vehicle control system 100 from the sensor unit 113 including various sensors and the like, and supply the data to each functional unit of the vehicle control system 100.

For example, the sensor unit 113 includes various sensors for detecting a situation of the vehicle (host vehicle) and the like. Specifically, for example, the sensor unit 113 includes a gyro sensor, an acceleration sensor, an inertial measurement unit (IMU), and a sensor for detecting an operation amount of an accelerator pedal, an operation amount of a brake pedal, a steering angle of a steering wheel, an engine speed, a motor speed, a rotation speed of wheels, or the like.

Furthermore, for example, the sensor unit 113 may include various sensors for detecting information outside the vehicle (host vehicle). Specifically, for example, the sensor unit 113 may include an imaging device such as a time of flight (ToF) camera, a stereo camera, a monocular camera, an infrared camera, or another camera.

Furthermore, for example, the sensor unit 113 may include an environment sensor for detecting weather, or the like, a surrounding information detection sensor for detecting an object around the host vehicle, and the like. Examples of the environmental sensor include a raindrop sensor, a fog sensor, a sunshine sensor, and a snow sensor. Furthermore, examples of the surrounding information detection sensor include an ultrasonic sensor, a radar, a light detection and ranging, laser imaging detection and ranging (LiDAR), a sonar, and the like.

Moreover, for example, the sensor unit 113 may include various sensors for detecting the current position of the vehicle (host vehicle). Specifically, for example, the sensor unit 113 may include a global navigation satellite system (GNSS) receiver or the like that receives a GNSS signal from a GNSS satellite.

Moreover, the current position detected by the sensor unit 113 may be complemented by correcting the reference point on the basis of position information by simultaneous localization and mapping (SLAM) capable of simultaneously performing self position estimation and environmental map creation, or position information detected by laser imaging detection and ranging (LiDAR), millimeter wave radar, or the like.

Furthermore, for example, the sensor unit 113 may include various sensors for detecting information inside the vehicle. Specifically, for example, the sensor unit 113 can include an imaging device (ToF camera, stereo camera, monocular camera, infrared camera, and the like) that images the driver, a biological information sensor that detects biological information of the driver, a microphone that collects sound in the vehicle interior, and the like. The biological information sensor is provided, for example, on a seat surface of a seat, a steering wheel, or the like, and can detect biological information of an occupant sitting on the seat or a driver gripping the steering wheel. Examples of the biological information of the driver include a heart rate, a pulse rate, a blood flow, respiration, brain waves, a skin temperature, a skin resistance, a sweating state, a head posture behavior, and an eyeball behavior (gaze, blink, saccade, microsaccade, fixation, drift, gaze, pupil response of iris, etc.). These pieces of biological information can be detected by using a potential between predetermined positions on a body surface of a driver or the like, a contact type observable signal such as a blood flow system using infrared light, a noncontact type observable signal using a noncontact type microwave, a millimeter wave, or a frequency modulation (FM) wave, detection of an eyeball behavior using a captured image of the eyeball by an imaging device (monitoring unit) using an infrared wavelength, overload torque measurement information of a steering device or a pedal steering device viewing steering responsiveness, or the like alone or in combination.

The communication unit 103 communicates with the in-vehicle device 104 and various devices outside the vehicle, a server, a base station, and the like, and can transmit data supplied from each functional unit of the vehicle control system 100 and supply received data to each functional unit of the vehicle control system 100. Note that, in the embodiment of the present disclosure, the communication protocol supported by the communication unit 103 is not particularly limited, and the communication unit 103 can support a plurality of types of communication protocols.

For example, the communication unit 103 can perform wireless communication with the in vehicle device 104 by wireless LAN, Bluetooth (registered trademark), near field communication (NFC), wireless universal serial bus (WUSB), or the like. Furthermore, for example, the communication unit 103 can perform wired communication with the in-vehicle device 104 by a USB, a high-definition multimedia interface (HDMI) (registered trademark), a mobile high-definition link (MHL), or the like via a connection terminal (and, if necessary a cable) not illustrated.

Moreover, for example, the communication unit 103 can communicate with a device (for example, an application server or a control server) existing on an external network (for example, the Internet, a cloud network, or a company-specific network) via a base station or an access point. Furthermore, for example, the communication unit 103 can communicate with a terminal (for example, a terminal of a pedestrian or a store, a terminal carried by the control officer, or a machine type communication (MTC) terminal) existing in the vicinity of the host vehicle using a peer to peer (P2P) technology. Moreover, for example, the communication unit 103 may perform V2X communication such as vehicle to vehicle communication, vehicle to infrastructure communication, vehicle to home communication, and vehicle to pedestrian communication. Furthermore, for example, the communication unit 103 may include a beacon receiving unit, receive radio waves or electromagnetic waves transmitted from a wireless station or the like installed on a road, and acquire information such as a current position, congestion, traffic restrictions, required time, or the like. Note that pairing with a forward traveling vehicle traveling in a section that can be a leading vehicle may be performed through the communication unit 103, information acquired from a data acquisition unit mounted on the forward vehicle may be acquired as prior traveling interval information, and complementary use may be performed to complement the data acquired by the data acquisition unit 102 of the host vehicle. In particular, it can be a means for securing safety of the subsequent platoon in platoon traveling by the leading vehicle or the like.

The in-vehicle device 104 can include, for example, a mobile device or a wearable device possessed by a passenger, an information device carried in or attached to the own vehicle, a navigation device that searches for a route to an arbitrary destination, and the like. Note that, considering that the occupant is not necessarily fixed at the seating fixing position due to the spread of the automatic driving, the in-vehicle device 104 can be expanded to a video player, a game device, or other devices that can be detachably used from the vehicle installation.

The output control unit 105 can control output of various types of information to a passenger of the own vehicle or the outside of the vehicle. For example, the output control unit 105 controls the output of the visual information and the auditory information from the output unit 106 by generating an output signal including at least one of the visual information (for example, image data) and the auditory information (for example, audio data) and supplying the output signal to the output unit 106. Specifically, for example, the output control unit 105 combines image data captured by different imaging devices included in the sensor unit 113 to generate a bird's-eye view image, a panoramic image, or the like, and supplies an output signal including the generated image to the output unit 106. Note that, in a case where such a bird's-eye view image, a panoramic image, or the like is generated, it is possible to reproduce a denser event by recording and storing an image before composition processing in an allowable use form. Furthermore, the recording and storage of the image before the composition processing depends on the storage of the availability information and the transmission load. Furthermore, for example, the output control unit 105 generates sound data including a warning sound, a warning message, or the like for danger such as collision, contact, or entry into a danger zone, and supplies an output signal including the generated sound data to the output unit 106.

The output unit 106 can include a device capable of outputting visual information or auditory information to a passenger of the own vehicle or the outside of the vehicle. For example, the output unit 106 includes a display device, an instrument panel, an audio speaker, a headphone, a wearable device such as a glasses-type display worn by a passenger, a projector, a lamp, and the like. The display device included in the output unit 106 may be a device that displays visual information in the field of view of the driver, such as a head-up display, a transmissive display, or a device having an augmented reality (AR) display function, in addition to a device having a normal display. Note that the output unit 106 can include various devices that give an olfactory stimulus (give a predetermined odor) or a tactile stimulus (providing cold air, providing vibration, providing electrical stimulation, and the like) to the driver in order to prompt arousal of the driver in a case where a deeper separation from the driving steering work of the driver occurs due to sleep or the like. Moreover, the output unit 106 may include a device or the like that gives bodily discomfort stimulation such as forcing the backrest of the driver's seat to move to a posture that gives discomfort to the driver.

Examples of particularly important information output means in recent lifestyle include a mobile phone, a smartphone, and a tablet device that a driver brings into a vehicle. Such a device can be used as a human machine interface (HMI) capable of confirming a series of information related to traveling provided by an application used by the driver without the driver moving his/her line of sight to the in-vehicle device. Therefore, in the present embodiment, input and output functions of these devices can also be regarded and handled in the same manner as vehicle-mounted devices.

The drive system control unit 107 can control the drive system 108 by generating various control signals and supplying the control signals to the drive system 108. Furthermore, the drive system control unit 107 may supply a control signal to each functional unit other than the drive system 108 as necessary to perform notification of a control status of the drive system 108 and the like.

The drive system 108 can include various devices related to the drive system of the host vehicle. For example, the drive system 108 includes a driving force generation device for generating a driving force such as an internal combustion engine or a driving motor, a driving force transmission mechanism for transmitting the driving force to wheels, a steering mechanism for adjusting a steering angle, a braking device for generating a braking force, an antilock brake system (ABS), an electronic stability control (ESC), an electric power steering device, and the like.

The body system control unit 109 can control the body system 110 by generating various control signals and supplying the control signals to the body system 110. Furthermore, the body system control unit 109 may supply a control signal to each functional unit other than the body system 110 as necessary, and may notify the control status of the body system 110 or the like.

The body system 110 can include various devices of a body system mounted on a vehicle body. For example, the body system 110 includes a keyless entry system, a smart key system, a power window device, a power seat, a steering wheel, an air conditioner, various lamps (for example, a head lamp, a back lamp, a brake lamp, a blinker, a fog lamp, and the like), and the like.

The storage unit 111 can include, for example, a read only memory (ROM), a random access memory (RAM), a magnetic storage device such as a hard disc drive (HDD), a semiconductor storage device, an optical storage device, a magneto-optical storage device, and the like. Furthermore, the storage unit 111 can store various programs, data, and the like used by each functional unit of the vehicle control system 100. For example, the storage unit 111 stores map data such as a three-dimensional high-precision map such as a dynamic map, a global map that is less accurate than the high-precision map and covers a wide area, and a local map including information around the host vehicle.

The automatic driving control unit 112 can perform control related to automatic driving such as autonomous traveling or driving assistance. Specifically, for example, the automatic driving control unit 112 performs cooperative control for the purpose of implementing a function of an advanced driver assistance system (ADAS) including collision avoidance or impact mitigation of the host vehicle, follow-up traveling based on an inter-vehicle distance, vehicle speed maintenance traveling, a collision warning of the host vehicle, a lane deviation warning of the host vehicle, or the like. Furthermore, for example, the automatic driving control unit 112 can perform cooperative control for the purpose of automatic driving or the like in which the vehicle autonomously travels without depending on the operation of the driver. Specifically, the automatic driving control unit 112 includes a detection unit 131, a self-position estimation unit 132, a situation analysis unit 133, a planning unit 134, and an operation control unit 135.

The detection unit 131 can detect various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 can perform detection processing of information outside the own vehicle on the basis of data or signals from each unit of the vehicle control system 100. For example, the vehicle exterior information detection unit 141 performs detection processing, recognition processing, and tracking processing of an object around the own vehicle, and detection processing of a distance to an object. Examples of the object to be detected include a vehicle, a person, an obstacle, a structure, a road, a traffic light, a traffic sign, a road sign, and the like.

Furthermore, for example, the vehicle exterior information detection unit 141 performs detection processing of an environment around the own vehicle. The surrounding environment to be detected includes, for example, weather, temperature, humidity, brightness, road surface conditions, and the like. For example, the vehicle exterior information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

Note that the information acquired by the vehicle exterior information detection unit 141 can be received mainly by the information supply by the infrastructure if the travel section is a section to which the constantly updated LDM is supplied from the infrastructure as a section in which the automatic driving travel can be mainly performed. Alternatively, the information can be received from a vehicle or a group of vehicles traveling ahead in the corresponding section in advance before entering the section. Furthermore, in the present embodiment, for example, when the latest LDM is not constantly updated by the infrastructure, in particular, for the purpose of obtaining road information immediately before the corresponding section in order to execute safe section entry in platooning or the like, the vehicle exterior information detection unit 141 may receive the road environment information via the leading vehicle that has previously entered the corresponding section. Whether the section is a section in which automatic driving is possible is often determined by the presence or absence of prior information provided from the infrastructure corresponding to the corresponding section. The fresh LDM, which can be updated at any time and constitutes the automatic driving traveling propriety information on the route provided by the infrastructure, behaves as if providing an "invisible trajectory" although it is so-called "information". Note that, in the present specification, for the sake of convenience, the vehicle exterior information detection unit 141 is illustrated and described on the assumption that it is mounted on the own vehicle and directly receives information from the infrastructure, but the present invention is not limited thereto. For example, by receiving and using information that the preceding vehicle has regarded as "information", the vehicle exterior information detection unit 141 can further improve the prior predictability of danger or the like that may occur during traveling in the present embodiment.

The vehicle interior information detection unit 142 can perform detection processing of in-vehicle information on the basis of data or signals from each functional unit of the vehicle control system 100. For example, the vehicle interior information detection unit 142 performs a driver authentication process and a recognition process, a driver state detection process, a passenger detection process, a vehicle interior environment detection process, and the like. The state of the driver to be detected includes, for example, a physical condition, an arousal level, a concentration level, a fatigue level, a line-of-sight direction, an eyeball detailed behavior, and the like. The environment in the vehicle to be detected includes, for example, temperature, humidity, brightness, odor, and the like. The vehicle interior information detection unit 142 supplies data indicating a result of the detection processing to the situation recognition unit 153 of the situation analysis unit 133, the emergency avoidance unit 171 of the operation control unit 135, and the like. Note that, for example, in a case where it is determined that the manual driving cannot be achieved within a predetermined expiration time by the driver after the driver is notified of a request to intervene (RTI) to return to the manual driving, and it is determined that the return to the manual driving cannot be made in time even if the deceleration control is performed and the time is postponed, the vehicle interior information detection unit 142 may issue an instruction to the emergency avoidance unit 171 or the like to decelerate the vehicle and start the evacuation/stop procedure in order to evacuate the vehicle.

Moreover, as described above, since it is also assumed that the driver completely leaves the driving steering work, there is a possibility that the driver temporarily dozes off or starts another work (secondary task). Therefore, it is required to grasp how much the recovery of consciousness necessary for returning to driving has progressed. Therefore, the above described vehicle interior information detection unit 142 mainly has two major roles, the first role is passive monitoring of the state of the driver during driving, and the second role is active monitoring that detects and determines whether or not the driver is at the return reaction level at which the manual driving is possible by the conscious response of the driver after the notification of the return request RTI to the manual driving.

Furthermore, the vehicle state detection unit 143 can perform detection processing of the state of the vehicle (host vehicle) on the basis of data or signals from each unit of the vehicle control system 100. The state of the host vehicle to be detected includes, for example, speed, acceleration, a steering angle, presence/absence and contents of abnormality, a state of driving operation, a position and inclination of a power seat, a state of the door lock, and a state of other in-vehicle devices. The vehicle state detection unit 143 supplies data indicating a result of the detection process to the situation recognition unit 153 of the situation analysis unit 133, the emergency avoidance unit 171 of the operation control unit 135, and the like.

Note that the state of the vehicle (host vehicle) to be recognized can include, for example, a cargo loading amount that determines the position, posture, and movement (for example, speed, acceleration, moving direction, and the like) of the vehicle (host vehicle) and the motion characteristics of the vehicle (host vehicle), movement of the center of gravity of the vehicle body accompanying the cargo loading, tire pressure, allowable maximum deceleration braking for preventing cargo movement caused by the cargo braking, centrifugal relaxation limit speed during curve traveling accompanying the liquid loaded object, and the like. Note that, in the present embodiment, the return start timing required for the control of the vehicle is different even in the completely same road environment due to the vehicle specific condition, the loaded cargo specific condition, and the like, and in addition, the friction coefficient of the road surface, the road curve, the gradient, and the like. Therefore, in the present embodiment, it is required to collect and learn these various conditions and always reflect the learning result in the estimation of the optimal timing for performing control.

Under what conditions, in what range, and how the automatic driving is allowed to be used are considered to be more specifically determined in detail in the future on the basis of the influence of road congestion at the time of use, an inducement factor of a rear-end accident, and the like. Furthermore, the usage mode of automatic driving may also include operation of automatic driving in combination with direct assistance or indirect assistance in accordance with the driver's or passenger's current situation, such as primary direct steering of the vehicle by a remote remote operator, or partial travel guidance assistance for assisting and guiding traveling by pairing with a leading traveling vehicle. Since the appropriate operation of the automatic driving is not limited to the use of the mounted devices of these vehicles, the information recorded in the present embodiment may not be limited to the information regarding the corresponding vehicle or the driver.

The self-position estimation unit 132 can perform estimation processing of the position, posture, and the like of the vehicle (host vehicle) on the basis of data or signals from each functional unit of the vehicle control system 100 such as the vehicle exterior information detection unit 141 and the situation recognition unit 153 of the situation analysis unit 133. Furthermore, the self-position estimation unit 132 can generate a local map (Hereinafter, referred to as a self-position estimation map) used for estimating the self-position as necessary.

The self-localization map is, for example, a highly accurate map using a technique such as simultaneous localization and mapping (SLAM). The self-position estimation unit 132 supplies data indicating a result of the estimation processing to the map analysis unit 151, the traffic rule recognition unit 152, the situation recognition unit 153, and the like of the situation analysis unit 133. Furthermore, the self-position estimation unit 132 can also store the self-position estimation map in the storage unit 111.

The situation analysis unit 133 can perform analysis processing of the situation of the vehicle (host vehicle) and the surroundings. The situation analysis unit 133 includes the map analysis unit 151, the traffic rule recognition unit 152, the situation recognition unit 153, and a situation prediction unit 154.

The map analysis unit 151 performs analysis processing of various maps stored in the storage unit 111 while using data or signals from each functional unit of the vehicle control system 100 such as the self-position estimation unit 132 and the vehicle exterior information detection unit 141 as necessary, and can construct a map including information necessary for automatic driving processing. The map analysis unit 151 supplies the constructed map to the traffic rule recognition unit 152, the situation recognition unit 153, the situation prediction unit 154, and a route planning unit 161, an action planning unit 162, an operation planning unit 163, and the like of the planning unit 134.

The traffic rule recognition unit 152 can perform recognition processing of traffic rules around the vehicle (host vehicle) on the basis of data or signals from each unit of the vehicle control system 100 such as the self-position estimation unit 132, the vehicle exterior information detection unit 141, and the map analysis unit 151. By this recognition processing, for example, a position and a situation of a signal around the vehicle (host vehicle), a content of a traffic regulation around the host vehicle, a lane on which the host vehicle can travel, and the like are recognized. The traffic rule recognition unit 152 supplies data indicating a result of the recognition processing to the situation prediction unit 154 and the like.

The situation recognition unit 153 can perform recognition processing of a situation related to the vehicle (host vehicle) on the basis of data or signals from each functional unit of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs recognition processing of a situation of the vehicle (host vehicle), a situation around the vehicle (host vehicle), a situation of a driver of the vehicle (host vehicle), and the like. Furthermore, the situation recognition unit 153 generates a local map (Hereinafter, referred to as a situation recognition map) used to recognize the situation around the vehicle (host vehicle) as necessary. The situation recognition map can be, for example, an occupancy grid map. Furthermore, the situation recognition unit 153 supplies data (A situation recognition map is included as necessary) indicating a result of the recognition processing to the self-position estimation unit 132, the situation prediction unit 154, and the like. Furthermore, the situation recognition unit 153 stores the situation recognition map in the storage unit 111.

The situation prediction unit 154 can perform prediction processing of a situation related to the vehicle (host vehicle) on the basis of data or signals from each unit of the vehicle control system 100 such as the map analysis unit 151, the traffic rule recognition unit 152, and the situation recognition unit 153. For example, the situation prediction unit 154 performs prediction processing of a situation of the vehicle (host vehicle), a situation around the vehicle (host vehicle), a situation of the driver, and the like. Note that the situation of the vehicle (host vehicle) to be predicted includes, for example, behavior of the vehicle (host vehicle), occurrence of abnormality, a travelable distance, and the like. The situation around the vehicle (own vehicle) to be predicted includes, for example, behavior of an animal body around the vehicle (own vehicle), a change in a signal state, a change in environment such as weather, and the like. The situation of the driver to be predicted includes, for example, the behavior and physical condition of the driver. Then, the situation prediction unit 154 supplies data indicating a result of the prediction processing together with the data from the traffic rule recognition unit 152 and the situation recognition unit 153 to the route planning unit 161, the action planning unit 162, the operation planning unit 163, and the like of the planning unit 134.

The route planning unit 161 can plan a route to a destination on the basis of data or signals from each functional unit of the vehicle control system 100 such as the map analysis unit 151 and the situation prediction unit 154. For example, the route planning unit 161 sets a route from the current position to a designated destination on the basis of the global map. Furthermore, the route planning unit 161 sets an automatic driving level for each section on the travel route on the basis of the LDM or the like. Furthermore, for example, the route planning unit 161 may appropriately change the route on the basis of a situation such as a traffic jam, an accident, a traffic restriction, a construction, a physical condition of the driver, and the like. The route planning unit 161 supplies data indicating the planned route to the action planning unit 162 and the like.

The action planning unit 162 can plan an action of the vehicle (host vehicle) for safely traveling the route planned by the route planning unit 161 within a planned time on the basis of data or signals from each functional unit of the vehicle control system 100 such as the map analysis unit 151 and the situation prediction unit 154. For example, the action planning unit 162 performs planning of start, stop, traveling direction (for example, forward movement, backward movement, left turn, right turn, direction change, and the like), traveling lane, traveling speed, overtaking, and the like. The action planning unit 162 supplies data indicating the planned action of the vehicle (host vehicle) to the operation planning unit 163 and the like.

The operation planning unit 163 can plan an operation of the vehicle (host vehicle) for realizing the action planned by the action planning unit 162 on the basis of data or signals from each functional unit of the vehicle control system 100 such as the map analysis unit 151 and the situation prediction unit 154. For example, the operation planning unit 163 plans acceleration, deceleration, a travel trajectory, and the like. Furthermore, the operation planning unit 163 can plan setting of an operation mode, timing of executing switching, and the like. The operation planning unit 163 supplies data indicating the planned operation of the vehicle (host vehicle) to an acceleration/deceleration control unit 172, a direction control unit 173, and the like of the operation control unit 135.

The operation control unit 135 can control the operation of the vehicle (host vehicle). The operation control unit 135 includes the emergency avoidance unit 171, the acceleration/deceleration control unit 172, and the direction control unit 173.

The emergency avoidance unit 171 can perform processing of detecting an emergency such as collision, contact, entry into a danger zone, abnormality of the driver, abnormality of the vehicle, or the like on the basis of detection results of the vehicle exterior information detection unit 141, the vehicle interior information detection unit 142, and the vehicle state detection unit 143. When detecting the occurrence of an emergency, the emergency avoidance unit 171 plans an operation of the vehicle for avoiding an emergency such as a sudden stop or a sudden turn. The emergency avoidance unit 171 supplies data indicating the planned operation of the vehicle to the acceleration/deceleration control unit 172, the direction control unit 173, and the like.

The acceleration/deceleration control unit 172 can perform acceleration/deceleration control for realizing the operation of the vehicle (host vehicle) planned by the operation planning unit 163 or the emergency avoidance unit 171. For example, the acceleration/deceleration control unit 172 calculates a control target value of the driving force generation device or the braking device for realizing planned acceleration, deceleration, or sudden stop, and supplies a control command indicating the calculated control target value to the drive system control unit 107. Note that, for example, there are mainly two cases in which an emergency situation may occur. One is a case where an unexpected accident occurs due to an unexpected reason during automatic driving on a road that is originally safe by LDM or the like in a traveling route in the automatic driving mode, and the driver cannot make an emergency return in time. The other is a case where it is difficult to switch from the automatic driving mode to the manual driving mode due to some factors.

The direction control unit 173 can perform direction control for realizing the operation of the vehicle (host vehicle) planned by the operation planning unit 163 or the emergency avoidance unit 171. For example, the direction control unit 173 calculates a control target value of the steering mechanism for realizing the traveling trajectory or the sudden turn planned by the operation planning unit 163 or the emergency avoidance unit 171, and supplies a control command indicating the calculated control target value to the drive system control unit 107.

Figure 4:
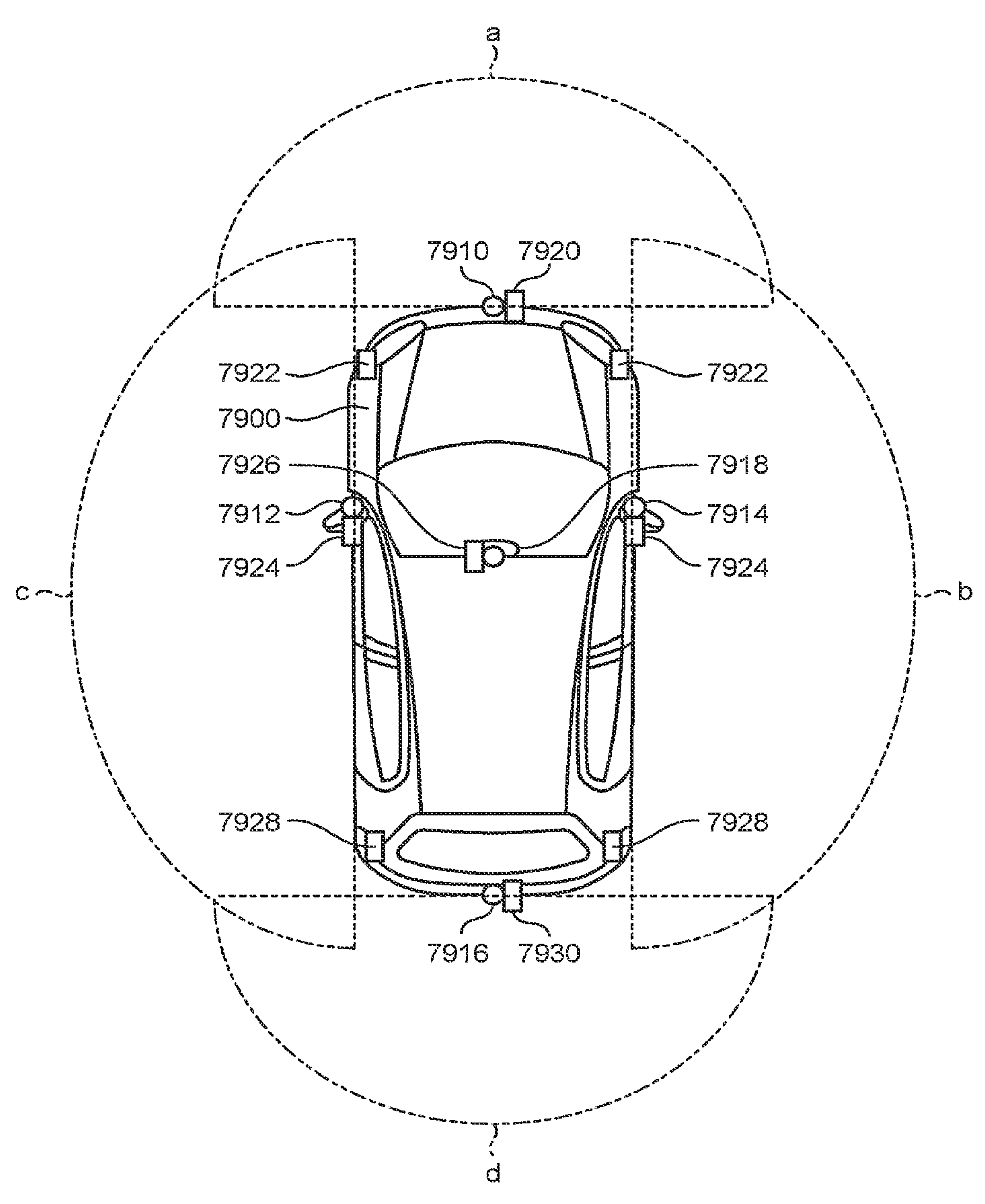
FIG. 4 is an explanatory diagram for explaining an example of an installation position of an imaging device included in a sensor unit 113 according to the embodiment of the present disclosure.

Furthermore, an example of an installation position of the imaging device included in the sensor unit 113 will be described with reference to FIG. 4. FIG. 4 is a diagram illustrating an example of an installation position of an imaging device included in the sensor unit 113. Imaging units 7910, 7912, 7914, 7916, and 7918 to which the imaging devices can be applied illustrated in FIG. 4 are provided at at least one of, for example, a front nose, a side mirror, a rear bumper, a back door, or an upper portion of a windshield in a vehicle interior of a vehicle 7900.

The imaging unit 7910 installed at the front nose and the imaging unit 7918 installed at the upper portion of the windshield in the vehicle interior mainly acquire images in front of the vehicle 7900. The imaging units 7912 and 7914 installed on the side mirrors mainly acquire images of the sides of the vehicle 7900. The imaging unit 7916 installed on the rear bumper or the back door mainly acquires an image behind the vehicle 7900. The imaging unit 7918 installed on the upper part of the windshield in the vehicle interior is mainly used to detect a preceding vehicle, a pedestrian, an obstacle, a traffic light, a traffic sign, a lane, or the like. Further, in the future automatic driving, when the vehicle turns right or left, a pedestrian crossing a right or left turning destination road in a wide area or even a range of an approaching object on a crossing road may be expanded and used.

Note that FIG. 4 illustrates an example of imaging ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, respectively, and an imaging range d indicates an imaging range of the imaging unit 7916 provided at the rear bumper or the back door. For example, by superimposing image data captured by the imaging units 7910, 7912, 7914, and 7916, a bird's-eye view image of the vehicle 7900 viewed from above is obtained. For example, by superimposing image data captured by the imaging units 7910, 7912, 7914, and 7916, a bird's-eye view image of the vehicle 7900 viewed from above, an all-around stereoscopic display image surrounding the periphery of the vehicle with a curved plane, and the like can be obtained.

Vehicle exterior information detection units 7920, 7922, 7924, 7926, 7928, and 7930 provided at the front, rear, sides, corners, and the upper portion of the windshield in the vehicle interior of the vehicle 7900 may be ultrasonic sensors or radar devices, for example. The vehicle exterior information detection units 7920, 7926, and 7930 provided at the front nose, the rear bumper, the back door, and the upper portion of the windshield in the vehicle interior of the vehicle 7900 may be, for example, LiDAR devices. These vehicle exterior information detection units 7920 to 7930 are mainly used for detecting a preceding vehicle, a pedestrian, an obstacle, or the like. These detection results may be further applied to three-dimensional object display improvement of the bird's-eye view display and the all-around three-dimensional object display.

5. Embodiments

<5.1 Data Recording System>

Figure 5:
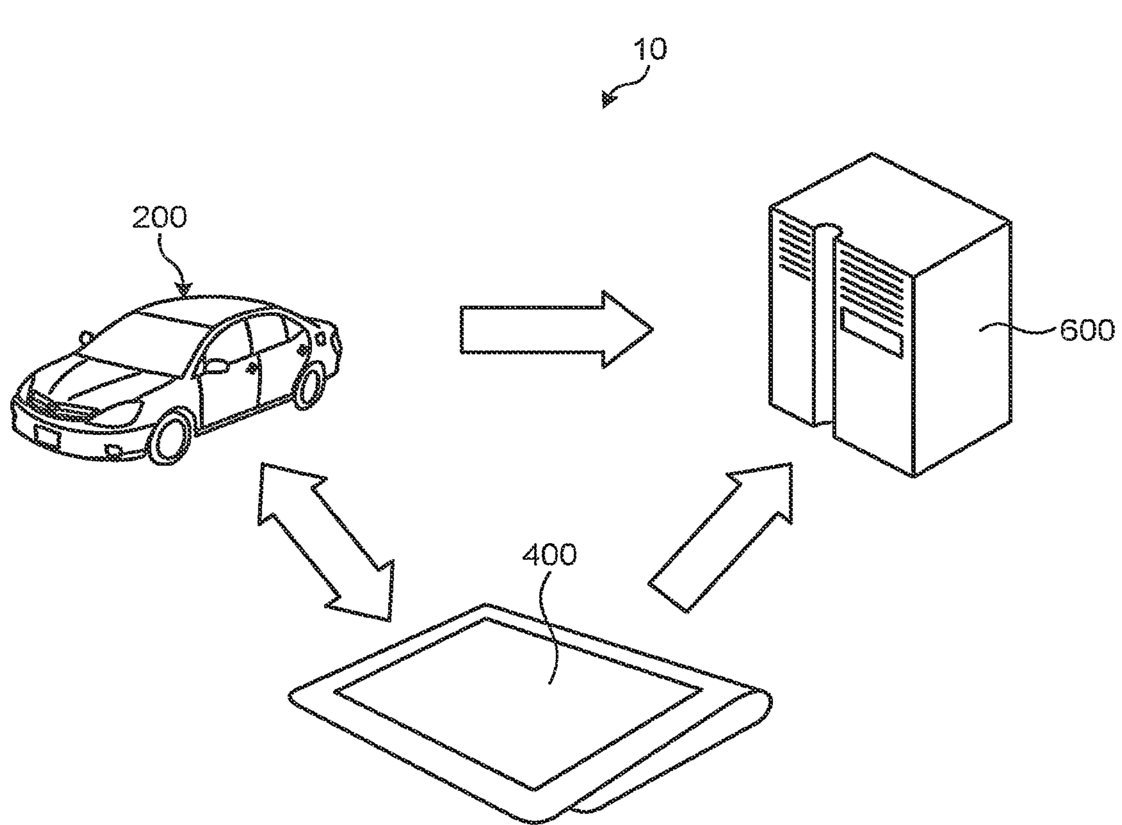
FIG. 5 is a system diagram illustrating a schematic configuration of a data recording system 10 according to the embodiment of the present disclosure.

First, with reference to FIG. 5, a schematic configuration of a data recording system 10 according to an embodiment of the present disclosure will be described, which is used in a basic crackdown procedure of the control officer in a case where the control is performed on the use of the automatic driving function outside the permitted range in mixed traffic in which a vehicle that performs manual driving travel and a vehicle that performs automatic driving travel exist. FIG. 5 is a system diagram illustrating a schematic configuration of the data recording system 10 according to the present embodiment. As illustrated in FIG. 5, the data recording system 10 according to the present embodiment can include, for example, a data recording device (information processing device) 200 mounted on a vehicle, a terminal (information processing terminal) 400 carried by a control officer, and a server 600. The data recording device 200, the terminal 400, and the server 600 can communicate with each other via various wireless communication networks. Note that the number of data recording devices 200, terminals 400, and servers 600 included in the data recording system 10 according to the present embodiment is not limited to the number illustrated in FIG. 5, and may be larger. Hereinafter, an outline of each device included in the data recording system 10 according to the present embodiment will be described.

(Data Recording Device 200)

The data recording device 200 is assumed to be a device (for example, the DSSAD) that is mounted on a vehicle, records information necessary for confirming various states including actions, states, and the like of a driver, and can output the information to the terminal 400 described later.

Specifically, the data recording device 200 can be a computer mounted on a vehicle, and may be incorporated in the vehicle control system 100 described above. In the present specification, the data recording device 200 is expressed as a data recording device, but its function is not limited to recording, and may include a series of determination processing functions for controlling the automatic driving control unit 112. That is, in the present embodiment, the data recording device 200 can be a multifunctional device having a function of holding and determining a series of information related to the availability of the automatic driving, but is described as a storage device for convenience as a representative embodiment. Note that a detailed configuration of the data recording device 200 will be described later.

(Terminal 400)

The terminal 400 is used when a control officer or the like browses information indicating whether or not it is a section in which the use of the automatic driving is permitted from the behavior of the driver or the situation of the equipment or the like of the vehicle. For example, the terminal 400 can be, for example, a tablet type terminal or a smartphone type terminal carried by the control officer, a mobile phone such as a feature phone, or a wearable device such as an HMD or a smart watch that can be worn on the body of the control officer. Alternatively, the terminal 400 may be an in-vehicle device mounted on a vehicle on which the control officer rides. However, in the present embodiment, the terminal 400 is preferably a tablet terminal. In this case, since the input can be performed via the touch panel superimposed on the display surface, the display screen can be made wider, and the control officer can select various types of information and efficiently check the response state of the driver, the state of the device, the road information at each time, and the like. Note that the terminal 400 has an information reception function, a selective decryption browsing function, a remote server transmission function, and the like, and a detailed configuration thereof will be described later.

(Server 600)

The server 600 is a computer that has a function of storing information transmitted from a vehicle as a part of operation management of the vehicle and a user, and can acquire, store, and confirm information transmitted directly or via the terminal 400 upon receiving an instruction from a control officer as one use of the server. For example, the server 600 is a device that stores accident information and violation control information, is installed in a police station, a court, an external infrastructure environment under the control of the police station and the court, and the like, and finally receives and stores a record of an operation of a driver, an accurate state of the vehicle control system 100 and the like, information, moving image information, and the like. That is, on the basis of the information transmitted and stored in the server 600, the information can be used for confirmation work of a penalty such as a violation, and can be used for the purpose of confirming a situation at the time of processing of imposing a penalty such as a fine on the driver, and in addition, in combination with a selective decryption function of the information, in a case where confirmation of a violation act or a public key necessary for decryption by the driver dissatisfied with the violation designation is provided as necessary, the information can be used by limiting to video confirmation including excessive personal information for the purpose of verifying and confirming that the violation designation is false. According to the present embodiment, it is possible to operate to prevent information including a large amount of personal information from being diverted for other purposes or from being widely disclosed without impairing the enforceability of the penalty.

<5.2 Basic Crackdown Procedure of Control Officer>

Figure 6:
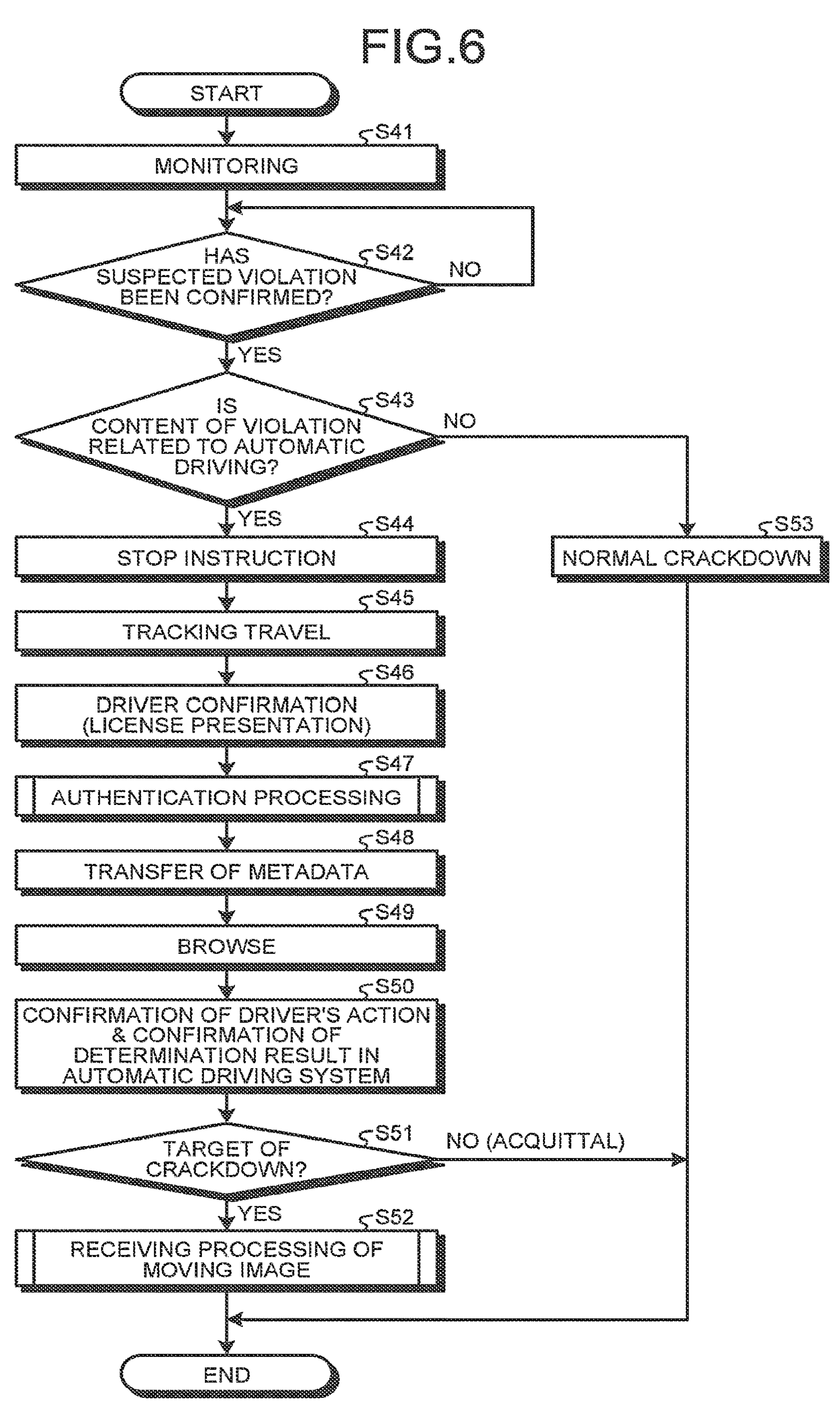
FIG. 6 is a flowchart illustrating an example of a flow of a crackdown by a control officer in the embodiment of the present disclosure.

First, with reference to FIG. 6, an example of a basic crackdown procedure of the control officer in a case where a vehicle of automatic driving traveling is present in the embodiment of the present disclosure will be described. FIG. 6 is a flowchart for explaining an example of a flow of a crackdown by a control officer in the present embodiment. Specifically, as illustrated in FIG. 6, the basic work of the control officer according to the present embodiment can mainly include a plurality of steps from Step S41 to Step S53. Details of each of these steps will be described below.

First, the control officer gets a patrol car or the like and travels to monitor whether there is a vehicle to be controlled (Step S41). When the control officer confirms there is a vehicle to be controlled due to suspected violation (Step S42: Yes), the process proceeds to Step S43, and when the control officer does not confirm the act suspected of the violation to be controlled (Step S42: No), the process returns to Step S41 and continues monitoring.

Next, the control officer determines whether the act suspected of the violation is related to the automatic driving (Step S43). When the control officer determines that the act suspected of the violation is related to the automatic driving (Step S43: Yes), the process proceeds to Step S44, and when the control officer determines that the act suspected of the violation is not related to the automatic driving (Step S43: No), the process proceeds to Step S53.

The control officer instructs the driver who has performed the act suspected of the violation to stop the vehicle (Step S44). Moreover, the control officer continues tracking travel of the vehicle driven by the driver who has performed the act suspected of the violation (Step S45).

The control officer requests the driver of the vehicle stopped in accordance with the stop instruction to present the driver's license, and checks the driver (Step S46). At this time, for example, the control officer may instruct the driver to hold the driver's license over a terminal 400 (see FIG. 8) to be described later, or the control officer may receive the driver's license and cause a device to read the driver's license while performing identification of the driver.

The terminal 400 reads information from the driver's license, performs authentication with the data recording device 200 (see FIG. 7) mounted on the vehicle driven by the driver by using the read information (common key A), and establishes mutual communication (pairing) (Step S47). In the present embodiment, the terminal 400 and the data recording device 200 can perform short-range communication such as wireless LAN, Bluetooth (registered trademark), or Wi-Fi. Note that details of the step will be described later.

In the present embodiment, the authentication is performed using the driver's license carried by the driver, and the terminal 400 that can receive the transmission of the information from the data recording device 200 is restricted, so that the security of the transmitted information can be secured. Furthermore, since the driver can intuitively recognize the terminal 400 of a transfer destination by performing the action of holding the driver's license, a sense of security that information regarding his/her driving or an unnecessary individual in the passenger compartment which is not related to driving is not transferred to a third party may occur. Note that, in the present embodiment, the authentication is not limited to the authentication using the driver's license. For example, the authentication may be performed using an encryption key individually set by an individual as long as the information can identify the individual such as the driver, and the authentication is not particularly limited as long as the information can be used at the time of encryption/decryption of the information.

The terminal 400 receives transfer of information from the data recording device 200 (Step S48). The control officer browses the transferred information using the terminal 400 (Step S49). In the present embodiment, the information browsed by the control officer is metadata obtained by abstracting a moving image or the like (detailed information) capturing the movement, posture, or the like of the driver before the vehicle is stopped, which is necessary for determining whether or not the crackdown can be performed, and a specific example of the metadata will be described later. Moreover, the information browsed by the control officer also includes ODD, which is setting information of the automatic driving level at each time, which is allowed for the corresponding vehicle in accordance with the performance of the vehicle control system 100 and various devices for automatic driving, and various determination conditions such as a road environment and a weather, which are necessary for determining whether or not the crackdown can be performed.

According to the present embodiment, the information to be browsed by the control officer is not a moving image itself that is highly likely to include the personal information of the driver, but metadata that is information obtained by abstracting the moving image and suppressing only the action of the driver or the like to an information amount that can be confirmed, whereby the personal information of the driver can be protected. In addition, according to the present embodiment, by using the metadata in which the amount of information is suppressed, it is possible to suppress an increase in the amount of data transmitted and received between the data recording device 200 and the terminal 400. Therefore, it is possible to transmit and receive, at a high speed, information by which an action or the like of the driver at a time when determination of start of a crackdown is made or an action or the like of the driver in a previous period can be checked backward.

Note that, in the present embodiment, in a case where the driver himself/herself desires to reproduce the detailed information such as his/her own moving image, the detailed information such as the moving image may be reproduced instead of reproducing the metadata. However, in the present embodiment, since the moving image includes not only an excessive amount of information but also a large amount of information that is unnecessary to be disclosed in the crackdown, such as personal information, it is preferable to limit browsing against the intention of the driver even when browsing is performed by the control officer. Therefore, it is preferable to perform encryption management on the moving image and the like individually, and it is preferable to prevent browsing and transfer use of information to a third party unless the driver provides a public key necessary for decryption.

Next, the control officer checks the action of the driver and the like and the automatic driving level permitted in the vehicle control system 100 (Step S50). In the present embodiment, since the secondary task allowed for the driver differs for each allowed automatic driving level (ODD), the control officer can determine whether or not the driver is performing a violation act by confirming the ODD and the metadata indicating the operation or the like of the driver in the time zone (alternatively, the traveling position) corresponding to the ODD.

The control officer determines whether or not the act suspected of the violation is a target of the crackdown (Step S51). The control officer proceeds to Step S52 when determining that the act suspected of the violation is the target of the crackdown (Step S51: Yes), and terminates the crackdown act when not determining that the act suspected of the violation is the target of the crackdown, that is, when the evaluation result for the driver action is within the range of the permitted use of automatic driving based on the metadata at the time when the violation is suspected backward (Step S51: No).

In the present embodiment, in order to confirm the detailed information related to the violation, the control officer can also confirm the action of the driver by a method to be described later using more detailed information than the metadata. Specifically, processing for receiving the detailed information from the data recording device 200 is performed (Step S52). In the present embodiment, not only the metadata described above but also a key necessary for decryption of an encrypted moving image or the like as described later can be provided to the control officer as special use instead of a normal use mode, and the control officer can browse detailed information of the moving image or the like at the crackdown site by acquiring such a key. The purpose of such special use is for a driver who is aware that he/she is not breaking the law to present his/her own defense against the crackdown and its legitimacy on the site even if the control officer performs the crackdown by erroneous determination based on the metadata. Furthermore, if a third party unnecessarily browses and checks detailed information (a moving image or the like), there is a risk of violating the Personal Information Protection Law. Therefore, in the present embodiment, it is preferable that the common key necessary for decryption, transmission, duplication permission, and the like of the detailed information is managed by an individual driver, and details thereof will be described later. Therefore, according to the present embodiment, since it is possible to determine whether or not there is a strict violation afterwards, it is possible to prevent an erroneous crackdown by the control officer. Details of the step will be described later. Thereafter, the control officer terminates the crackdown act.

The control officer executes the same crackdown as the crackdown on the manually driven vehicle or the like (Step S53). Thereafter, the control officer terminates the crackdown act.

Note that the basic crackdown procedure of the control officer illustrated in FIG. 6 is merely an example, and the crackdown procedure of the control officer in the present embodiment is not limited to the procedure illustrated in FIG. 6.

<5.3 Data Recording Device>

Next, a detailed configuration of the data recording device 200 according to the present embodiment will be described with reference to FIG. 7. FIG. 7 is a block diagram illustrating an example of a configuration of the data recording device 200 according to the present embodiment. Specifically, as illustrated in FIG. 7, the data recording device 200 mainly includes an information acquisition unit 202, an input unit 204, an imaging unit/sensor unit/operation unit 206, a storage unit 208, a generation unit 210, an encryption unit (second encryption unit) 212, an encryption unit (first encryption unit) 214, a storage unit 216, a storage unit 218, an output unit 220, an output unit 222, an information acquisition unit 224, a determination unit 226, a notification unit 228, a vehicle exterior notification unit 230, and an action determination unit 231. Hereinafter, each functional block of the data recording device 200 will be sequentially described.

(Information Acquisition Unit 202)

The information acquisition unit 202 can acquire information for a common key A (first common key) used in encryption units 212 and 214 to be described later, and output the acquired information to the encryption units 212 and 214. The common key A is not particularly limited as long as it is information that can identify an individual such as a driver and can be used for encryption/decryption. For example, the common key A can be a driver's license number associated with the driver, identification information associated with the driver (Individual number, passport number, cash card number, health card number, employee number, student number, and the like), and identification information associated with a terminal (smartphone) carried by the driver (telephone number, IP address). Alternatively, the common key A may be biometric information that can identify each driver, and may be, for example, information of a face, a fingerprint, a palm print, a vein, a blink, an iris of a pupil, a voiceprint, a lip, and an uneven shape of an ear (including information of a feature amount extracted therefrom). In the present embodiment, by using such information as the common key A, the security of the information (for example, a moving image of a driver or metadata obtained from the moving image) output from the data recording device 200 can be enhanced, and such information can be protected in a form conforming to the EU General Data Protection Regulation (GDPR). In an actual operation procedure of the crackdown, the police officer requests the driver to present the driver's license. Therefore, by storing the common key A in combination with the driver's license number as the electronic record information of the driver's license in a medium or the like mounted on the driver's license, it is possible to efficiently perform authentication of information communication and determination of availability of browsing by decryption without violating the GDPR.

Note that, in the present embodiment, it is preferable to acquire information such as usage restriction of the automatic driving function permitted by the driver together with the common key A. For example, the information may be read from a medium mounted on a driver's license, or may be acquired from another server (not illustrated) on the cloud using the read common key A. Then, the acquired information may be transferred to the terminal 400 together with the moving image, metadata, and the like of the driver. Note that, in the present embodiment, if data falsification is performed at the time of encryption and transmission of information, the effectiveness of functions and operations may be impaired. Therefore, it is preferable to perform the falsification prevention process together. Furthermore, while the driver uses the automatic driving, an allowable automatic driving level is changed according to an environmental condition and a return state of the driver, and the vehicle control system 100 may erroneously recognize the originally unacceptable use, or the determination of whether or not the normal automatic driving can be used may be impaired due to shielding of a field of view or the like installed in a camera or the like so that action recording cannot be performed. Therefore, in the present embodiment, the vehicle control system 100 may separately detect an interference act or the like by the driver (user) and record the detected information together with the metadata or the like.

(Input Unit 204)

The input unit 204 can receive an input of a common key B (second common key) used by the encryption unit 212 to be described later, and output the received information to the encryption unit 212. The common key B is not particularly limited as long as it is information that can be known only by the driver. In the present embodiment, by using such information as the common key B, the security of the information (For example, a moving image of the driver) output from the data recording device 200 can be enhanced, and the information can be protected in compliance with the EU General Data Protection Regulation.

Note that, in the above description, the moving image of the driver is taken as an example of the detailed information including many personal information, but there are a wide variety of information examples in which general access is not desired according to the EU General Data Protection Regulation and the like. Therefore, in the present embodiment, other types of information and the like that affect driving may be recorded as detailed information, and examples thereof include a static/moving image obtained by photographing the surroundings of the vehicle such as a traveling road, a traveling action route history, a detailed behavior of a finger at the time of terminal operation, lip reading information of the driver, and an estimated health condition report of the driver. In the present embodiment, it is preferable that these pieces of information are also encrypted and stored.

Furthermore, in the present embodiment, at the time of conversion into metadata, the personal information such as a conversation may be prevented from being browsed by a third party by being replaced with dummy data that can be classified into the same category as the evaluation, and at that time, processing of preventing falsification of metadata may be simultaneously performed. For example, in order to prevent the browsing of the character input content by the character input operation of the driver to the mobile terminal, the data of the operation vector of the driver may be replaced with different vectors, and the dummy metadata in which the content cannot be determined may be generated. Alternatively, for example, the data may be replaced with another data as if there is no character input operation or there is no conversation content.

Furthermore, when the vehicle used by an individual driver is, for example, a vehicle owned by the driver or a leased vehicle on the premise that a specific individual continuously uses the vehicle, the common key B necessary for encryption or demodulation/decryption of encryption can be stored in a recording medium mounted on the vehicle in association with personal authentication. On the other hand, in a business vehicle such as a taxi or a bus in which a rental car or a driver change is generally performed, it is assumed that an unspecified number of people share the business vehicle. In such a usage mode, the common key B may be stored in an external server (not illustrated) or the like in association with driver authentication. In the above description, for convenience, the input unit 204 is described as a unit that inputs the common key B when the driver uses the common key B for the first time. However, in the present embodiment, the common key B is not necessarily input to the input unit 204 every time the common key B is used. For example, instead of the input, the common key B may be acquired from an external server at the start of use of the vehicle.

(Imaging Unit/Sensor Unit/Operation Unit 206)

The imaging unit/sensor unit/operation unit 206 can acquire a moving image of the driver, and detailed information regarding a state of the occupant regarding a position, a posture, a direction of a face, an action, a line of sight, a detailed behavior of a line of sight, an arousal level, an alcohol level, and the like of the driver, and output the acquired detailed information to the storage unit 208 and the generation unit 210 described later. Specifically, the imaging unit/sensor unit/operation unit 206 can be an imaging device that images the driver, a biological information sensor that acquires biological information of the driver, a position and posture sensor that detects the position and posture of the driver, an input device that receives an operation by the driver, a sound collection sensor that acquires speech sound of the driver, or the like. More specifically, the imaging device (not illustrated) and the position and posture sensor (not illustrated) can be, for example, a monocular camera, a stereo camera, an infrared camera, a ToF camera, a seat strain gauge, or the like. Furthermore, the biological information sensor can be various sensors that measure the driver's heart rate, pulse, blood pressure, electroencephalogram, respiration, perspiration, myoelectric potential, skin temperature, skin electrical resistance, eye potential, and the like. The input device may be an operation device such as a steering wheel operated by the driver to steer the vehicle, a keyboard, a mouse, a microphone, or the like for inputting other information.

(Storage Unit 208)

The storage unit 208 can temporarily store detailed information such as a moving image of the driver acquired by the imaging unit/sensor unit/operation unit 206 described above. Furthermore, data such as an image stored in the storage unit 208 is acquired by the generation unit 210 and the encryption unit 212 described later.

(Generation Unit 210)

The generation unit 210 can acquire the detailed information (for example, a moving image of the driver or the like) from the storage unit 208 and generate the metadata from the detailed information. The metadata is data obtained by extracting, from the detailed information, a feature of information (For example, the posture of the driver, the direction of the face, the line-of-sight direction, the position of the hand, the motion, the arousal level, and the like) that indicates a content of a steering operation or a non-steering operation of the driver and is used for determining whether or not to perform control, and abstracting the feature so as to ensure privacy. More specifically, the metadata may be, for example, a moving image of an avatar, a moving image of a skeleton model, or the like as an alternative to the driver without a background, or may include information that enables generation of at least one of the moving image of the avatar or the moving image of the skeleton model. Furthermore, the generation unit 210 can output the generated metadata to the encryption unit 214. In the present embodiment, by using the metadata, which is the information suppressed to limit the information amount to the extent that only the movement, the posture, the line-of-sight direction, and the like of the driver can be confirmed, for the determination of the crackdown, it is possible to avoid providing information not related to the patrol to the control officer, such as information around the driver, information on fellow passengers of the driver, and specific information on objects held by the driver. That is, in the present embodiment, the personal information of the driver can be protected by using such metadata. Moreover, according to the present embodiment, by using the metadata in which the amount of information is suppressed, it is possible to suppress an increase in the amount of data transmitted and received between the data recording device 200 and the terminal 400, and thus, it is possible to perform transmission and reception at high speed.

(Encryption Unit 212)

The encryption unit 212 can acquire the detailed information from the storage unit 208 and encrypt the detailed information using the common key A and the common key B. In the present embodiment, by using the common key A and the common key B, the terminal 400 can acquire the detailed information from the data recording device 200 and decrypt the detailed information. In the present embodiment, by performing such encryption using the common key A and the common key B, it is possible to prevent the detailed information from being transmitted to a third party. Furthermore, even when the detailed information is transmitted to a third party, the detailed information cannot be easily decrypted, and thus the detailed information can be protected. Furthermore, in the present embodiment, at the time of encryption, the encryption unit 212 may associate information (Whether or not the automatic driving function is available, automatic driving level, and the like) of permission content in the driving operation given to the driver, information of a violation history of the driver, and the like with the occupant information. Then, the encryption unit 212 outputs the encrypted detailed information to the storage unit 216 described later. Note that, in the present embodiment, in order to suppress an increase in the amount of data to be transmitted and received, it is preferable to also perform data compression processing at the time of encryption.

(Encryption Unit 214)

The encryption unit 214 can encrypt the metadata output from the generation unit 210 using the common key A. In the present embodiment, by using the common key A, the terminal 400 can acquire metadata from the data recording device 200 and decrypt the metadata. In the present embodiment, by performing encryption using such a common key A, it is possible to prevent the metadata from being transmitted to a third party, and furthermore, even when the metadata is transmitted to a third party, the metadata cannot be easily decrypted, so that the metadata can be protected. Then, the encryption unit 214 outputs the encrypted metadata to the storage unit 218 described later. Note that, in the present embodiment, in order to suppress an increase in the amount of data to be transmitted and received, it is preferable to also perform data compression processing at the time of encryption.

(Storage Unit 216)

The storage unit 216 can store the encrypted detailed information output from the encryption unit 212 and output the encrypted detailed information to the output unit 220 in response to the determination.

(Storage Unit 218)

The storage unit 218 can store the encrypted metadata output from the encryption unit 214 and output the encrypted metadata to the output unit 222 in response to the determination.

(Output Unit 220)

The output unit 220 can output the encrypted detailed information to the terminal 400 through authentication using the common key A. Specifically, the output unit 220 can be a short-range communication interface such as a wireless LAN, Bluetooth (registered trademark), or Wi-Fi. For example, the output unit 220 can transmit the detailed information encrypted using the common key A and the common key B to the terminal 400 that has transmitted the information of the common key A. Further, the output unit 220 transmits the detailed information to be transmitted in association with data identification information for identifying information to be transmitted, driver identification information for identifying a driver, date and time information when the information to be transmitted is acquired or transmitted, and the like. In addition, the output unit 220 can transmit a determination result of the determination unit 226 described later in association with the encrypted detailed information.

(Output Unit 222)

The Output Unit 222 can Output the Encrypted Metadata to the terminal 400 through authentication using the common key A. Specifically, the output unit 222 can be a short-range communication interface such as a wireless LAN, Bluetooth (registered trademark), or Wi-Fi. For example, the output unit 222 can transmit the metadata encrypted using the common key A to the terminal 400 that has transmitted the information of the common key A. Moreover, the output unit 222 transmits metadata to be transmitted in association with data identification information for identifying information to be transmitted, driver identification information for identifying a driver, date and time information when information to be transmitted has been acquired or transmitted, and the like. In addition, the output unit 222 can transmit a determination result of the determination unit 226 described later in association with the metadata.

(Information Acquisition Unit 224)

The information acquisition unit 224 acquires a travel plan, flight design area information, a local dynamic map, function information (performance information) and state information of the vehicle, weather, environmental information around the traveling vehicle, and the like, and outputs the acquired information to the determination unit 226 described later.

(Determination Unit 226)

The determination unit 226 determines the level of automatic driving (ODD) permitted by the vehicle for each section on the basis of the travel plan, the operation design area information, the local dynamic map, the function information of the vehicle, the weather, the environmental information around the traveling vehicle, and the like output from the information acquisition unit 224. Then, the determination unit 226 can output the determination result to the output units 220 and 222, the notification unit 228, and the vehicle exterior notification unit 230 described above. More specifically, the determination result can also include, for example, information on the notification timing of the manual driving restoration request notification to be made to the driver. Note that details of the ODD determination by the determination unit 226 will be described later.

(Notification Unit 228)

The notification unit 228 can present the determination result of the determination unit 226 to the driver or the like in the vehicle.

In the confirmation of the violation act, it is also important to confirm the state of the individual driver, and it is also important that the vehicle control system 100 appropriately provides the situation in which the ODD continues to dynamically change with traveling to the driver via the notification means, and confirms how the driver cognitively determines the notification information and links the notification information to the action according to the notification content. In the present embodiment, the action determination result of the driver in response to the display of the notification is fed back to the information acquisition unit 202, and the information is also an important factor in determining whether there is a subsequent violation. Therefore, the information presented to the driver and the information on the time axis are also stored in the storage unit 216 and the storage unit 218, and are provided to the control officer in response to a request.

Here, the notification unit 228 is a command component including a series of information presentation means for notifying the driver, and a specific means is not limited. For example, various means such as vehicle's incentive display IP, a center console panel, a head-up display (HUD), a light emitting diode (LED) lamp, a tell-tale lamp, a navigation monitor display, a glass display such as a head mount display (HMD), a wearable device, a tablet terminal, a game device, a portable television, a computer terminal, a haptics signal of a steering wheel, seat vibration, pedal reaction force, and the like can be mentioned. Furthermore, the optimal notification contents from the vehicle control system 100 to the driver are different depending on the return stage and the state of the driver at that time. For example, the information to be presented to the driver starts from the advance notice of the route, and is presented by different means at different stages such as an advance notification of a return schedule, an itinerary change notification, a return start request notification, and an alarm for a delay after the return request.

That is, in a case where the social introduction of the automatic driving is widely performed in the future, what is important is whether the driver (user) grasps the content of the notification related to ODD that defines the availability of the automatic driving determined by the vehicle control system 100 in order to utilize the advantage of the automatic driving, and based on the grasped content, the driver can take an action of returning to the manual driving within an allowable time or refrain from depending on the automatic driving more than the allowable time, on the basis of the situation of the external traveling environment, the allowable content by the vehicle control system 100, the return determination, and the like.

Furthermore, how the driver captures the notified information is reflected as a determination in a coping action or the like. However, since the process greatly affects the determination on whether there is a violation, it is preferable that the notified information and the notification timing be recorded and saved. In practice, it is not sufficient for the driver to determine whether his/her act corresponds to the violation by simply dividing the travel section in which the automatic driving may be used and the section in which the use is prohibited. The possible violation action as a result includes a case where there is a process of status transition by the time, the vehicle control system 100 predicts the necessity of return by the transition, and the return procedure as expected is not performed or the return is delayed by a predetermined period after the time point at which the vehicle control system 100 gives advance notification of return.

That is, it is necessary to determine whether a violation has occurred based on what information the driver had reviewed in advance, under what conditions, and in what kind of road environment. Therefore, these pieces of information such as various pieces of information when the vehicle control system 100 notifies the driver of the availability of the automatic driving, notification contents and timing in the middle of traveling, confirmation operation of the presented information by the driver, a determination condition when the vehicle control system 100 makes a determination, and element information for elements such as the LDM greatly affect the crackdown. Therefore, these pieces of information may be stored as special history information useful for determining the presence or absence of the violation and releasing the violation designation. At that time, in order to calculate a timing to issue a restoration notification to the driver, issue an alarm to urge execution of restoration based on a delay in start of restoration of the driver, and the like, the vehicle control system 100 can gently give a preliminary notification (For example, a notification sound referred to as earcon in the computer field) at an optimum notification means and a notification timing corresponding to a state observed in a steady state of the driver and a state of the initial observation. Note that, in the present embodiment, the notification, the alarm, the emergency MRM execution notification, and the like can be performed by means depending on at least one or more senses such as visual sense, auditory sense, and tactile sense.

(Vehicle Exterior Notification Unit 230)

On the basis of the determination result of the determination unit 226, the vehicle exterior notification unit 230 can present, to the outside of the vehicle, a status indicating that the vehicle is in an ODD section where automatic driving can be used, that the handover is being performed, a determination status of the vehicle control system 100, and the like. Introduction of the display of the vehicle exterior notification unit 230 is being considered as a display form that indicates the travel prediction performance of the host vehicle to the surrounding vehicles and the like to the following vehicle and the like and assists the action determination. At the same time, for example, the control officer can determine whether the operation of the driver is a violation or a possibility that the driver neglects the handover request from the vehicle control system 100 with reference to the determination result presented outside the vehicle.

(Action Determination Unit 231)

The action determination unit 231 can learn the action characteristic of the individual driver and predict the time from the notification of the return request to the return. Specifically, the action determination unit 231 includes a violation estimator 234 having a function of estimating the action or the state of the driver on the basis of various observation information obtained by the information acquisition unit 202 through long-term repeated use and a function of predicting the time for the actual return to be successful from the return notification by the vehicle control system 100, and further includes a learning device 232 and a dictionary 233. In the present embodiment, a configuration in which the learning function is incorporated in the data recording device 200 will be described. Note that the purpose of the above learning is generation of the dictionary 233 necessary for assuming a time for return for each individual driver. For example, the learning may be performed by off-line processing without a vehicle mounted by an external server (for example, the server 600 or the like) as an infrastructure to generate the dictionary 233 necessary for prediction, in a case where a business vehicle such as a taxi, a bus, or a physical distribution vehicle is used, and a vehicle to be used is not specified, or in transfer use of an unspecified vehicle centered on a wide-area sharing car or a rental car, there is no need for a learning dictionary reflecting the behavior characteristics of the individual driver.

Specifically, there are roughly two use purposes of the action determination unit 231, and one of them is passive estimation of the state of the driver on the basis of various types of unique information of the driver observed from the information acquisition unit 202 and the imaging unit/sensor unit/operation unit 206, and estimation based on active observation in which a determination is made on an observed action as a response of the driver observed after various notifications are made by the notification unit 228.

In the present embodiment, it is described that an estimation unit 422 is mounted on the terminal 400. However, it is not necessary to perform all the violation estimation on the terminal 400 side, and the data recording device 200 may estimate in advance whether or not the driver is in a state in which the status of the driver is in the violation state when using the vehicle. In this way, when the vehicle user has already fallen into a state estimated as a violation, the vehicle user (that is, the driver) can recognize that the vehicle is in the violation state. That is, the estimation display can act on the driver's action determination as a feedback function for preventing the violation. Therefore, the terminal 400 may receive the violation estimation information as metadata from the data recording device 200 in advance, and the estimation unit 422 may extract and display the information at the time when the possibility of the violation is high from the received violation estimation information instead of performing the violation estimation calculation again.

Hereinafter, an embodiment of estimating a violation will be described. In general, the time from when a device mounted on a vehicle issues a notification of a request for returning from automatic driving to manual driving until when the driver appropriately achieves the return to manual driving varies from person to person. For example, the feeling differs depending on the age of the driver, the initial posture and proficiency of the driver during automatic driving, and the like, and also depending on the vehicle performance and the environment of the traveling road, the driver is required to return at an early stage, or a slight delay is allowed. Therefore, the feeling differs depending on the situation.

In particular, in the use of the automatic driving, the behavior evaluation and monitoring of the driver are not always performed by the third party, and furthermore, there are individual differences in the return from the use of the automatic driving to the manual driving of the driver as described above. Therefore, it is important to estimate the time until the return expected for the driver and to determine the appropriate timing of the return request notification and the appropriate timing of the alarm. Since the state of the driver is an element that changes from moment to moment, characteristics related to the state of some drivers may be corrected by using the latest history information, or learning may be advanced by accumulating histories in order to more accurately estimate characteristics of an individual driver, and dictionary data may be updated as needed. More specifically, data and a determination result regarding the operation of the driver corresponding to the time of the violation of the driver acquired in the past are input to the learning device 232, and machine learning is performed to generate the dictionary 233 which is an estimation model for estimating the violation. For example, the learning device 232 can be a supervised learning device such as a support vector regression or a deep neural network. Then, the estimation unit 422 can estimate the presence or absence of the violation by the driver on the basis of the decoded metadata and the determination result on the basis of the dictionary 233 generated by the learning device 232. In this way, it is possible to notify the driver of the operation with high probability of the violation as the precursor of the violation. Therefore, the driver regards the violation as a risk and avoids actually reaching the violation state. As a result, a medium- to long-term social effect of preventing occurrence of a violation or a traffic accident is expected. In the present embodiment, the estimation is not limited to the estimation by the estimation model obtained by the machine learning, and the estimation may be performed by another algorithm.

Note that the functional blocks included in the data recording device 200 are not limited to the functional blocks illustrated in FIG. 7. Furthermore, each functional block included in the data recording device 200 may be provided integrally with a device or the like conforming to the a predetermined standard as an operation state recording device provided in a vehicle, which will be introduced in each country in the future.

<5.4 Terminal>

Figure 8:
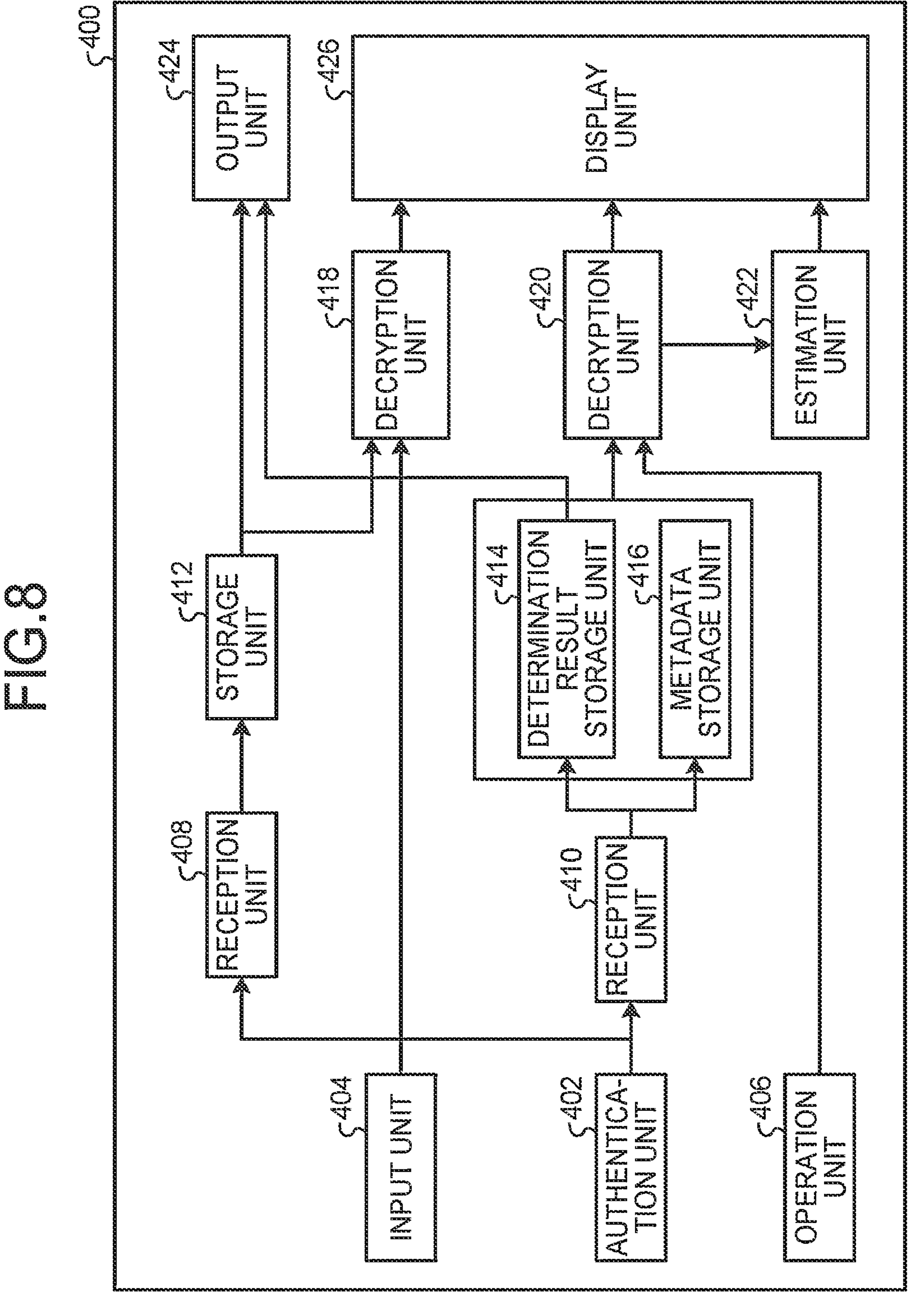
FIG. 8 is a block diagram illustrating an example of a configuration of a terminal 400 according to the embodiment of the present disclosure.

Next, a detailed configuration of the terminal 400 according to the present embodiment will be described with reference to FIG. 8. FIG. 8 is a block diagram illustrating an example of a configuration of the terminal 400 according to the present embodiment. Specifically, as illustrated in FIG. 8, the terminal 400 mainly includes an authentication unit 402, an input unit 404, an operation unit 406, a reception unit 408, a reception unit (information acquisition unit) 410, a storage unit 412, a determination result storage unit 414, a metadata storage unit 416, a decryption unit 418, a decryption unit 420, an estimation unit 422, an output unit 424, and a display unit 426. Hereinafter, each functional block of the terminal 400 will be sequentially described.

(Authentication Unit 402)

The authentication unit 402 can acquire information of the common key A and perform authentication for acquiring detailed information or metadata encrypted using the common key A. Specifically, for example, the authentication unit 402 reads information of the common key A from a medium mounted on a driver's license superimposed on itself, and acquires information of the common key A. Next, the authentication unit 402 attempts pairing (establishment of mutual communication) with the data recording device 200 existing within a predetermined distance by using the read information of the common key A. Moreover, when it is confirmed that the information of the common key A matches, the data recording device 200 transmits the encrypted detailed information or metadata to the authentication unit 402, and the authentication unit 402 acquires the transmitted detailed information or metadata. At this time, the authentication unit 402 may acquire data identification information for identifying information to be transmitted, driver identification information for identifying the driver, date and time information when the information to be transmitted has been acquired or transmitted, and the like, which are associated with the detailed information or the metadata. Moreover, the authentication unit 402 can acquire a determination result of the determination unit 226 associated with the detailed information or the metadata. Then, the authentication unit 402 outputs the previously acquired information of the common key A together with the detailed information or the metadata, and further information associated with the detailed information or the metadata to the reception units 408 and 410.

As described above, in the present embodiment, information is transferred using the unique common key A that can be mutually recognized by superimposing, on the terminal 400 of the control officer, a driver's license that the driver is required to always carry at the time of driving and that cannot be obtained by a third party without the consent of the driver. According to the present embodiment, by doing so, it is possible to prevent information from inadvertently spreading to a third party. Note that, in the present embodiment, copy protection processing may be further performed so that data is not copied without permission.

(Input Unit 204/404)

The input unit 204/404 can receive an input of a common key B (second common key) used by the decryption unit 418 to be described later from the driver, and output information of the received common key B to the decryption unit 418. Note that displaying a moving image or the like including personal information regarding privacy on the display device of the terminal 400 using the common key B is not an essential procedure in a normal crackdown. This is performed in a case where the driver actively requests the control officer to disclose his/her moving image at the scene when the driver raises an objection to the crackdown. At this time, since the common key B is input by the driver to decrypt data, it is ensured that the data is disclosed by the driver's positive intention. Note that, as a special case where the driver dares to view the moving image including the personal information at the control site, for example, the following cases can be mentioned. For example, there is a case where, while the control officer waits for monitoring the passing vehicle, the driver undesirably receives a request for returning from the automatic driving to the manual driving at that moment, interrupts the operation of the mobile terminal performed as the secondary task, and bends the posture to accommodate the mobile terminal. In such a case, the control officer may point out the violation only by watching the moment when the driver bends down. It is important that fair crackdown of a violation is performed not on the basis of instantaneous eyewitness, but by confirming an act with an integral lapse of time, such as violation of the duty of attention or inappropriate action in response to the return request, and for this purpose, it is essential to confirm the progress history. In the confirmation of the movement of the skeleton model or the avatar by the control officer, there is a possibility that an error occurs in the confirmation and the violation determination. Therefore, as an aid measure in such a case, the driver can provide the common key B by his/her own decision to cause the control officer to confirm the moving image or the like.

(Operation Unit 406)

The operation unit 406 includes, for example, a keyboard, a button, a direction key, a rotary selector such as a jog dial, a touch panel, a combination thereof, or the like, and can receive an operation of instructing reproduction of the acquired detailed information or metadata by the control officer.

(Reception Unit 408)

The reception unit 408 acquires the encrypted detailed information from the authentication unit 402 and outputs the acquired detailed information to the storage unit 412 described later.

(Reception Unit 410)

The reception unit 410 acquires the encrypted metadata and the determination result from the authentication unit 402, and outputs the encrypted metadata and the determination result to a determination result storage unit 414 and a metadata storage unit 416 described later.

(Storage Unit 412)

The storage unit 412 stores the detailed information output from the reception unit 408, and outputs the detailed information to the decryption unit 418 and the output unit 424 described later in response to a request.

(Determination Result Storage Unit 414)

The determination result storage unit 414 stores the determination result output from the reception unit 410, and outputs the determination result to the decryption unit 420 and the output unit 424 described later in response to a request.

In the above description, it is assumed that the detailed information is once transmitted to the server 600 via the output unit 424 of the terminal 400 of the control officer, but the present embodiment is not limited thereto, and the detailed information may be directly transmitted from the data recording device 200 to the server 600. At this time, the terminal 400 may transmit only an instruction to transmit.

(Metadata Storage Unit 416)

The metadata storage unit 416 stores the metadata output from the reception unit 410, and outputs the metadata to the decryption unit 420 to be described later in response to a request.

(Decryption Unit 418)

The decryption unit 418 can decrypt the encrypted detailed information output from the storage unit 412 using the common key B output from the input unit 404, and can output the decrypted detailed information to the display unit 426 for reproduction. That is, by directly inputting the common key B with the will of the driver, it is possible to select whether or not the control officer can confirm the detailed information of the time at which the violation is estimated to have been performed on site.

(Decryption Unit 420)

The decryption unit 420 can decrypt the encrypted metadata and the determination result output from the determination result storage unit 414 and the metadata storage unit 416 using the common key A output from the authentication unit 402. The decryption unit 420 can output the decrypted metadata to the display unit 426 to play back the decrypted metadata, and can output the decrypted metadata to the estimation unit 422 for estimation.

(Estimation Unit 422)

The estimation unit 422 can estimate the presence or absence of the violation of the driver on the basis of the decoded metadata and the determination result. Although it is functionally possible to perform completion analysis of all the violation confirmation in the estimation unit 422, in operation, as described above, it is desirable that the data recording device 200 perform estimation analysis of the possibility of violation in advance as a matter of acceptance in using the automatic driving function, and embed and receive the violation estimation result in the metadata as a parameter that changes according to time. For example, in the present embodiment, it is preferable to add the following estimation information estimated by the estimation unit 422 to the decrypted metadata in order to save the labor of browsing and confirming all the data received by the control officer through transmission and reception of data in chronological order. For example, on the basis of the estimation information added to the metadata, with reference to the flag set at the time when the driver is estimated to have committed the violation, the control officer can intensively browse the metadata before and after the time indicated by the flag. Note that, in the present embodiment, the present invention is not limited to the metadata, and estimation information (flag) may be similarly added to detailed information such as a moving image.

(Output Unit 424)

The output unit 424 can transmit the encrypted detailed information and the determination result to the server 600 for the purpose of causing the driver to browse the detailed information and the like as evidence for his/her own defense when the driver who opposes the violation recognition at the police station or the court asserts that the determination at the time of on-site crackdown based on the metadata is incorrect at the time of appearance such as confirmation of violation, confirmation, or payment of a fine. Note that the detailed information transmitted to the server 600 includes a lot of personal information even when the terminal 400 temporarily performs decryption display using the common key B, and thus is limited to information encrypted with the common key B. Furthermore, at the time of transmission, the output unit 424 can transmit the detailed information in association with data identification information for identifying information to be transmitted, driver identification information for identifying a driver, date and time information when the information to be transmitted has been acquired or transmitted, and the like. Note that the output unit 424 is not limited to being a communication interface for near field communication, and may be a communication interface related to mobile communication technology (also includes GSM, UMTS, LTE, LTE-Advanced, 5G or later technologies).

In the present embodiment, it has been described that the detailed information is managed using the common key B in order to avoid use against the intention of the driver. However, the detailed information is not limited to use of such a fixed key, and may be managed by multi-stage authentication accompanied by the intention of the driver, such as combination with other authentication. Furthermore, in the present embodiment, at the time of display performed simultaneously with decoding, the viewer's information may be embedded as a watermark to prevent unauthorized copying.

(Display Unit 426)

The display unit 426 can display the decoded metadata and the determination result.

Note that the functional blocks included in the terminal 400 are not limited to the functional blocks illustrated in FIG. 8.

<5.5 about Step S47>

Figure 9:
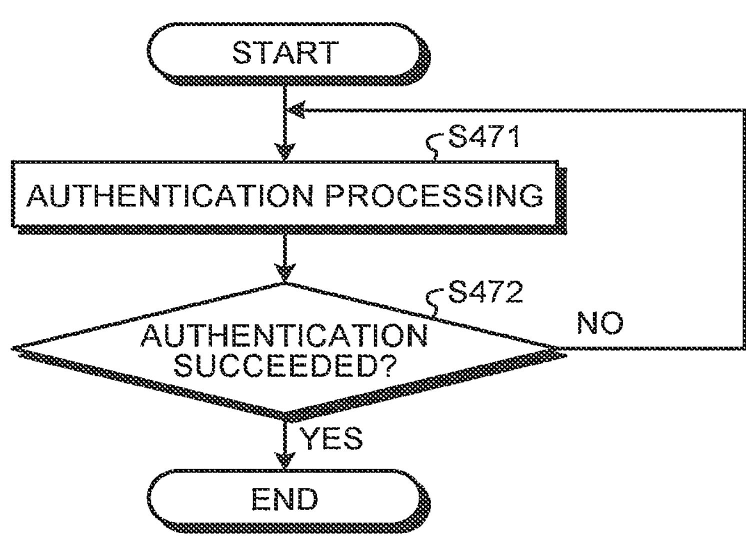
FIG. 9 is a sub-flowchart of Step S47 in FIG. 6.

Next, details of Step S47 in FIG. 6 will be described with reference to FIG. 9. FIG. 9 is a sub-flowchart of Step S47 of FIG. 6. Specifically, as illustrated in FIG. 9, Step S47 includes Substep S471 and Substep S472. Details of each substep will be described below.

The terminal 400 reads information from a medium (an electronic chip or the like) mounted on a driver's license, acquires information of the common key A, and attempts authentication processing with the data recording device 200 existing within a predetermined distance using the read information of the common key A (Substep S471).

The data recording device 200 determines whether the information of its own common key A matches the common key A transmitted from the terminal 400 (Substep S472). In the case of coincidence (Substep S472: Yes), the data recording device 200 determines that the authentication has succeeded and transmits the metadata and the like to the terminal 400. On the other hand, when they do not match (Substep S472: No), the data recording device 200 returns to Substep S471.

In the present embodiment, since the authentication work can be performed as a part of the procedure of the crackdown using the driver's license, the crackdown can be smoothly performed without delay. That is, quick confirmation of the violator and the violation act can be realized. According to the present embodiment, it is possible to perform a quick confirmation operation, and it is not necessary to input a passcode using a time-consuming keyboard, and thus, it is possible to perform an efficient operation.

<5.6 about Step S52>

Figure 10:
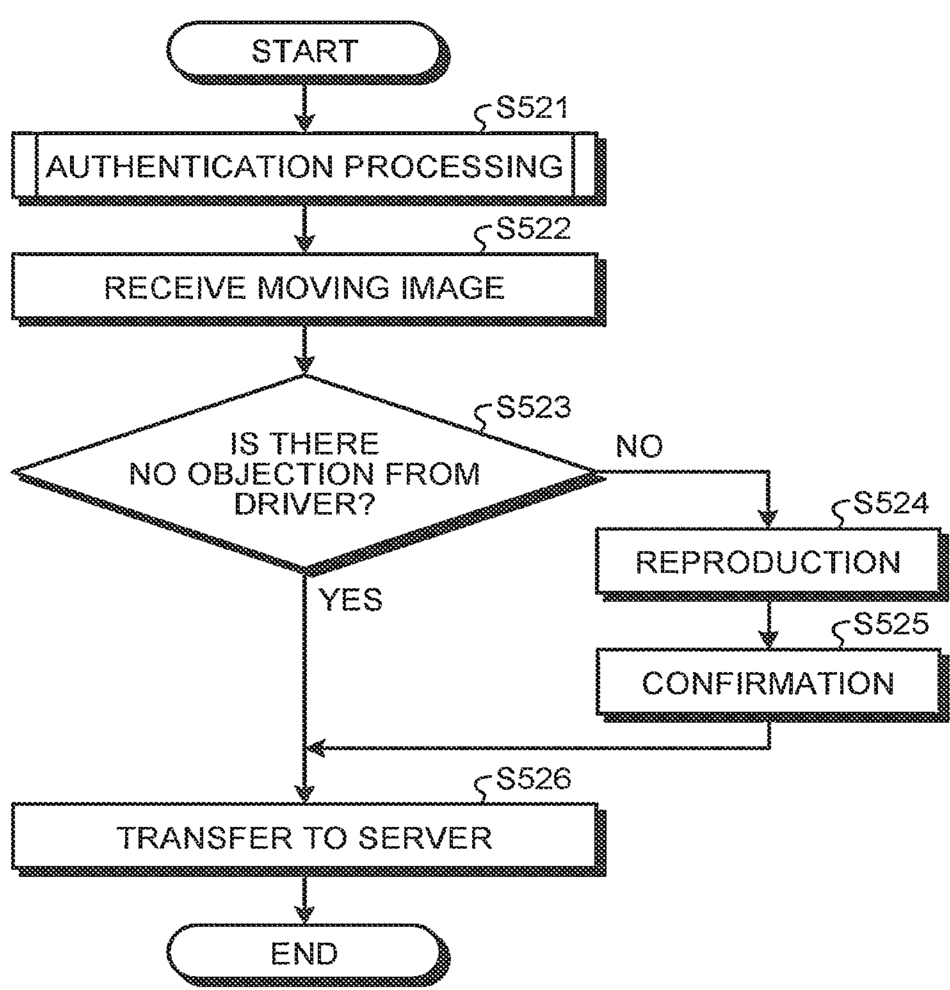
FIG. 10 is a sub-flowchart of Step S52 in FIG. 6.

Next, details of Step S52 in FIG. 6 will be described with reference to FIG. 10. FIG. 10 is a sub-flowchart of Step S52 of FIG. 6. The processing is a work procedure performed when the driver requests the control officer to browse and confirm the detailed information such as the moving image in order to raise an objection to the determination of the violation based on the metadata of the control officer at the crackdown site, and it is not necessary to perform the processing if there is no such an objection. Specifically, as illustrated in FIG. 10, Step S52 includes Substeps S521 to S526. Details of each substep will be described below. Note that the reception of the detailed information such as the moving image in Step S52 is not an essential procedure at the time of the crackdown as described above, and may be limited to a case where the driver requests the control officer to browse and confirm the detailed information such as the moving image because the driver opposes the determination of the violation based on the metadata of the control officer, and the selection branch at this time is omitted in FIG. 10.

First, the terminal 400 reads information from a medium (an electronic chip or the like) mounted on a driver's license superimposed on itself, acquires information of the common key A, and attempts authentication processing with the data recording device 200 existing within a predetermined distance by using the read information of the common key A (Substep S521).

The data recording device 200 determines whether the information of its own common key A matches the common key A transmitted from the terminal 400, and transmits detailed information such as a moving image of the driver when the information matches the common key A. The terminal 400 receives the detailed information of the moving image of the driver from the data recording device 200 (Substep S522).

The control officer checks whether or not there is an opposition (argument) from the driver (Substep S523). If there is no opposition (Substep 5 S523: Yes), the process proceeds to Substep S526, and if there is an objection (Substep S524: No), the process proceeds to Substep S524.

The terminal 400 receives the input of the common key B by the driver, decrypts the received detailed information such as the moving image using the received common key B, and reproduces the same (Substep S524). The control officer confirms the reproduced moving image and the like (Substep S525). In the present embodiment, by adding a code for time synchronization to the stored moving image or the like and the metadata, the time and the moving image can be reproduced in conjunction with each other.

The terminal 400 transfers the acquired detailed information such as the moving image to the server 600 (Substep S526).

<5.7 about Display of Metadata

Figure 11:
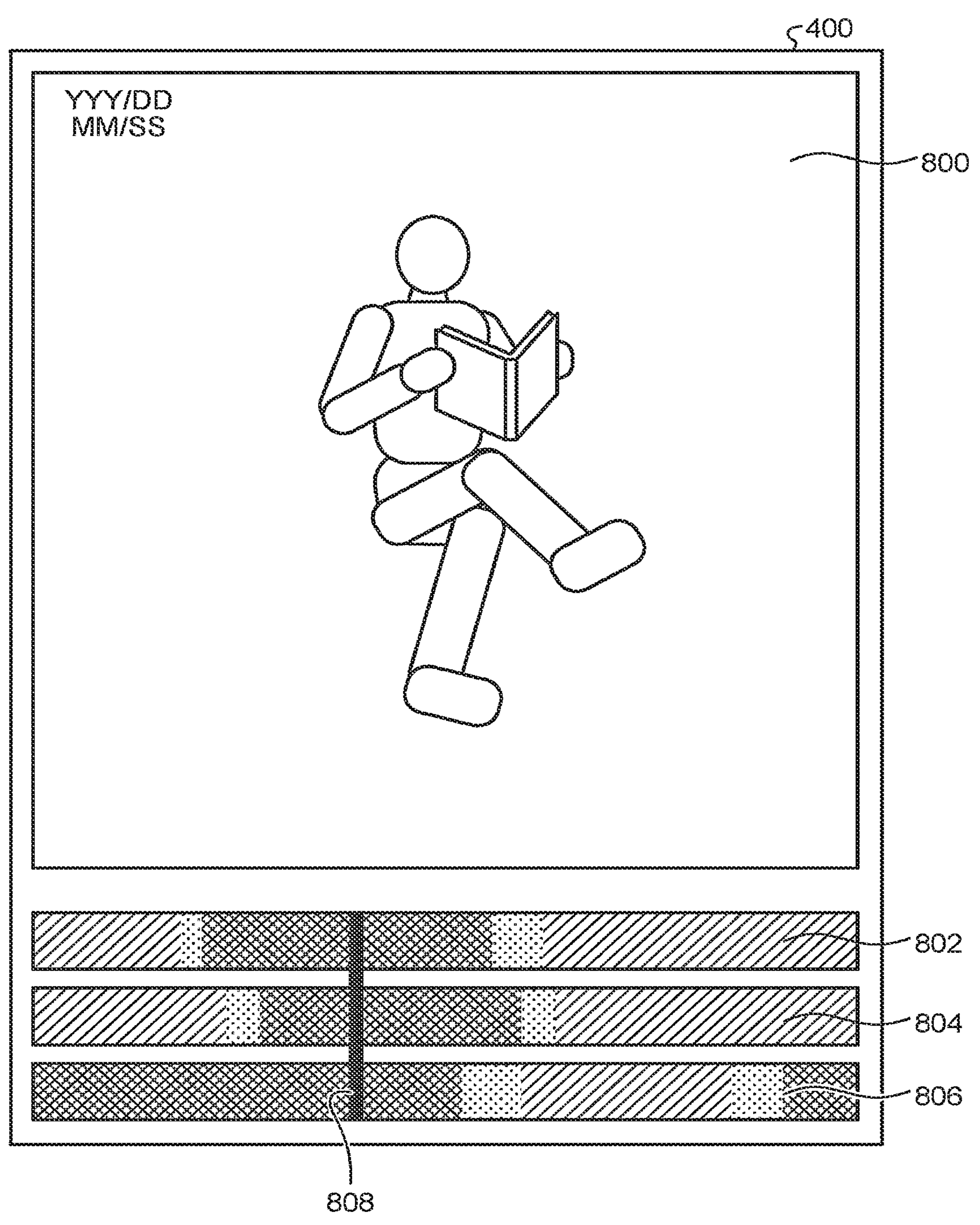
FIG. 11 is an explanatory diagram (part 1) for explaining an example of display of metadata according to the embodiment of the present disclosure.
Figure 12:
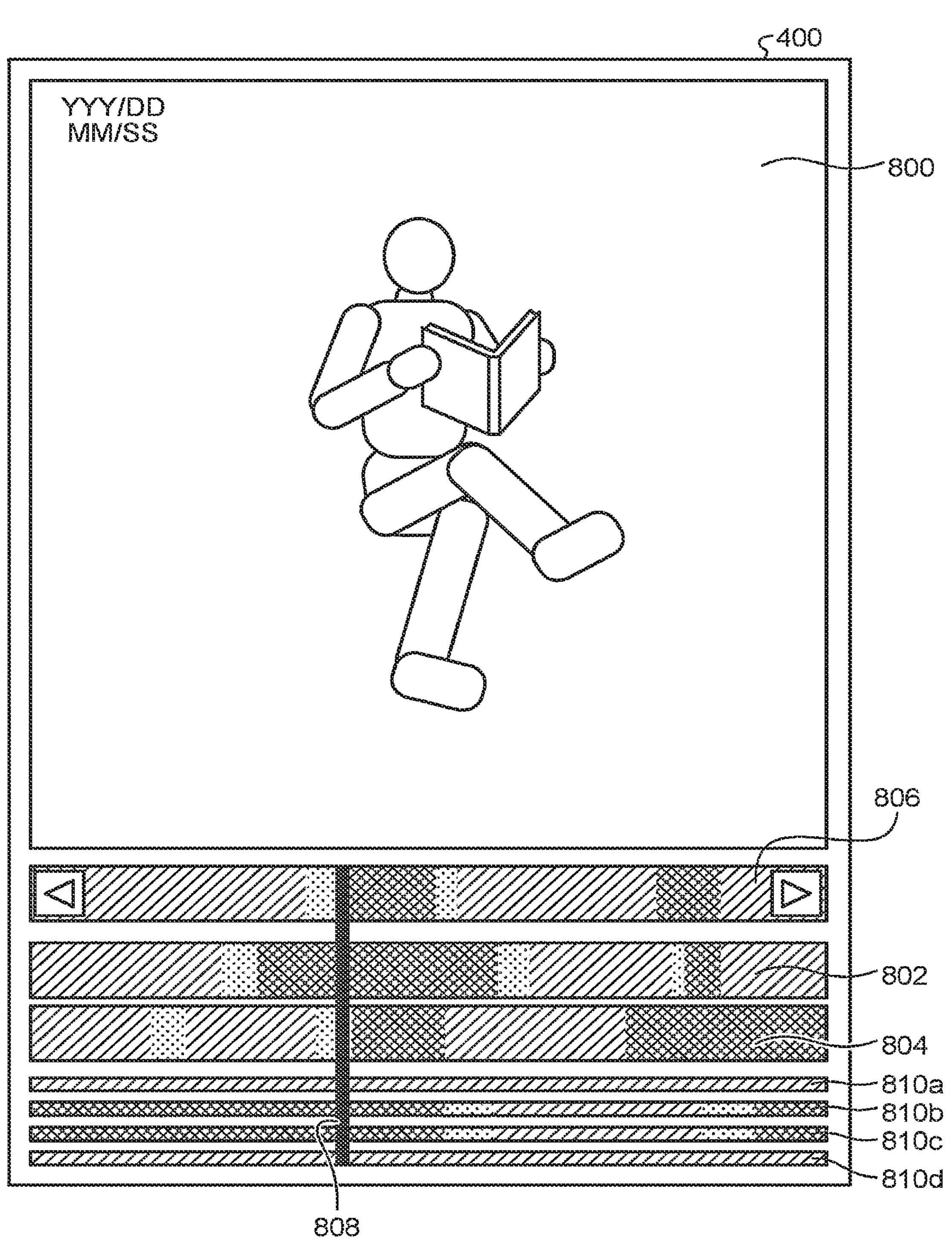
FIG. 12 is an explanatory diagram (part 2) for explaining an example of display of metadata according to the embodiment of the present disclosure.
Figure 13:
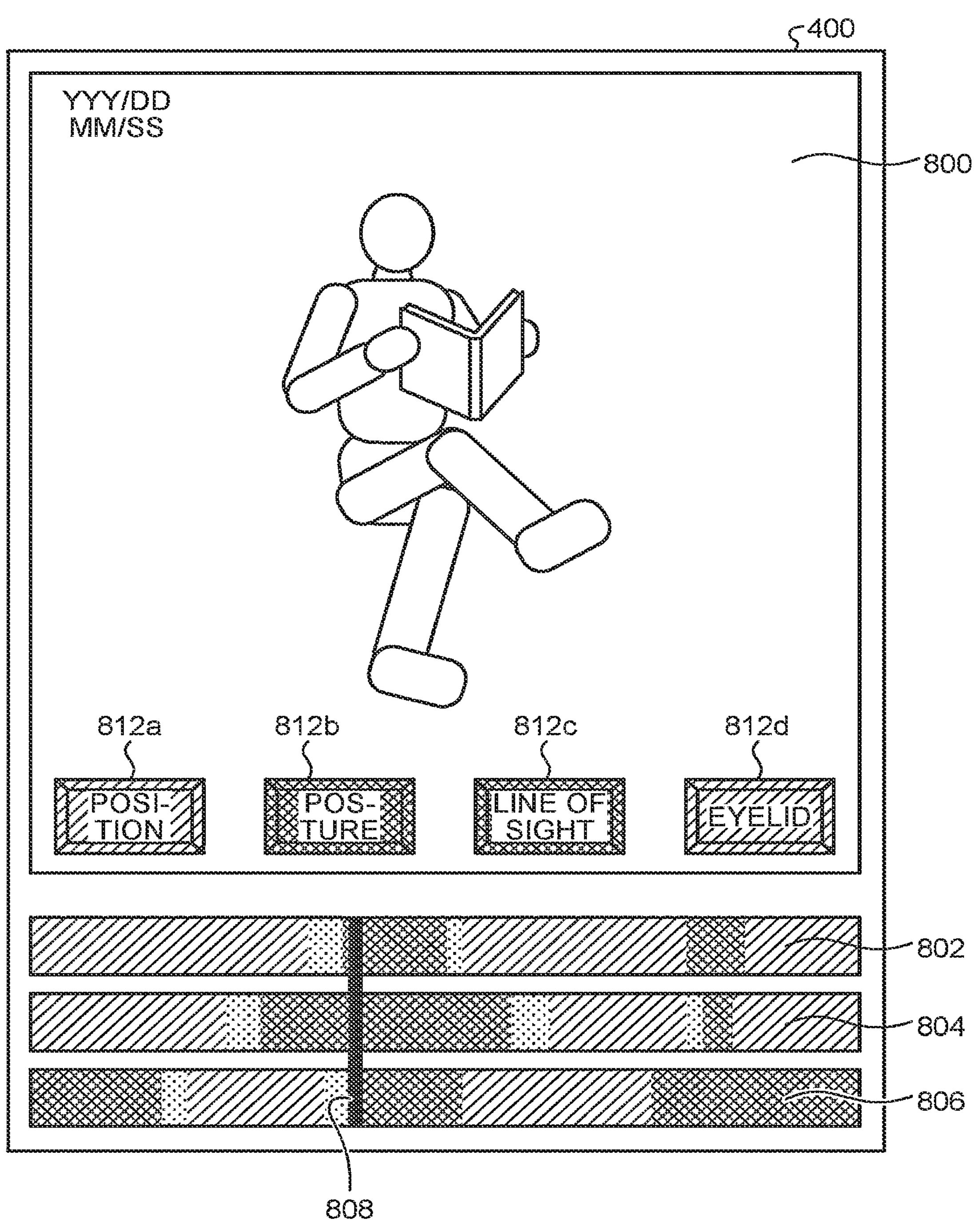
FIG. 13 is an explanatory diagram (part 3) for explaining an example of display of metadata according to the embodiment of the present disclosure.

Next, an example of display of metadata in the present exemplary embodiment will be described with reference to FIGS. 11 to 13. FIGS. 11 to 13 are explanatory diagrams for explaining an example of display of metadata according to the present embodiment. The display of the metadata can be performed only after the control officer finds a vehicle suspected of being violated and issues a tracking stop command and then stops the vehicle on a safe road shoulder or the like. Technically, it is possible to construct a mechanism for remotely monitoring all vehicles wirelessly or the like to acquire information without recognizing the driver, but it is not socially desirable since there is a risk of causing unauthorized acquisition of information by a third party or a risk of inducing a controlled society. Therefore, it is assumed that the control officer can perform the following operation after issuing the tracking stop command and stopping. Furthermore, nowadays, as widely accepted operations such as a crackdown on speed limit violation and drunk driving, there is a crackdown by tracking illegal vehicles and stop commands. The problem at that time is that the states of the vehicle and the river change during the time from the suspected violation to the tracking and stopping. Therefore, it is difficult to directly confirm these states from the outside like the traveling speed. Then, in a case where the control officer cannot quickly and effectively grasp the situation going back in time from the time point at which the vehicle stops, the crackdown becomes a formality, and as a result, the penalty as a system for preventing the violation does not work effectively. On the other hand, by performing the reproduction display of the metadata in the present embodiment, it is possible to quickly and effectively perform the above-described crackdown, and the penalty as a system for preventing the violation effectively works.

For example, referring to FIG. 11, on the display unit 426 (shown in FIG. 8, not shown in FIG. 11) of the terminal 400, for example, a moving image 800 of an avatar instead of the driver is displayed as metadata. For example, the moving image 800 of the avatar may be displayed by abstracting the face of the driver in order to protect the privacy of the driver, or may be an avatar display in a form in which only blinks or face directions can be visually recognized in order to confirm the arousal level of the driver. Furthermore, in the moving image 800 of the avatar, an image around the driver, belongings of the driver (for example, the book), and the like may not be displayed or may be displayed in an abstracted manner as long as the driver's movement can be visually recognized. Furthermore, in FIG. 11, an avatar is displayed instead of the driver, but the present embodiment is not limited thereto, and may be, for example, 5 a skeleton model.

Moreover, in the present embodiment, an ODD display 802 may be displayed on the display unit 426 of the terminal 400. The ODD display 802 indicates a change in ODD over time, and displays an allowable automated driving level by color or the like, for example. Further, an arousal level display 804 indicating the arousal level of the driver may be displayed on the display unit 426 of the terminal 400. The arousal level display 804 indicates a change in the arousal level of the driver over time, and displays the arousal level by color, for example. Furthermore, in a case where the ODD display 802 and the arousal level display 804 are displayed using colors, in a case where the ODD display 802 and the arousal level display 804 have the same color in the vertical direction (in a case where they have the same color at the same timing), it is preferable to select the color assignment such that the possibility of the violation becomes high.

More specifically, the display form varies depending on what kind of relationship is required between the driver and the ODD determined and displayed by the vehicle control system 100 in order to ensure safety in the vehicular society of the local community. In a case where the end of the ODD section is predicted, it is not uniformly determined which time axis is used to make a prior notification, how to issue an alarm when such a return request notification is issued and a delay occurs in response to the notification, and how to request the driver to respond. Therefore, in the present embodiment, in order to ensure flexibility of operation, it is preferable to make it possible to appropriately change parameters and the like that determine the arousal level of the driver, the color of display of the estimation result for the action evaluation, and the like.

In addition, in the present exemplary embodiment, a determination display 806 indicating the result of the violation estimation by the estimation unit 422 may be displayed on the display unit of the terminal 400. Note that a cursor 808 indicates the position of the timing (time) at which the moving image 800 of the avatar is reproduced, and for example, the control officer can change the reproduction to the reproduction of the moving image 800 of the avatar at an arbitrary time back from the time of the control officer by moving the cursor 808.

Furthermore, the display unit 426 of the terminal 400 may display the cumulative number and history of violations that the corresponding driver has made most recently and past violations. In this way, the control officer can promptly determine whether the driver is a malicious violator who repeats a confident violation or a violator who accidentally violates the rules from the violation history and the like.

Furthermore, for example, as illustrated in FIG. 12, the display unit 426 of the terminal 400 may display the moving image 800 of the avatar, the determination display 806, the ODD display 802, and the arousal level display 804. Moreover, as illustrated in FIG. 12, a position of the driver leaving the driver's seat, a posture of the driver inside and outside the driver's seat, a line of sight for determining whether the driver is following the driver's duty of care or distracting the driver, details of the state of the eyelids of the driver, which may be information for determining drowsiness, and the like may be displayed by displays 810*a* to 810*d*. The displays 810*a* to 810*d* indicate the position, the posture, the line of sight, and the state of the eyelids of the driver over time, and indicate the degree of possibility of the violation in color, for example. Furthermore, in the display example of FIG. 12, as an example of means for discretely selecting the specific time at which the violation occurrence is estimated, the control officer can jump to the time desired to be reproduced and change the reproduction portion of the avatar moving image 800 by operating the portion of the arrow provided at both ends of the determination display 806. Furthermore, in the present embodiment, as a help for the quick confirmation by the control officer, for example, the thumbnail image (not illustrated) may be displayed at a point where a state in which the driver is suspected of dozing is observed during the use of the automatic driving at the automatic driving level 3 or a point where the driver ignores the return request and the return is delayed. Furthermore, a symbol icon (not illustrated) indicating the violation may be displayed at the estimated violation point, and the control officer may selectively display the reproduction of the avatar moving image 800 of the corresponding portion and the ODD information by performing an operation on the corresponding symbol icon.

Furthermore, for example, as illustrated in FIG. 13, the display unit 426 of the terminal 400 may display the moving image 800 of the avatar, the determination display 806, the ODD display 802, and the arousal level display 804. Moreover, as illustrated in FIG. 13, details of the position, posture, line of sight, and eyelid state of the driver may be displayed by displays 812*a* to 812*d*. The displays 812*a* to 812*d* indicate, for example, in color, the degree of possibility of violation of the position, posture, line of sight, and eyelid state of the driver at the timing (time) indicated by the position of the cursor 808. In this way, the control officer can effectively and promptly confirm a suspicious illegal vehicle that has not been used properly in accordance with ODD, and avoid being involved with the corresponding vehicle for a long time.

In the present embodiment, the display of the metadata is not limited to the display illustrated in FIGS. 11 to 13.

<5.8 Description of ODD Determination>

Figure 14:
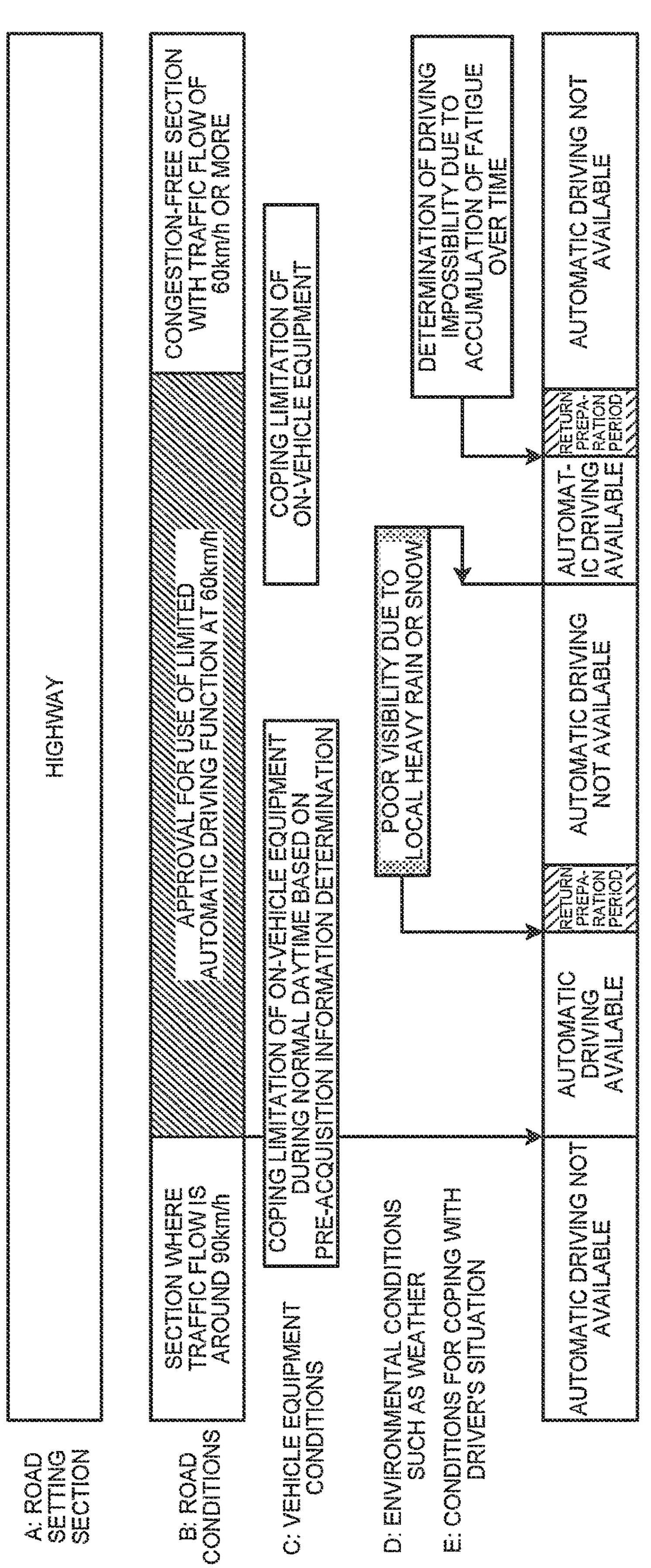
FIG. 14 is an explanatory diagram for explaining an example of an ODD setting according to the embodiment of the present disclosure.
Figure 15:
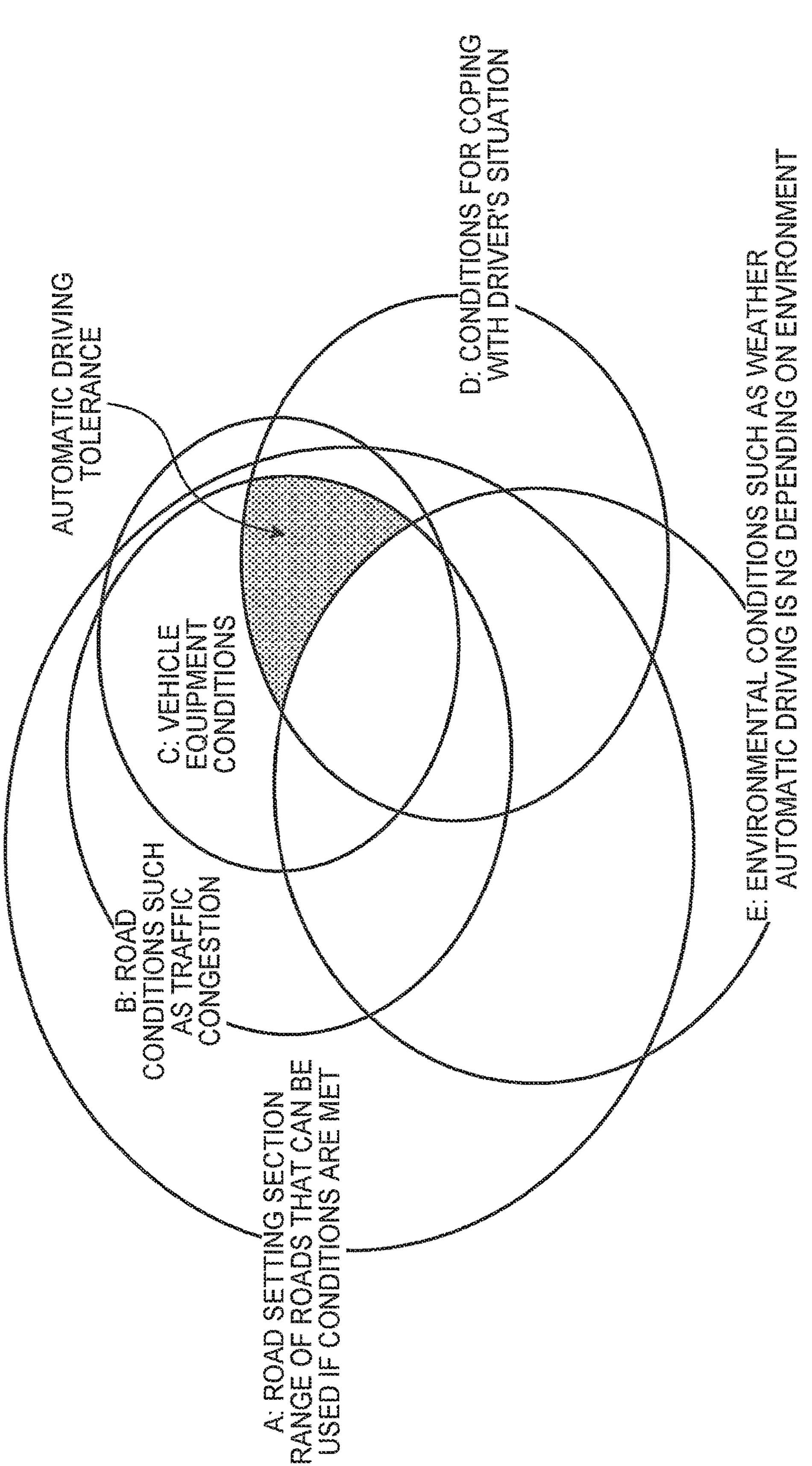
FIG. 15 is a set diagram of conditions under which use of automatic driving is permitted.
Figure 16:
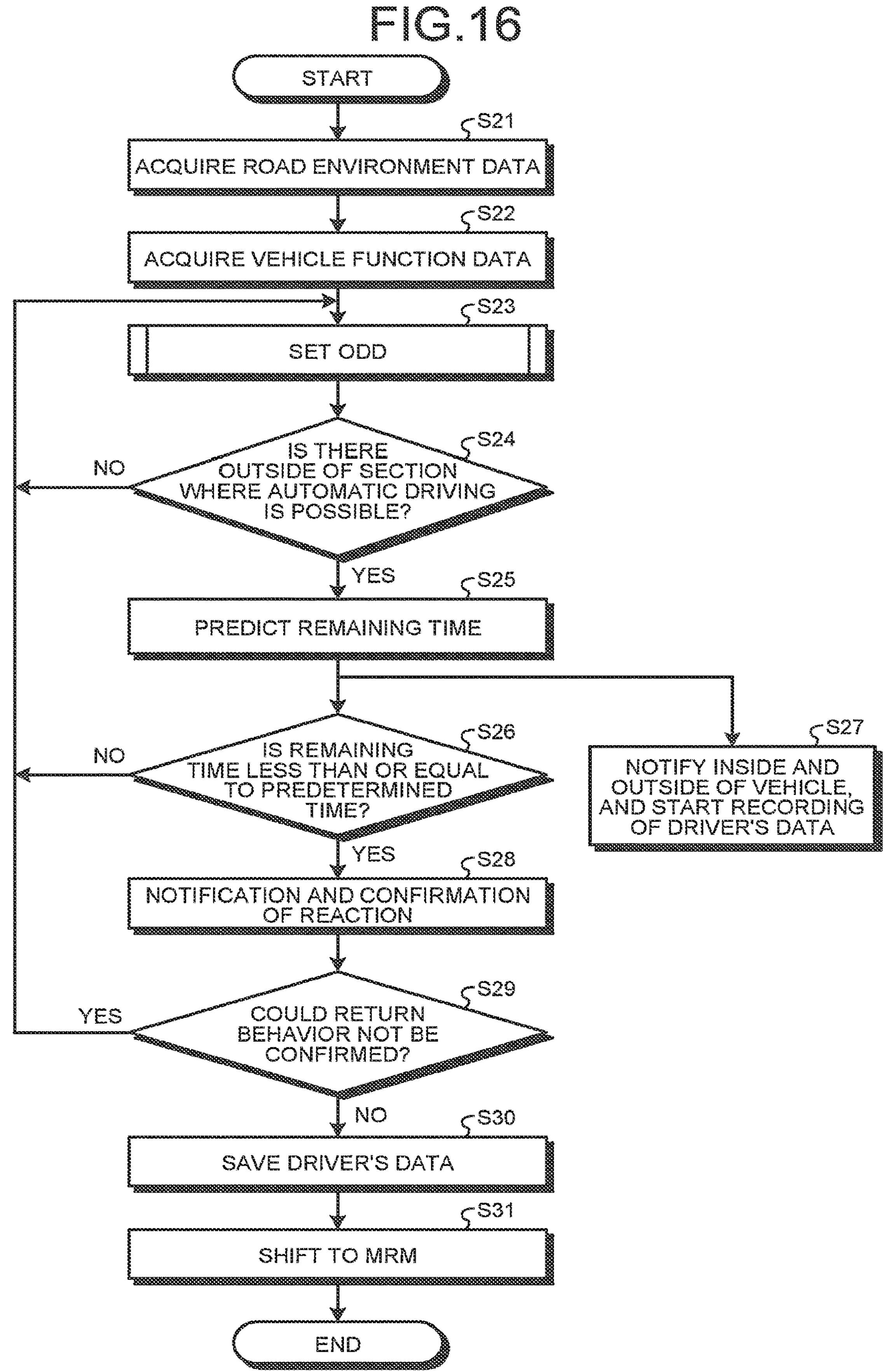
FIG. 16 is a flowchart for explaining an ODD determination method according to the embodiment of the present disclosure.

Next, with reference to FIGS. 14 to 17, the determination of the automatic driving level (ODD) permitted for the vehicle in each section by the determination unit 226 described above will be described. FIG. 14 is an explanatory diagram for explaining an example of ODD setting according to the present embodiment, and FIG. 15 is a set diagram of conditions under which use of automatic driving is permitted. FIG. 16 is a flowchart for explaining an ODD determination method according to the present embodiment, and FIG. 17 is a sub-flowchart of Step S23 in FIG. 16.

As described above, in the embodiment of the present disclosure, even in the same road section, the allowable automatic driving level varies depending on various determination conditions such as a limit of a range that can be handled as the performance of the vehicle or the self-diagnosis result of the mounted device, the situation of the road, and the weather. Moreover, while the same vehicle travels from a departure place to a destination, an allowable automatic driving level may also change due to a vehicle factor or an environmental factor. Moreover, in the case of a transition of the automatic driving level that requires a response to switching from the automatic driving to the manual driving, a handover section for the response may also be set. Therefore, in the embodiment of the present disclosure, the ODD is set and updated on the basis of various information that changes from moment to moment.

Here, for example, as illustrated in FIG. 14, a case where the use condition of the automatic driving function is permitted at the time of traffic congestion with a speed of 60 km/h or less by law or the like is considered. In this case, a physical section on the map where the automatic driving may be used is limited to a predetermined section (condition A) of the highway, and a case where a traffic jam occurs in the section and the speed is 60 km/h or less (condition B). Moreover, as illustrated in FIG. 14, there is a case where the use of the automatic driving function is not permitted due to a function (condition C) of mounted equipment of the vehicle, a condition (for example, a section of a sharp curve or the like) such as a load weight (condition C), a weather (for example, heavy rain), a condition as to whether or not returning to the manual driving can be expected at a necessary timing from excessive dependence on the automatic driving on the basis of an arousal level or a fatigue degree of the driver, and the like. Therefore, the ODD is set by comprehensively evaluating these pieces of information. An example of a relationship between the conditions A, B, C, D, and E is illustrated in a set diagram of FIG. 15.

For example, in Step S23 of the control of the automatic driving function illustrated in the flowchart of FIG. 16, the determination unit 226 determines and sets ODD. First, a flowchart of the control of the automatic driving function illustrated in FIG. 16 will be described. Specifically, as illustrated in FIG. 16, the control of the automatic driving function includes a plurality of steps from Step S21 to Step S31. Details of each of these steps will be described below.

The vehicle control system 100 acquires road environment data such as local dynamic map (LDM) information (Step S21). Next, the vehicle control system 100 acquires vehicle function data such as vehicle performance (Step S22).

The vehicle control system 100 sets ODD based on the acquired data (Step S23). Note that details of the step will be described later with reference to FIG. 17. Moreover, the control of the automatic driving by the vehicle control system 100 will be continuously described.

The vehicle control system 100 determines whether or not an outside of a section that is not a section where automatic driving is possible exists within a certain travel arrival time in the set ODD in an area within a certain period in which the vehicle travels after a predetermined time elapses (Step S24). If there is an outside of the section (that is, the driver returns to the manual driving and starts preparation for finishing the use of the automatic driving) (Step S24: Yes), the process proceeds to Step S25, and if there is no outside of the section (Step S24: No), the process returns to Step S23.

The vehicle control system 100 predicts the remaining arrival time until the vehicle reaches the outside of the section that is not the section where the automatic driving is possible (Step S25). The vehicle control system 100 determines whether the predicted remaining time is less than or equal to a predetermined time (Step S26). In a case where the remaining time is less than or equal to the predetermined time (Step S26: Yes), the process proceeds to Step S28, and in a case where the remaining time is not less than or equal to the predetermined time (Step S26: No), the process returns to Step S23. Note that, in Step S25, with reference to the time required to return to manual driving predicted from the state of the driver detected by the constant monitoring of the driver, in a case where the remaining time until the time required to return is short, it is necessary to issue an advance notification, notification, alarm, or the like to the driver in preparation for reaching the end point of the ODD. Then, the time estimated to be required for the driver to actually return can be determined on the basis of the dictionary 233 learned by the action determination unit 231.

The vehicle control system 100 notifies the inside and outside of the vehicle of the predicted remaining time, and starts recording of the detailed information at this time point at the latest together with saving of a series of history information of the system state, the prediction situation, and the return from the previous state of the driver before the end of ODD (Step S27). When using the automatic driving function, the information for determining whether or not the automatic driving function can be used (including start, end, and end preparation) is availability information of the automatic driving function provided by the vehicle control system 100 to the driver, and is information in advance (for example, the ODD determination range and its boundary). Even in a case where ODD is fixedly defined according to a travel environment, in the future, the definition thereof will be modified, and even in a case where the vehicle control system 100 dynamically determines the ODD according to the situation, it is essential for the driver to correctly observe various notifications, alarms, and warning information output from the vehicle control system 100 in order to reduce an occurrence rate of an accident or an MRM operation due to sudden deceleration. Then, in applying a penalty to a violation, it is essential to accurately record a process up to occurrence of an event as a confirmation means of the violation act.

By the way, in the case of the environment-dependent restriction items such as the speed restriction set in the conventional road, since the determination regarding the driving of the driver is made on the basis of the road sign, the presence or absence of the violation may be determined on the basis of the road sign or the like. However, in the automatic driving, since there is an operation mechanism including the ODD determined depending on the performance of the vehicle or the like, the information to be acquired in order for the driver to comply with the traffic regulations is no longer information from a conventional road sign or the like, but is information that the vehicle control system 100 calculates and determines by itself and provides to the driver. As a result, a series of pieces of information starting from the prior notification by the vehicle control system 100 is required to confirm whether the driver has performed an appropriate action, and thus, in the present embodiment, these series of pieces of information are accurately recorded. That is, a record before the return warning notified by the vehicle control system 100 is indispensable for determining whether the automatic driving is appropriately used by the driver.

The vehicle control system 100 notifies the driver of the remaining time, and further confirms the reaction of the driver in order to recognize the returnable state (preparation state) of the driver (Step S28).

The vehicle control system 100 confirms a reaction indicating a state in which the driver can recover (Step S29). In a case where the reaction cannot be confirmed (Step S29: No), the process proceeds to Step S30. In a case where the normal return reaction to the manual driving can be confirmed and the return is achieved without delay normally (Step S29: Yes), the process returns to Step S23, and the itinerary is continued to proceed. If the handover request situation occurs in the next event, the same process as that until now is repeated.

When it is determined that it is difficult for the driver to satisfy the predetermined return state, the vehicle control system 100 saves a record of the driver's data (detailed information) (Step S30), and shifts to an emergency evacuation mode such as a minimal risk maneuver (MRM) (Step S31).

Moreover, details of Step S23 in FIG. 16 will be described. Specifically, as illustrated in FIG. 17, Step S23 includes Substeps S231 to S244. Details of each substep will be described below.

The determination unit 226 acquires or updates information such as LDM (Substep S231).

Based on the information such as LDM, the determination unit 226 determines whether there is a section in which automatic driving is possible if conditions are met (Substep S232). In a case where there is a section in which the automatic driving is possible if the conditions are met (Substep S232: Yes), the process proceeds to Substep S233, and in a case where there is no section in which the automatic driving is possible (Substep S232: No), the process proceeds to Substep S243.

If the conditions are met, the determination unit 226 extracts a section where the automatic driving is possible (Substep S233). Next, the determination unit 226 acquires a diagnosis result of the vehicle function (performance) (Substep S234).

The determination unit 226 determines whether there is no section where the automatic driving is possible in which the automatic driving is restricted by the vehicle function (Substep S235). When there are the section in which the automatic driving is not possible and the section in which the automatic driving is possible (Substep S235: Yes), the process proceeds to Substep S236. On the other hand, when there is no section where automatic driving is possible (Substep S235: No), the process proceeds to Substep S243.

The determination unit 226 sets a section in which the automatic driving is restricted by the vehicle function (Substep S236). Next, the determination unit 226 acquires weather information and the like (Substep S237).

The determination unit 226 determines whether there is no section where the automatic driving is possible in which the automatic driving is restricted by the weather (Substep S238). If there are a section in which the automatic driving is not possible and a section in which the automatic driving is possible (Substep S238: Yes), the process proceeds to Substep S239, and if there are no sections in which the automatic driving is possible (Substep S238: No), the process proceeds to Substep S243.

The determination unit 226 sets a section in which the automatic driving is restricted by the weather (Substep S239). Next, the determination unit 226 acquires biological information and the like of the driver (Substep S240).

The determination unit 226 determines whether the driver can immediately respond to the request from the vehicle control system 100 even in the case of the automatic driving (Substep S241). If the driver is available (Substep S241: Yes), the determination unit 226 proceeds to Substep S242, and if the driver is not available (Substep S241: No), the determination unit 226 proceeds to Substep S243.

The determination unit 226 displays the set ODD section as the determination result (Substep S242).

The determination unit 226 sets the automatic driving section to "absent" (Substep S243), and notifies the driver or the like of the setting (Substep S244).

Note that, in the present embodiment, the operation of the determination unit 226 is not limited to the operation according to the flowchart illustrated in FIG. 17, and further, other information may be acquired to determine whether or not the automatic driving section is available.

Furthermore, the conditions under which the function of the automatic driving can be used vary due to various dynamic factors such as the latest functional variation of the road, the weather environment, the vehicle equipment, and the equipment, and the ODD changes each time a change in these factors is detected. Moreover, factors that can cause the changes can include a wide variety of factors, such as the results of periodic re-evaluation and fatigue of the driver due to continuous vehicle use. Note that, in the present embodiment, every time a change in all the factors occurs, all the evaluations may not be performed along Substep S231 to S242. Furthermore, in the present embodiment, the respective factors may be prioritized according to the degree of influence contributing to the variation in ODD, and evaluation may be performed according to the priority.

<5.9 about Violation Estimation>

Figure 18:
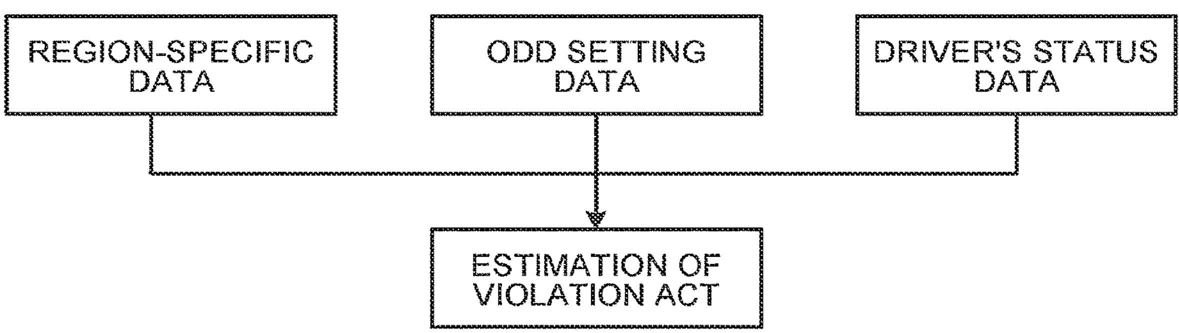
FIG. 18 is an explanatory diagram for explaining an example of violation estimation according to the embodiment of the present disclosure.
Figure 19:
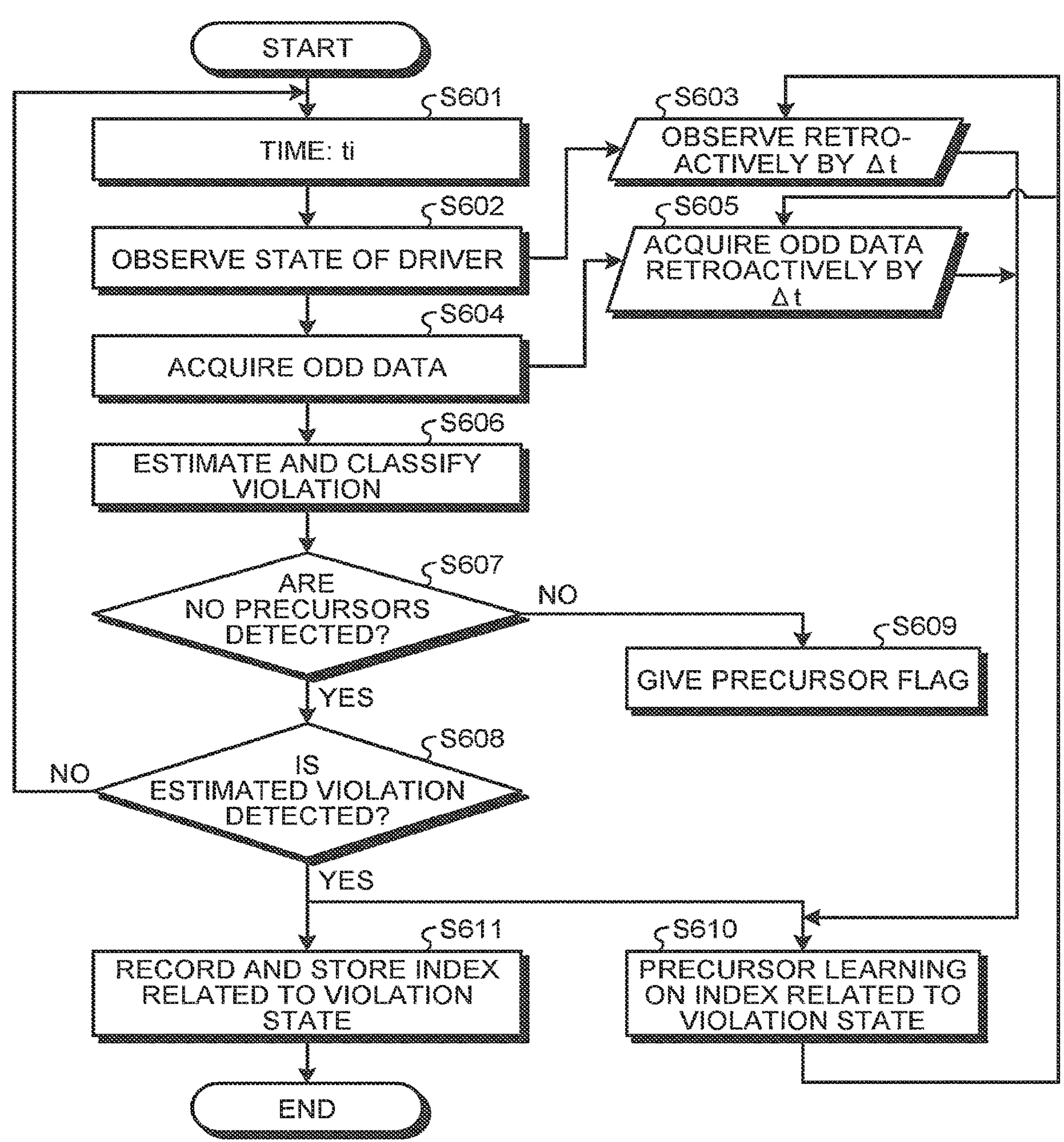
FIG. 19 is a flowchart of a mechanism for governing learning of a return coping behavior of a driver according to the embodiment of the present disclosure.

Next, estimation of a violation by the estimation unit 422 according to the present embodiment will be described with reference to FIGS. 18 and 19. FIG. 18 is an explanatory diagram for explaining an example of violation estimation according to the present embodiment, and FIG. 19 is a flowchart of a mechanism for governing learning of a return coping behavior of a driver according to the present embodiment. The representative violation behavior that can occur when the automatic driving function is used can be roughly divided into two. The first is the violation of the pure use prohibition condition for performing an action other than unpermitted driving while using the automatic driving function. Furthermore, the second violation is a violation in which the vehicle approaches the end point of the section where the automatic driving function is available due to traveling, and even if the vehicle control system 100 requests the driver in advance to return, the driver does not start necessary return preparation, the start of return preparation is delayed, or the MRM is activated as a result without satisfying the necessary return state.

In particular, in the latter violation, if the return response of the driver to the return request is not appropriately and promptly performed, it is not recognized that the driver has returned to a state where the driver can perform manual driving by the handover completion required point, and the vehicle control system 100 inevitably activates the MRM. Because MRMs are not a universal drug to prevent accidents, their use should be limited, and the dependent use of excessive MRMs may be subject to a crackdown. Then, since each driver takes different actions, it is necessary for the vehicle control system 100 to learn and determine the normal behavior characteristics of the driver and then issue an appropriate notification or alarm. Therefore, in the present embodiment, the information serving as the reference of the estimation unit 422 is learned by the action determination unit 231, and when performing the final determination of the crackdown, the control officer can use the estimation by the estimation unit 422 based on the learning in the action determination unit 231. The violation estimated by the estimating unit 422 can be reflected in, for example, the determination display 806 of FIGS. 11 to 13 described above, and by doing so, it is possible to support the determination of the presence or absence of the violation by the control officer. That is, the vehicle control system 100 determines that it is necessary, and the control officer confirms a situation in which the driver has reached the return request notified to the driver or an action other than permitted driving by operating the terminal 400. Then, the action determination unit 231 performs learning by using the information transmitted from the data recording device 200, and estimates the presence or absence of the violation by comparing with the dictionarized action characteristics of the driver.

In the present embodiment, the estimation unit 422 does not simply estimate a violation from the actions of the driver on the basis of the set ODD (ODD setting data) and the data of the state of the driver (for example, the arousal level or the like), but the estimation unit 422 checks the estimation information transmitted from the data recording device 200 and makes the application determination of the violation.

The basic operation of the action determination unit 231 will be described below. As illustrated in FIG. 18, the learning device (not illustrated) of the action determination unit 231 learns the action characteristic of the driver with respect to the prior notification, notification, or alarm of the return by using the information obtained for each use of the automatic driving of the driver, and generates the action dictionary of the driver. Note that the action dictionary is preferably updated every time the automatic driving is used. Moreover, the learning device preferably learns region-specific data. This is because the content of the allowable secondary task is assumed to vary depending on the social circumstances and the road environment of the region, and thus the action determination unit 231 preferably performs estimation on the basis of the set ODD, the state of the driver, and the region-specific data.

Furthermore, in the present embodiment, it is preferable to estimate the violation using a learning model obtained by performing machine learning of the operation of the driver or the like in advance. In the process leading to the violation, it is considered that the driver is likely to perform a characteristic action before and after the violation. Therefore, in the present embodiment, it is possible to perform machine learning of action patterns different for each person, extract characteristic actions before and after the violation action, and perform estimation on the basis of the extracted characteristic actions.

The function of the action determination unit 231 is to learn, as a unique characteristic of the driver, a time required from reception of a prior notification of return, a return notification, a return alarm, or the like during use of the automatic driving function to actual success of return from an observation value of a state of the driver when the driver originally uses the automatic driving function, and to estimate a time for return on the basis of a personal characteristic dictionary that calculates a return notification timing or the like for achieving a return success with a predetermined probability. However, in the present embodiment, the action determination unit 231 can also have a function of estimating the presence or absence of the violation. The function will be described in detail below.

For example, according to the flowchart of FIG. 19, the action determination unit 231 of the data recording device 200 estimates the violation. Specifically, as illustrated in FIG. 19, the estimation method includes a plurality of steps from Step S601 to Step S611. Details of each of these steps will be described below. Note that, in the present embodiment, the server 600 may have a function similar to that of the action determination unit 231 to estimate the violation by the server 600.

The action determination unit 231 sets the time to $t_i$ (Step S601) and observes the state of the driver at the time $t_i$ (Step S602). Moreover, the action determination unit 231 holds data obtained by observing the state of the driver a predetermined time Δt back from the time $t_i$ (Step S603), and supplies the data to the learning device 232 as learning data in Step S610 to be described later.

The action determination unit 231 acquires ODD data and the like at the time $t_i$ (Step S604). Moreover, the action determination unit 231 holds data of the ODD data a predetermined time Δt back from the time $t_i$ (Step S605), and supplies the data to the learning device 232 as learning data in Step S610 to be described later.

The action determination unit 231 estimates and classifies the violation act based on the data at the time $t_i$ (Step S606).

The action determination unit 231 detects a precursor of a violation act on the basis of data going back by the time Δt (Step S607). When the precursor is detected (Step S607: No), the process proceeds to Step S609, and when the precursor is not detected (Step S607: Yes), the process proceeds to Step S608.

In the present embodiment, since the violation behavior is different between a state called automatic driving level 4 in which intervention of the automatic driving function is not necessary at all in the corresponding road section of the corresponding vehicle and a state called automatic driving level 3 in which the driver is obliged to pay attention, the situation or behavior of the driver to cope with the return may be simply indexed without estimating the violation behavior, and instead, the time from the notification when the return is requested to the return may be estimated and displayed. Furthermore, setting the precursor flag for an action, an action, a posture, or the like that deviates from the range of the allowed secondary task and feeding back the action, the action, the posture, or the like to the driver is an advance notice of a crackdown, and thus, brings about a secondary effect of encouraging the driver's mind to suppress the violation. Furthermore, when the control officer makes a determination, since the violation of the driver after the notice is issued is a confident violation of the driver's awareness, it is strongly determined that the violation is a target to be controlled. Furthermore, the violation does not occur suddenly, but is accompanied by a precursor occurring after a certain period of time.

The action determination unit 231 detects an estimated violation (Step S608). For example, the action determination unit 231 detects a violation (estimated violation) when an index related to the violation included in the data is greater than or equal to a predetermined threshold value. If an estimated violation is detected (Step S608: Yes), the process proceeds to Steps S611, and if not detected (Step S608: No), the process returns to Step S601.

The action determination unit 231 gives a precursor flag to the detected precursor on the data (Step S609).

The action determination unit 231 performs machine learning on an index related to the detected estimated violation (a feature amount of data up to the estimated violation), and generates a model for detecting a precursor (Step S610). In the present embodiment, in order to more easily detect the precursor of a violation, the machine learning of the data immediately before reaching the estimation violation is repeated every time the estimation violation is newly detected, thereby improving the model for detecting the precursor. Moreover, in the present embodiment, the learning accuracy can be further enhanced by learning not only the ODD data but also the state of the driver in association with each other. Note that, in the present embodiment, it is not necessary to cause a dedicated learning device to perform specialized learning for the determination of the presence or absence of the violation based on the observation of the state of the driver, and a prediction device that predicts the time required for recovery from the state observation of the driver may be caused to perform the determination as an accompanying function.

The action determination unit 231 records and stores an index related to the detected estimated violation (Step S611). For example, the action determination unit 231 gives an estimated violation flag to the estimated violation detected on the data.

<5.10 Summary>

As described above, according to the embodiment of the present disclosure, it is possible to efficiently perform a crackdown while appropriately protecting personal information. That is, according to the present embodiment, it is possible to prevent a third party including the control officer from illegally acquiring and illegally using data of the driver. As a result, according to the present embodiment, since there is no risk of human rights infringement due to a crackdown and the distribution of personal information, etc., the crackdown action is socially accepted, and a practical crackdown is realized. Therefore, it is possible to effectively suppress the occurrence of traffic accidents and prevent excessive dependence on automatic driving.

Note that, in the above description, it has been described that the information such as the motion of the driver and the biological information is acquired. However, in the present embodiment, the information is not limited to the driver, and information of passengers (occupants) boarding the vehicle including the driver may also be acquired.

Note that, in the embodiment of the present disclosure, an automobile has been described as an example, but the present embodiment is not limited to be applied to an automobile, and can be applied to a mobile body such as an automobile, an electric automobile, a hybrid electric automobile, a motorcycle, a personal mobility, an airplane, a ship, a construction machine, and an agricultural machine (tractor). Moreover, the embodiments of the present disclosure can also be applied to remote steering operations of various mobile bodies and the like.

Furthermore, the metadata and the method of encrypting, decrypting, and transmitting and receiving the metadata according to the present embodiment can be used when the driver's driving skill is determined in updating the driver's license or the like. The metadata according to the present embodiment is data obtained by extracting only information necessary for the above determination and abstracting the extracted information without including many personal information. Therefore, the above determination can be easily performed while ensuring the privacy of the driver. Moreover, the metadata and the method of encrypting, decrypting, and transmitting and receiving the metadata according to the present embodiment can be used for assessment of automobile insurance. Hitherto, the insurance premium of the automobile insurance has been set on the basis of various conditions such as the vehicle type of the target automobile, the type of the driver's license held by the driver, the age of the driver, the travel distance in a predetermined period, and the travel frequency (For example, in the case of using for commuting, the insurance fee is set high). By using the metadata according to the present embodiment, it is possible to set a more appropriate insurance premium on the basis of the actual driving skill and tendency of the driver while protecting the privacy of the driver.

6. Hardware Configuration

Figure 20:
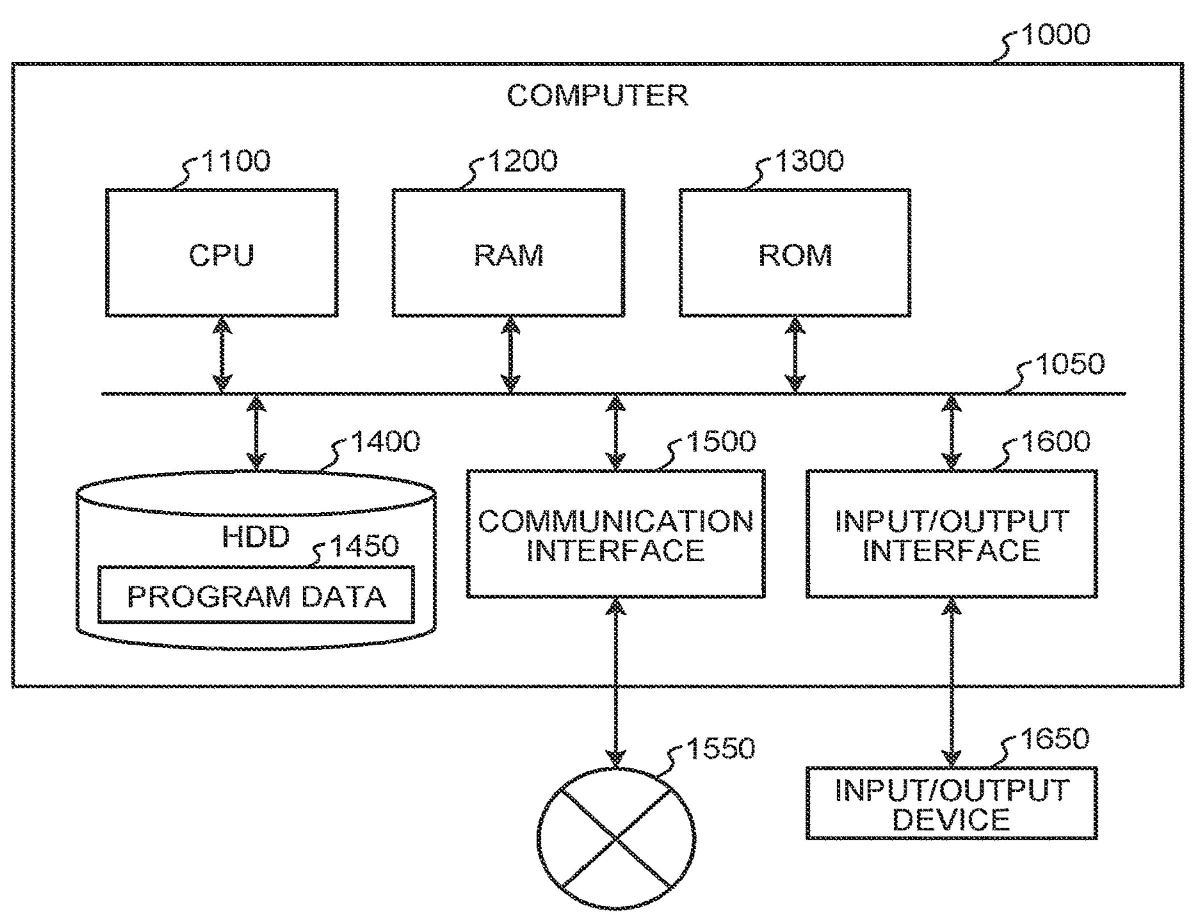
FIG. 20 is a hardware configuration diagram illustrating an example of a computer 1000 that implements some functions of the data recording device 200.

A part of the data recording device 200 according to each embodiment described above is realized by a computer 1000 having a configuration as illustrated in FIG. 20, for example. FIG. 20 is a hardware configuration diagram illustrating an example of the computer 1000 that implements some functions of the data recording device 200. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input/output device 1650 such as a keyboard, a mouse, and a microphone via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto optical disk (MO), a tape medium, a magnetic recording medium, a semiconductor memory, or the like.

For example, in a case where the computer 1000 functions as a part of the data recording device 200 according to the embodiment of the present disclosure, the CPU 1100 of the computer 1000 implements the functions of the generation unit 210 and the like by executing a program stored in the RAM 1200. Furthermore, the HDD 1400 stores an information processing program and the like according to the present disclosure. Note that the CPU 1100 reads the program data 1450 from the HDD 1400 and executes the program data 1450, but as another example, these programs may be acquired from another device via the external network 1550.

Furthermore, the generation unit 210 and the like according to the present embodiment may be applied to a system including a plurality of devices on the premise of connection to a network (or communication between devices), such as cloud computing, for example. That is, the information processing apparatus according to the present embodiment described above can be implemented as the information processing system according to the present embodiment by a plurality of apparatuses, for example. An example of the hardware configuration of a part of the data recording device 200 has been described above. Each of the above-described components may be configured using a general-purpose member, or may be configured by hardware specialized for the function of each component. Such a configuration can be appropriately changed according to the technical level at the time of implementation.

In particular, in addition to the steady observation information for the driver, the handling action of the driver with respect to the advance notification processing for the driver, the notification of the new event, the advance log information after the alarm or before getting in the vehicle, and the like changes due to multidimensional factors in the short to medium term. However, by performing continuous learning using handover at the time of using the vehicle and a control intervention event as input data by offline cloud computing or the like, it is possible to predict the time required for recovery with higher accuracy and predict the health condition.

7. Supplement

Note that the embodiment of the present disclosure described above can include, for example, an information processing method executed by the information processing apparatus or the information processing system as described above, a program for causing the information processing apparatus to function, and a non-transitory tangible medium in which the program is recorded. Furthermore, the program may be distributed via a communication line (including wireless communication) such as the Internet.

Furthermore, each step in the information processing method according to the embodiment of the present disclosure described above may not necessarily be processed in the described order. For example, each step may be processed in an appropriately changed order. Furthermore, each step may be partially processed in parallel or individually instead of being processed in time series. Moreover, the processing of each step does not necessarily have to be performed according to the described method, and may be performed by another method by another functional unit, for example.

Furthermore, in the description of the embodiment of the present disclosure, the detail is described based on the automatic driving level defined by SAE. However, the concept of classifying the use of the automatic driving by the automatic driving level is the classification classified by the design viewpoint of the vehicle. On the other hand, when viewed from the user's viewpoint, it is not necessarily easy for the driver to drive according to the automatic driving level of the vehicle after the user always correctly understands and grasps the permitted automatic driving level of the operation design area in which the operation at each level is permitted according to the available automatic driving level. That is, it may be referred to as machine centered design in which a vehicle is used in accordance with a function or an instruction of a machine. That is, in a situation where the situation that the vehicle system can cope with dynamically changes with time due to various external factors and internal factors, and the automatic driving level at the time of traveling is not uniquely determined physically only from the road section or the like, it can be said that the driver is required to subserviently cope with the level allowed by the road situation that the vehicle control system 100 advances each time. On the other hand, when looking at the relationship between the driver and the vehicle control system 100 from an ergonomic viewpoint, the user performs action determination in consideration of balance between the burden of driving and various risks associated therewith in order to achieve the purpose of using the vehicle such as moving and obtain secondary advantages obtained during the movement. Here, the burden refers to vehicle steering work for movement and a certain risk incurred at that time. Originally, an advantage of the automatic driving when viewed from the driver's viewpoint is that the restraint of driving is released, and the time can be used for a time that is not related to meaningful driving or can be used without being dependent on driving. In order to enjoy such advantages, it can be said that it is necessary to convert the idea supporting the automatic driving control to an idea of Human Centered Design obtained by reversing the relationship of the conventional idea of Machine Centered Design. Then, when the relationship between the vehicle control system 100 of the vehicle and the driver who is the user is reviewed on the basis of the viewpoint of such an idea, it can be said that the use of the automatic driving that allows the actual various automatic driving functions according to the arousal and the physical preparation situation that can be coped with according to the automatic driving level that can be used as the "operational design domain" as the design of the vehicle by the driver is a desirable use form in terms of ergonomics.

Furthermore, considering the procedure for a violation at the crackdown site, when the vehicle control system 100 determines that manual driving is desirable, and the control officer sees the "suspicious" driver who relies on the automatic driving function on the road even though the control officer is in a state of traveling in a section where the driver is required to pay attention necessary for returning to manual driving, it is difficult to visually confirm the fair and accurate violation even if the control officer tracks the corresponding vehicle and driver for confirmation and issues an instruction to stop the vehicle. Then, since the ODD allowed for the corresponding vehicle is different due to various factors such as the performance of the vehicle, the mounted load, the state of the passenger, and the driver himself/herself, there is a high possibility that the ODD has already changed at the time when the control officer instructs and tracks the vehicle to stop for confirmation of the violation and the corresponding vehicle stops substantially safely. Furthermore, there is a high possibility that the driver recognizes the stop instruction and is in a situation that cannot probably be said to be a violation at the time of stopping. Furthermore, when the vehicle is stopped, there is a possibility that the driver has already recognized the situation and has completed a countermeasure for not receiving the violation indication from the control officer.

Therefore, in the crackdown of the violation, it is required to devise such that the situation at the time point going back from the stop time can be confirmed. In order to ensure the effectiveness of the crackdown, it is necessary to confirm the violation state that the driver cannot escape in the field of the crackdown and impose a fine, that is, it is necessary to practically give the driver a disadvantage due to the violation. However, in order to make it impossible to escape, it is necessary for the control officer to confirm that there has been a violation by the driver at a time point going back from the time point at which the vehicle has succeeded in stopping, and it is preferable to reliably and promptly confirm the violation while avoiding a mistake or the like. To eradicate the violation, it is effective to have a mechanism for surely confirming the violation state. For example, if the violation state cannot be confirmed by the police officer going back in time, the negligence in response to the return request, which is one of the violation acts, will not be penalized as having no evidence even if the violation is made. Therefore, as a part of a mechanism for urging a prompt response to a request for returning from automatic driving to manual driving, which is likely to lose importance on the driver's consciousness, a device capable of confirming a situation at a retroactive point in time has been proposed in the present specification. With such a device, it is possible to prevent the driver from taking over without correctly following the return request, from leaving the road due to insufficient grasping of the situation, from relying on the MRM function, and from stopping with the MRM function of the host vehicle without taking appropriate measures, and as a result, from causing a collision accident such as a butt between following vehicles, from causing a traffic jam, or the like.

Furthermore, the effects that can be provided by the embodiment of the present disclosure include not only a primary effect of directly improving the efficiency of enforcement, but also a secondary effect that can give effectiveness to the application of penalties for violation acts, and a tertiary effect that can promote action learning for raising a sense of restraint for violation acts of a driver, suppress the occurrence of violation against a return request in social operation, and realize a safer social operation in which a rear-end accident, a traffic jam, or the like due to an MRM does not occur.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the advantageous effects described in the present specification are merely illustrative or exemplary, and are not restrictive. That is, the technique according to the present disclosure can exhibit other advantageous effects obvious to those skilled in the art from the description of the present specification together with or instead of the above advantageous effects.

Note that the present technique can also have the following configurations.

(1) An information processing apparatus comprising:
a metadata generation unit that generates metadata from information indicating a state of an occupant riding on a mobile body, the information being obtained from a sensor provided in the mobile body;
a first encryption unit that encrypts the generated metadata; and
a first recording unit that stores the encrypted metadata.

(2) The information processing apparatus according to (1), wherein the information includes at least a moving image of the occupant.

(3) The information processing apparatus according to (2), wherein the metadata includes information that enables generation of at least one of a moving image of an avatar or a moving image of a skeleton model.

(4) The information processing apparatus according to any one of (1) to (3), wherein the first encryption unit encrypts the metadata using a first common key.

(5) The information processing apparatus according to (4), further comprising a first output unit that outputs the encrypted metadata using the first common key.

(6) The information processing apparatus according to (5), wherein the first common key includes at least one of information of a driver's license associated with the occupant, identification information associated with the occupant, identification information associated with a terminal carried by the occupant, or biological information of the occupant.

(7) The information processing apparatus according to (6), further comprising:
a second encryption unit that encrypts the information using the first common key and a second common key; and
a second output unit that outputs the encrypted information using the first common key.

(8) The information processing apparatus according to (7), further comprising an input unit that receives an input of the second common key by the occupant.

(9) The information processing apparatus according to (7) or (8), wherein the first and second output units output data in association with at least one of data identification information, occupant identification information, or date and time information.

(10) The information processing apparatus according to any one of (7) to (9), wherein a steering mode of the mobile body is switchable between an automatic driving mode and a manual driving mode by a driver.

(11) The information processing apparatus according to (10), wherein the information includes at least one of information of a position, a posture, an action, a line of sight, an arousal level, or an alcohol level of the occupant.

(12) The information processing apparatus according to (11), further comprising
a determination unit that determines an automatic driving level allowed for the mobile body,
wherein the first and second output units output data in association with a determination result.

(13) The information processing apparatus according to (12), wherein the determination unit makes a determination based on at least one of flight design area information, a local dynamic map, performance information of the mobile body, weather, or surrounding information of the mobile body.

(14) An information processing method comprising the steps of:
generating metadata from information indicating a state of an occupant riding on a mobile body, the information being obtained from a sensor provided in the mobile body;
encrypting the generated metadata; and
storing the encrypted metadata,
wherein the steps are performed by an information processing apparatus.

(15) A program causing a computer to execute:
a function of generating metadata from information indicating a state of an occupant riding on a mobile body, the information being obtained from a sensor provided in the mobile body;
a function of encrypting the generated metadata; and
a function of storing the encrypted metadata.

(16) An information processing terminal comprising:
an authentication unit that performs authentication processing;
an information acquisition unit that acquires encrypted metadata generated from information indicating a state of an occupant riding on a mobile body according to a result of the authentication processing;
a decryption unit that performs decryption of the encrypted metadata; and
a display unit that outputs the decrypted metadata.

(17) The information processing terminal according to (16), wherein the authentication processing and the decryption are executed using a common key for encrypting the metadata.

(18) The information processing terminal according to (17), wherein
the information acquisition unit acquires a determination result of an automatic driving level allowed for the mobile body, and
the display unit outputs the determination result together with the decrypted metadata.

(19) The information processing terminal according to (18), further comprising
an estimation unit that estimates presence or absence of a violation based on the decrypted metadata and the determination result.

(20) The information processing terminal according to (19), wherein the estimation unit performs estimation using an estimation model obtained by machine learning.

REFERENCE SIGNS LIST

10 DATA RECORDING SYSTEM
100 VEHICLE CONTROL SYSTEM
101, 204, 404 INPUT UNIT
102 DATA ACQUISITION UNIT
103 COMMUNICATION UNIT
104 IN-VEHICLE DEVICE
105 OUTPUT CONTROL UNIT
106, 220, 222, 424 OUTPUT UNIT
107 DRIVE SYSTEM CONTROL UNIT
108 DRIVE SYSTEM
109 BODY SYSTEM CONTROL UNIT
110 BODY SYSTEM
111, 208, 216, 218, 412 STORAGE UNIT
112 AUTOMATIC DRIVING CONTROL UNIT
113 SENSOR UNIT

121 COMMUNICATION NETWORK
131 DETECTION UNIT
132 SELF-POSITION ESTIMATION UNIT
133 SITUATION ANALYSIS UNIT
134 PLANNING UNIT
135 OPERATION CONTROL UNIT
141 VEHICLE EXTERIOR INFORMATION DETECTION UNIT
142 VEHICLE INTERIOR INFORMATION DETECTION UNIT
143 VEHICLE STATE DETECTION UNIT
151 MAP ANALYSIS UNIT
152 TRAFFIC RULE RECOGNITION UNIT
153 SITUATION RECOGNITION UNIT
154 SITUATION PREDICTION UNIT
161 ROUTE PLANNING UNIT
162 ACTION PLANNING UNIT
163 OPERATION PLANNING UNIT
171 EMERGENCY AVOIDANCE UNIT
172 ACCELERATION/DECELERATION CONTROL UNIT
173 DIRECTION CONTROL UNIT
200 DATA RECORDING DEVICE
202, 224 INFORMATION ACQUISITION UNIT
206 IMAGING UNIT/SENSOR UNIT/OPERATION UNIT
210 GENERATION UNIT
212, 214 ENCRYPTION UNIT
226 DETERMINATION UNIT
228 NOTIFICATION UNIT
230 VEHICLE EXTERIOR NOTIFICATION UNIT
231 ACTION DETERMINATION UNIT
232 LEARNING DEVICE
233 DICTIONARY
234 VIOLATION ESTIMATOR
400 TERMINAL
402 AUTHENTICATION UNIT
406 OPERATION UNIT
408, 410 RECEPTION UNIT
414 DETERMINATION RESULT STORAGE UNIT
416 METADATA STORAGE UNIT
418, 420 DECRYPTION UNIT
422 ESTIMATION UNIT
426 DISPLAY UNIT
600 SERVER
800 MOVING IMAGE
802, 804, 806, 810*a*, 810*b*, 810*c*, 810*d*, 812*a*, 812*b*, 812*c*, 812*d* DISPLAY
808 CURSOR

The invention claimed is:

1. An information processing apparatus comprising:

a memory storing a program, and at least one processor configured to execute the program to perform operations comprising:

generating metadata by electronically processing sensor-obtained information indicating a state of an occupant riding a mobile body, the metadata being generated by abstracting the information to include an action of the occupant and exclude personal information of the occupant;

performing a first encryption that encrypts the generated metadata using a first common key associated with the occupant; and storing the metadata encrypted using the first common key;

wherein the information includes at least a moving image of the occupant;

wherein the metadata includes information for generation of at least one of a moving image of an avatar or a moving image of a skeleton model while omitting personal identifiers of the occupant; and performing a second encryption to encrypt the sensor-obtained information using both the first common key and a second common key supplied by the occupant, such that the encrypted sensor-obtained information is accessible only upon provision of both the first common key and the second common key.

2. The information processing apparatus according to claim 1, wherein the first common key includes at least one of information of a driver's license associated with the occupant, identification information associated with the occupant, identification information associated with a terminal carried by the occupant, or biological information of the occupant.

3. The information processing apparatus according to claim 1, wherein the operations further comprise receiving an input of the second common key from the occupant.

4. The information processing apparatus according to claim 1, wherein the operations further comprise:

outputting data in association with at least one of data identification information, occupant identification information, or date and time information.

5. The information processing apparatus according to claim 1, wherein a steering mode of the mobile body is switchable between an automatic driving mode and a manual driving mode by a driver.

6. The information processing apparatus according to claim 5, wherein the information includes at least one of information of a position, a posture, an action, a line of sight, an arousal level, or an alcohol level of the occupant.

7. The information processing apparatus according to claim 6, wherein the operations further comprise:

determining an automatic driving level allowed for the mobile body; and outputting data in association with a determination result.

8. The information processing apparatus according to claim 7, wherein the operations further comprise:

determining the automatic driving level based on at least one of flight design area information, a local dynamic map, performance information of the mobile body, weather, or surrounding information of the mobile body.

9. The information processing apparatus according to claim 1, wherein the metadata includes information for generation of the moving image of the avatar, and a face of the occupant in the avatar is obscured in a display of the avatar.

10. The information processing apparatus according to claim 1, wherein the operations further comprise:

performing machine learning to develop a model that correlates actions to violations, and to apply the information that includes the action of the occupant to determine a violation probability for the occupant; and prompting a notification to the occupant regarding the violation probability.

11. A non-transitory computer readable medium storing a program, the program being executable by at least one processor to perform operations comprising:

generating metadata by electronically processing sensor-obtained information indicating a state of an occupant riding a mobile body, the metadata being generated by abstracting the information to include an action of the occupant and exclude personal information of the occupant;

performing a first encryption that encrypts the generated metadata using a first common key associated with the occupant; and storing the metadata encrypted using the first common key:

wherein the information includes at least a moving image of the occupant;

wherein the metadata includes information for generation of at least one of a moving image of an avatar or a moving image of a skeleton model while omitting personal identifiers of the occupant; and performing a second encryption to encrypt the sensor-obtained information using both the first common key and a second common key supplied by the occupant, such that the encrypted sensor-obtained information is accessible only upon provision of both the first common key and the second common key.

12. The non-transitory computer readable medium according to claim 11, wherein the operations further comprise:

receiving an input of the second common key from the occupant.

13. The non-transitory computer readable medium according to claim 11, wherein the operations further comprise:

performing machine learning to develop a model that correlates actions to violations, and to apply the information that includes the action of the occupant to determine a violation probability for the occupant; and notifying the occupant regarding the violation probability.

14. The non-transitory computer readable medium according to claim 11, wherein the first common key includes at least one of information of a driver's license associated with the occupant, identification information associated with the occupant, identification information associated with a terminal carried by the occupant, or biological information of the occupant.

15. The non-transitory computer readable medium according to claim 11, wherein the operations further comprise:

outputting data in association with at least one of data identification information, occupant identification information, or date and time information.

16. The non-transitory computer readable medium according to claim 11, wherein a steering mode of the mobile body is switchable between an automatic driving mode and a manual driving mode by a driver.

17. The non-transitory computer readable medium according to claim 11, wherein the information includes at least one of information of a position, a posture, an action, a line of sight, an arousal level, or an alcohol level of the occupant.

18. The non-transitory computer readable medium according to claim 17, wherein the operations further comprise:

determining an automatic driving level allowed for the mobile body; and outputting data in association with a determination result.

19. The non-transitory computer readable medium according to claim 18, wherein the operations further comprise:

determining the automatic driving level based on at least one of flight design area information, a local dynamic map, performance information of the mobile body, weather, or surrounding information of the mobile body.

20. The non-transitory computer readable medium according to claim 11, wherein the metadata includes information for generation of the moving image of the avatar, and a face of the occupant in the avatar is obscured in a display of the avatar.

* * * * *